(12) United States Patent
Ishibe et al.

(10) Patent No.: US 7,385,746 B2
(45) Date of Patent: Jun. 10, 2008

(54) OPTICAL SCANNING SYSTEM AND IMAGE FORMING APPARATUS USING THE SAME

(75) Inventors: Yoshihiro Ishibe, Utsunomiya (JP); Takahisa Kato, Atsugi (JP); Susumu Yasuda, Tsukuba (JP)

(73) Assignee: Canon Kabushiki Kaisha, Tokyo (JP)

(*) Notice: Subject to any disclaimer, the term of this patent is extended or adjusted under 35 U.S.C. 154(b) by 124 days.

(21) Appl. No.: 11/503,069

(22) Filed: Aug. 14, 2006

(65) Prior Publication Data

US 2007/0041070 A1   Feb. 22, 2007

(30) Foreign Application Priority Data

| Aug. 22, 2005 | (JP) | ............................. 2005-239770 |
| May 25, 2006 | (JP) | ............................. 2006-145154 |
| Jul. 20, 2006 | (JP) | ............................. 2006-198159 |

(51) Int. Cl.
*G02B 26/08* (2006.01)
*B41J 15/14* (2006.01)

(52) U.S. Cl. ...................... 359/215; 359/205; 359/213; 347/244

(58) Field of Classification Search ................ 359/205, 359/213–215
See application file for complete search history.

(56) References Cited

U.S. PATENT DOCUMENTS

| 6,069,727 | A | 5/2000 | Cho et al. .................... 359/226 |
| 6,104,522 | A | 8/2000 | Hayashi et al. ............. 359/207 |
| 6,133,935 | A | 10/2000 | Fujibayashi et al. ........ 347/258 |
| 6,275,318 | B1 | 8/2001 | Kamikubo et al. ......... 359/196 |
| 6,803,843 | B2 | 10/2004 | Kato et al. .................... 335/78 |
| 6,924,915 | B2 | 8/2005 | Hirose et al. ................ 359/224 |
| 7,068,410 | B2 | 6/2006 | Nomura et al. ............. 359/225 |
| 7,085,031 | B2 * | 8/2006 | Tomioka ..................... 359/205 |
| 2002/0044326 | A1 | 4/2002 | Kato ........................... 359/205 |
| 2002/0163704 | A1 | 11/2002 | Hayashi et al. ............. 359/225 |
| 2004/0119811 | A1 | 6/2004 | Bush et al. .................. 347/237 |

FOREIGN PATENT DOCUMENTS

EP   1553752   7/2005

(Continued)

OTHER PUBLICATIONS

U.S. Appl. No. 11/603,058, filed Nov. 22, 2006 by Takahisa Kato and Yukio Furukawa.

(Continued)

*Primary Examiner*—Stephone B. Allen
*Assistant Examiner*—Jade Callaway
(74) *Attorney, Agent, or Firm*—Fitzpatrick, Cella, Harper & Scinto

(57) ABSTRACT

An optical scanning system includes a deflecting device to scanningly deflect a light beam from a light source in a main scan direction, and an imaging optical system for imaging, upon a surface to be scanned, the light beam deflected by a deflecting surface of the deflecting device. First and second differences in wavefront aberration are respectively produced as a result of reflection by the deflecting surface and as a result of transmission through the imaging optical system. At least one optical surface inside the imaging optical system is non-arcuate in a main scan section, so as to assure that the first and second phase differences are made opposite to each other.

21 Claims, 22 Drawing Sheets

FOREIGN PATENT DOCUMENTS

| | | |
|---|---|---|
| JP | 2004-191416 | 7/2004 |
| JP | 2005-173082 | 6/2005 |
| JP | 2005-189580 | 7/2005 |
| WO | 2004/049034 | 6/2004 |

OTHER PUBLICATIONS

U.S. Appl. No. 11/603,060, filed Nov. 22, 2006 by Takahisa Kato and Yukio Furukawa.

* cited by examiner 22.5°  21.028°  16.822°  12.617°  8.411°  4.206°  0.0°

22.5°  21.028°  16.822°  12.617°  8.411°  4.206°  0.0°

22.5°  21.028°  16.822°  12.617°  8.411°  4.206°  0.0°

OPTICAL SCANNING SYSTEM AND IMAGE FORMING APPARATUS USING THE SAME

FIELD OF THE INVENTION AND RELATED ART

This invention relates to an optical scanning system and an image forming apparatus using the same. More particularly, the present invention concerns an optical scanning system which can be suitably used in a laser beam printer (LBP) having an electrophotographic process, a digital copying machine or a multi-function printer, for example.

With regard to optical scanning systems having a reciprocating optical deflector as an optical deflector (deflecting means) for reflectively deflecting a light beam, many proposals have already been made such as, for example, Patent Documents Nos. 1 and 2 below.

In Patent Document No. 1, a light beam (rays of light) is multi-reflected between a sine-motion oscillation mirror (deflecting surface) and two fixed mirrors disposed opposed to the oscillation mirror, by which the scan angle of the light beam is enlarged.

Patent Document No. 1: Japanese Laid-Open Patent Application, Publication No. 2004-191416

Patent Document No. 2: Japanese Laid-Open Patent Application, Publication No. 2005-173082

If in Patent Document No. 1 the scan angle of the light beam is enlarged, since the light beam is multi-reflected by using a combination of a small oscillation mirror and two fixed mirrors which could inherently be constituted only by a single oscillation mirror, the structure becomes very complicated. Hence, it is undesirable from the standpoint of smallness in size.

Furthermore, in Patent Document No. 1, because the light beam is multi-reflected, the size of the oscillation mirror (deflecting surface) has to be made large in the main scan direction. This is unfavorable for high-speed scan. Additionally, it inevitably causes deformation of the oscillation mirror surface due to angular acceleration or air resistance during the sine oscillation.

In order to meet this, in Patent Document No. 1, as the oscillation angle of the oscillation mirror is made larger, a focus error resulting from deformation of the oscillation mirror is corrected by finely oscillating a coupling lens in synchronism with the oscillation period.

In the structure in which the scan angle of the light beam is enlarged by means of multiple reflections, as the oscillation angle of the oscillation mirror becomes larger, the light beam goes through the end portion of the oscillation mirror. This means that, as the deflection angle (oscillation angle) increases, the influence of the deformation amount of the oscillation mirror becomes large.

Therefore, as the deflection angle (oscillation angle) increases, the amount of focus error becomes large. This is the very reason for that the structure of Patent Document No. 1 requires quite complicated control of finely oscillating the coupling lens in synchronism with the oscillation period.

Moreover, in reciprocating type optical deflectors, reciprocating motion is inevitably followed by dynamic deformation of the deflecting surface in the main scan direction.

If the deflecting surface of an optical deflector is deformed in the main scan direction, the light beam reflected by that deflecting surface is affected by wavefront aberration of an amount twice the amount of deformation of the deflecting surface. This seriously deteriorates the imaging performance.

In Patent Document No. 2, on the other hand, in an attempt to reducing deformation of a deflection mirror surface in the main scan direction, slots are formed at the back of the deflection mirror, and the area of these slots as well as the disposition density of them are made different with the position in the main scan direction.

Furthermore, Y-shaped support beams for pivotally supporting the deflection mirror are used at two locations on the deflection mirror which locations are different with respect to the main scan direction, so as to reduce deformation of the deflection mirror surface in the main scan direction.

On the other hand, some of the optical scanning systems having a reciprocating optical deflector do not use a plane tilt correction optical system in their imaging optical system, taking an advantage that the deflecting surface is only one.

Such systems however involve a problem that, if deformation of the deflection mirror in the main scan direction changes with the position of the deflection mirror in the sub-scan direction, the imaging performance is deteriorated thereby.

SUMMARY OF THE INVENTION

It is an object of the present invention to provide an optical scanning system which is small in size and is capable of outputting high-quality images, and also to provide an image forming apparatus having such optical scanning system.

In accordance with an aspect of the present invention, to achieve the above object, there is provided an optical scanning system, comprising: light source means; deflecting means configured to scanningly deflect a light beam from said light source means in a main scan direction; an imaging optical system configured to image, upon a surface to be scanned, the light beam deflected by a deflecting surface of said deflecting means; wherein said deflecting surface is configured to perform reciprocating motion by which the surface to be scanned is reciprocatingly scanned in the main scan direction with the light beam deflected by said deflecting surface of said deflecting means; wherein a first direction refers to a direction of a phase difference of wavefront aberration in the main scan direction between a marginal ray and a principal ray of the light beam reflected by the deflecting surface at an effective deflection angle of the same corresponding to a largest scan position in an effective scan region on the surface to be scanned, the phase difference being produced as a result of reflection of the light beam by the deflecting surface; wherein a second direction refers to a direction of the phase difference of wavefront aberration in the main scan direction between a marginal ray and a principal ray of the light beam reflected by the deflecting surface at an effective deflection angle thereof, the phase difference being produced as a result of transmission of the light beam through said imaging optical system; and wherein at least one optical system inside said imaging optical system is provided with at least one optical surface of non-arculate shape in a main scan section, so as to assure that the first and second directions are made opposite to each other.

Briefly, in accordance with the present invention, an optical scanning system by which deterioration of a focused spot on the surface to be scanned can be reduced significantly even where a reciprocation type optical deflector is used, as well as an image forming apparatus having such optical scanning system, are accomplished.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Preferred embodiments of the present invention will now be described with reference to the attached drawings.

Embodiment 1

Figure 1:
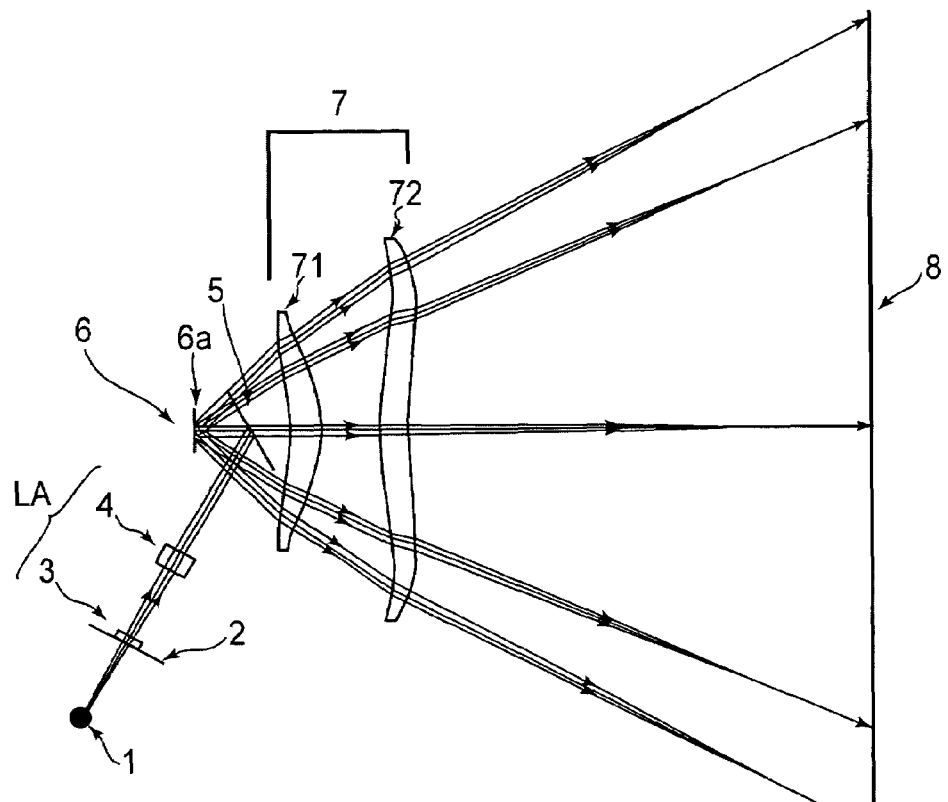
FIG. 1 is a sectional view along a main-scan section, for explaining a first embodiment of the present invention.

FIG. 1 illustrates a section (main scan section) of a main portion of a first embodiment of the present invention, in the main scan direction.

In this specification, the term "main scan direction" refers to a direction perpendicular to the deflecting axis of an optical deflector and to the optical axis of an imaging optical system; that is, the direction along which a light beam is scanningly deflected by the optical deflector. The term "sub-scan direction" refers to a direction parallel to the deflecting axis of the optical deflector.

Furthermore, the term "main scan section" refers to a plane which contains the main scan direction and the optical axis of the imaging optical system. The term "sub-scan section" refers to a section which is parallel to the optical axis of the imaging optical system and is perpendicular to the main scan section.

Denoted in FIG. 1 at 1 is light source means which may comprise a semiconductor laser, for example. Denoted at 2 is an aperture stop that serves to restrict the width of a light beam passing therethrough to determine the beam diameter of the same.

Denoted at 3 is a condensing optical system (collimator lens) having a function for converting a divergent light beam from the light source means 1 into a parallel light beam. Denoted at 4 is a lens system (cylindrical lens) that has a predetermined power (refractive power) only in the sub-scan section (sub-scan direction).

The lens system 4 functions to image the light beam, having been converted by the collimator lens 3 into a parallel light with respect to the sub-scan section, upon a deflecting surface 6a of an optical deflector (deflecting means) 6, to be described later, as an approximately linear image.

Denoted at 5 is a mirror which serves to deflect the light beam, passed through the cylindrical lens 4, with respect to the main scan direction and to direct the same to the optical deflector 6.

Here, the collimator lens 3 and the cylindrical lens 4 are structural components of an input (light incidence) optical system LA. The collimator lens 3 and the cylindrical lens 4 may be replaced by an integral structure of a single optical element (anamorphic lens).

The optical deflector (deflecting means) 6 comprises a resonance type optical deflector, having its deflecting surface 6a configured to perform reciprocating sine motion based on resonance. In this embodiment, the deflecting surface 6a of the optical deflector 6 reciprocates and, through this reciprocation, the surface 8 which is going to be scanned is reciprocatedly scanned in the main scan direction with the light beam provided by the input optical system LA.

The reciprocating motion of the deflecting surface 6a of the optical deflector 6 is based on resonance drive, and it is done in accordance with sine oscillation.

Denoted at 7 is an imaging optical system (f-θ lens system) including first and second imaging lenses (f-θ lenses) 71 and 72. It functions to image the light beam, produced on the basis of imagewise information and having been reflectively deflected by the optical deflector 6, upon the surface (surface to be scanned) 8 of a photosensitive drum.

The first and second f-θ lenses 71 and 72 that constitute the imaging optical system 7 of this embodiment are configured to reduce wavefront aberration of the light beam in the main scan section, which is produced in accordance with the amount of deformation of the deflecting surface 6a of the optical deflector 6 as the same is deformed in the main scan section during the reciprocating motion.

Denoted at 8 is the photosensitive drum surface, which is the surface to be scanned.

In this embodiment, a divergent light beam from the semiconductor laser 1 having been optically modulated in accordance with the imagewise information is rectified by the aperture stop 2 in terms of the light beam width and the sectional shape, and then it is converted into a parallel light beam by means of the collimator lens 3.

Subsequently, through the cylindrical lens 4 and the mirror 5, the light beam is projected on the deflecting surface 6a (in frontal incidence) from the center of the oscillation angle (deflection angle) of the optical deflector 6 with respect to the main scan section.

With regard to the sub-scan section, on the other hand, the light beam is incident on the deflecting surface 6a (in oblique incidence) with a finite angle with respect to the sub-scan direction.

By means of the reciprocating motion of the deflecting surface 6a of the optical deflector 6, the light beam is deflectively reflected in the main scan direction and is directed to the photosensitive drum surface 8 through the f-θ lens system 7. Hence, through the reciprocating motion of the deflecting surface 6a of the optical deflector 6, the photosensitive drum surface 8 is scanned with the light beam in the main scan direction. Through this process, image recording on the photosensitive drum (recording medium) is carried out.

The optical deflector 6 in this embodiment comprises a resonance type optical deflector, having its deflecting surface 6a configured to perform reciprocating sine oscillation based on resonance.

Generally, in optical deflectors configured to perform sine oscillation, if the area of the deflecting surface thereof is enlarged, high-speed oscillation becomes difficult to accomplish. For this reason, when such a deflector is to be incorporated into a laser beam printer or a digital copying machine, for example, the size of the deflecting surface should be made as small as possible.

In this embodiment, in this respect, the light beam is projected on the deflecting surface 6a of the optical deflector as frontal incidence: that is, in FIG. 1 the light beam is projected from the upper right side (f-θ lens system 7 side) toward the front of the deflecting surface. In other words, in the main scan section, the light beam is projected to the front of the deflecting surface 6a of the optical deflector 7 in the optical axis direction of the imaging optical system 7.

With the frontal incidence described above, the size of the deflecting surface 6a of the optical deflector 6 (i.e. the width in the main scan direction) can be made smallest, and hence high-speed oscillation can be accomplished easily.

On the other hand, if the light incidence method described above is used, the light beam incident on the deflecting surface 6a of the optical deflector may interfere with the light beam deflectively reflected by the deflecting surface 6a. To avoid this, the light beam is projected onto the deflecting surface 6a such that it is incident thereupon with a finite incidence angle in the sub-scan direction, with respect to a plane normal line to the deflecting surface 6a (i.e., an oblique-incidence optical system is provided).

Specifically, in this embodiment, the light beam is incident on the deflecting surface 6a with an incidence angle of 2 degrees in the sub-scan direction, to the plane-normal-line of the deflecting surface 6a, from below as viewed in the sub-scan direction (from below in the sheet of FIG. 1).

As a result of this, the light beam to be deflectively reflected by the deflecting surface 6a is similarly deflectively reflected with an angle of 2 degrees in the sub-scan direction to the plane-normal-line of the deflecting surface 6a, upwardly in the sub-scan direction (upwardly in the sheet of FIG. 1).

The f-θ lens system 7 which is an imaging optical system is disposed upwardly in the sub-scan direction and at a predetermined distance to make it sure that the deflected light beam having been upwardly deflectively reflected is incident thereupon. The deflected light beam thus incident on the f-θ lens system (imaging optical system)-7 is imaged on the photosensitive drum surface 8 as a light spot.

As described hereinbefore, the deflecting surface 6a of the optical deflector 6 is reciprocatingly oscillated in the main scan direction, within the range of largest amplitude (largest deflection angle) ±φmax. More specifically, the deflecting surface 6a performs the sine oscillation in which the deflection angle (oscillation angle) φ can be expressed in terms of angular frequency ω and time t as follows:

$$\phi = \phi_{max} \cdot \sin \omega t$$

In the optical deflector 6 of this embodiment, the largest amplitude φmax of the deflecting surface 6a is ±36 degrees. The range of ±22.5 degrees out of this amplitude is chosen as an effective deflection angle, and it is used for the image writing.

Generally, in many cases, an arcsine lens is used an imaging lens for converting a light beam deflectively reflected by a sine-oscillation optical deflector into a uniform-motion light beam on the surface to be scanned. Arcsine lenses have an optical characteristic that, as compared with the scan central portion of the surface to be scanned, the F-No. (F number) of the scan end portion of the surface to be scanned with respect to the main scan direction is liable to become larger. This leads to a problem that, as compared with the spot diameter, in the main scan direction, in the scan centreal portion of the surface to be scanned, the spot diameter in the scan end portion of the surface to be scanned, with respect to the main scan direction, becomes larger.

This is a phenomenon that results from scanning the light beam, having a sinusoidally changing angular speed, at uniform speed on the surface to be scanned. If there is irregularity in the spot diameter in the scan direction, on the surface to be scanned as described above, it causes various inconveniences such as deterioration of gradation reproducibility of a half-tone image, local deterioration of linewidth reproducibility of fine lines, and so on.

In this embodiment, in order to meet these, the imaging lens is provided by f-θ lenses 71 and 72 having a characteristic that, inside the effective scan region, the spot diameter in the main scan direction on the surface to be scanned can be kept constant.

On the other hand, if an f-θ lens is used simply as an imaging lens in combination with a sine-oscillation optical deflector 6, it raises a problem that, as compared with the scan central portion (optical axis of the f-θ lens system 7) on the photosensitive drum surface 8, the scan speed at the scan end portion becomes slower to cause contraction of an image in the main scan direction.

In this embodiment, in order to meet this, the modulation clock of the semiconductor laser 1 is changed continuously in synchronism with the scan position, in the main scan direction, on the photosensitive drum surface 8. The inconvenience described above is removed by this.

With the structure described above, undesirable irregularity of the spot diameter in the main scan direction on the photosensitive drum surface 8 as described above can be avoided completely. As a result, inconveniences such as deterioration of gradation reproducibility of a half-tone image, local deterioration of linewidth reproducibility of fine lines, and so on, are removed assuredly.

Furthermore, the slowdown of the scan speed in the scan end portion (largest image height portion) on the photosensitive drum surface 8 as compared with the scan central portion on the photosensitive drum surface 8 means that the exposure energy on the photosensitive drum surface 8 at the scan end portion becomes larger. From this, it is seen that the gradation reproducibility of a half-tone image can be improved by the control that the quantity of light emission of the semiconductor laser 1 is continuously decreased at the scan end portion (largest image height region).

Figure 2:
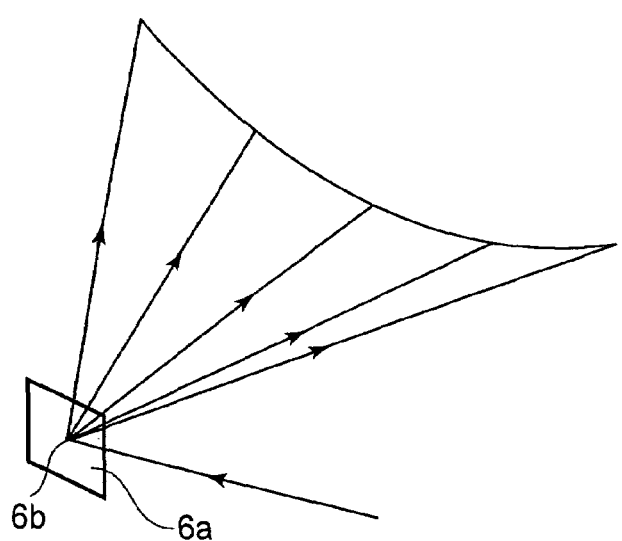
FIG. 2 is a schematic view for explaining the state of a light beam as reflected by a deflecting surface, according to the first embodiment of the present invention.

In this embodiment, as described above, the light beam deflectively reflected by the deflecting surface 6a is directed upwardly in the sub-scan direction (upward in the sheet of FIG. 1), while an angle 2 deg. (2°) is defined in the sub-scan direction and with respect to the plane-normal-line of the deflecting surface 6a. FIG. 2 schematically illustrates this.

It is seen from FIG. 2 that the light beam deflectively reflected by the deflecting surface 6a defines a conical plane having its vertex placed at the deflective reflection point 6b on the deflecting surface 6a. Hence, on the plane where the light beam enters the lens, the deflectively reflected light beam forms a locus which is curved in the sub-scan direction.

If such light beam enters the f-θ lens system 7, the scan line on the photosensitive drum surface 8 would be curved in the sub-scan direction. Furthermore, there is an inconvenience that, if a light beam scanning along a conical plane enters the f-θ lens system 7, in the scan center portion the light beam can be normally focused into a spot-like shape; whereas, as the light beam comes close to the scan end portion, the shape of the focused spot would be deteriorated as shown in FIG. 3.

Figure 3:
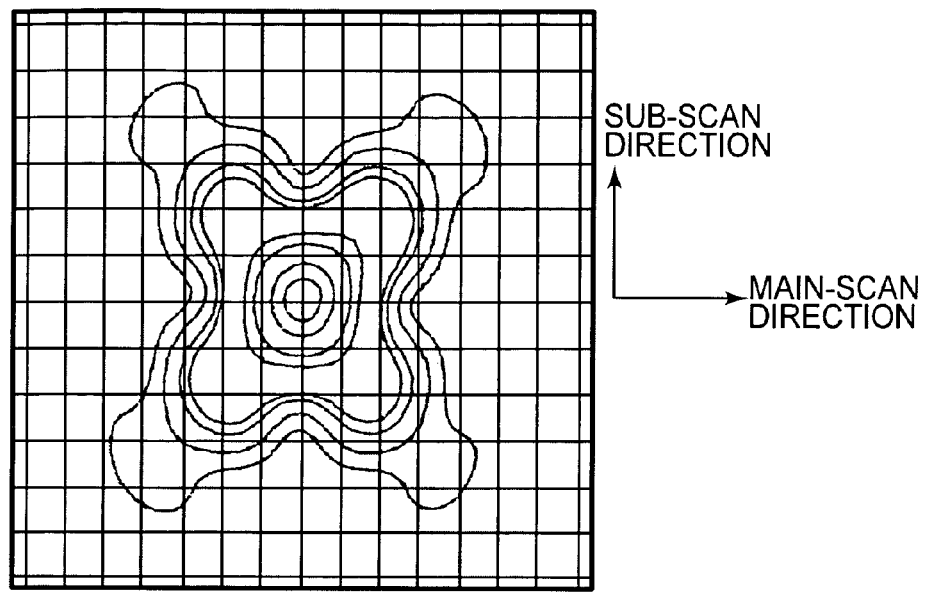
FIG. 3 is a schematic view, showing the shape of a light spot in the scan end portion, according to the first embodiment of the present invention.

FIG. 3 illustrates contour lines in terms of intensity distribution of a focused spot, being deteriorated, in the scan end portion on the surface to be scanned.

The contour lines in FIG. 3 depict intensities having been sliced with respect to the levels of (from the outside) 0.02, 0.05, 0.1, 0.1353, 0.3679, 0.5, 0.75 and 0.9, respectively, with the peak intensity of the focused spot being standardized to 1. In FIG. 3, the lateral direction corresponds to the main scan direction along which the focused spot scans, and the longitudinal direction corresponds to the sub-scan direction which is orthogonal to the main scan direction.

Figure 4:
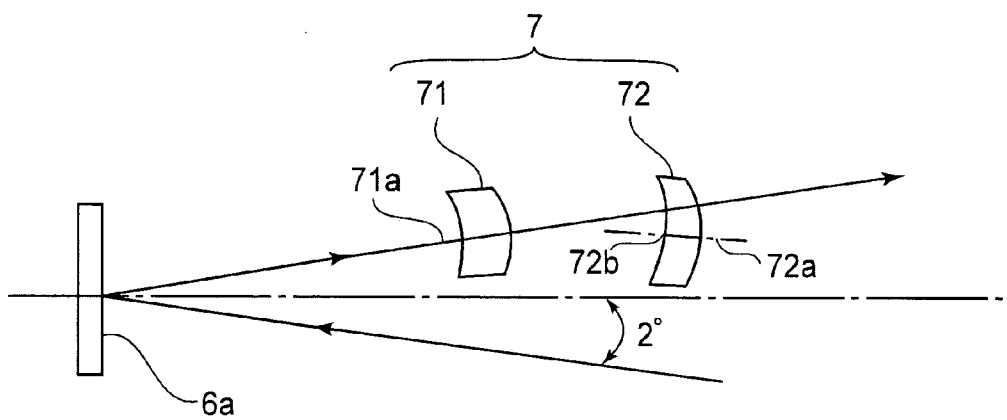
FIG. 4 is a schematic view, showing disposition of lenses of an imaging optical system in the sub-scan direction, according to the first embodiment of the present invention.

In this embodiment, as shown in FIG. 4, of the first and second f-θ lenses 71 and 72, the optical axis 71a of the first f-θ lens 71 is disposed with an upward angle of 2 degrees so that it coincides with the principal ray of the light beam deflectively reflected by the deflecting surface 6a toward the scan center on the surface to be scanned. Namely, about the axis of the main scan direction, it is upwardly and rotationally shifted by 2 deg. (2°) in the sub-scan section and with respect to the normal of the deflecting surface 6a.

On the other hand, the optical axis 72a of the second f-θ lens 72 is disposed with a downward tilt of an angle 1.83383, in the opposite direction to the first f-θ lens 71, in the sub-scan section and with respect to a plane which is orthogonal to the rotational axis of the deflecting surface 6a. Namely, about the axis of the main scan direction, it is downwardly and rotationally shifted by 1.83383 deg. in the sub-scan section and with respect to the normal to the deflecting surface 6a.

Furthermore, the second f-θ lens 72 is disposed with a shift of a predetermined amount in the sub-scan direction, so as to make it sure that the light beam is incident at a position above the plane vertex 72b, in the sub-scan section, of the first surface (light entrance surface) of the second f-θ lens 72.

With the arrangement described above, curvature of scan lines on the photosensitive drum in the sub-scan direction as well as deterioration of focused spots at the scan end portion on the surface to be scanned are both well corrected.

Next, the optical deflector 6 of this embodiment will be explained in greater detail. As described hereinbefore, the optical deflector 6 comprises a resonance type optical deflector, having its deflecting surface 6a configured to perform reciprocating sine motion based on resonance.

Figure 5:
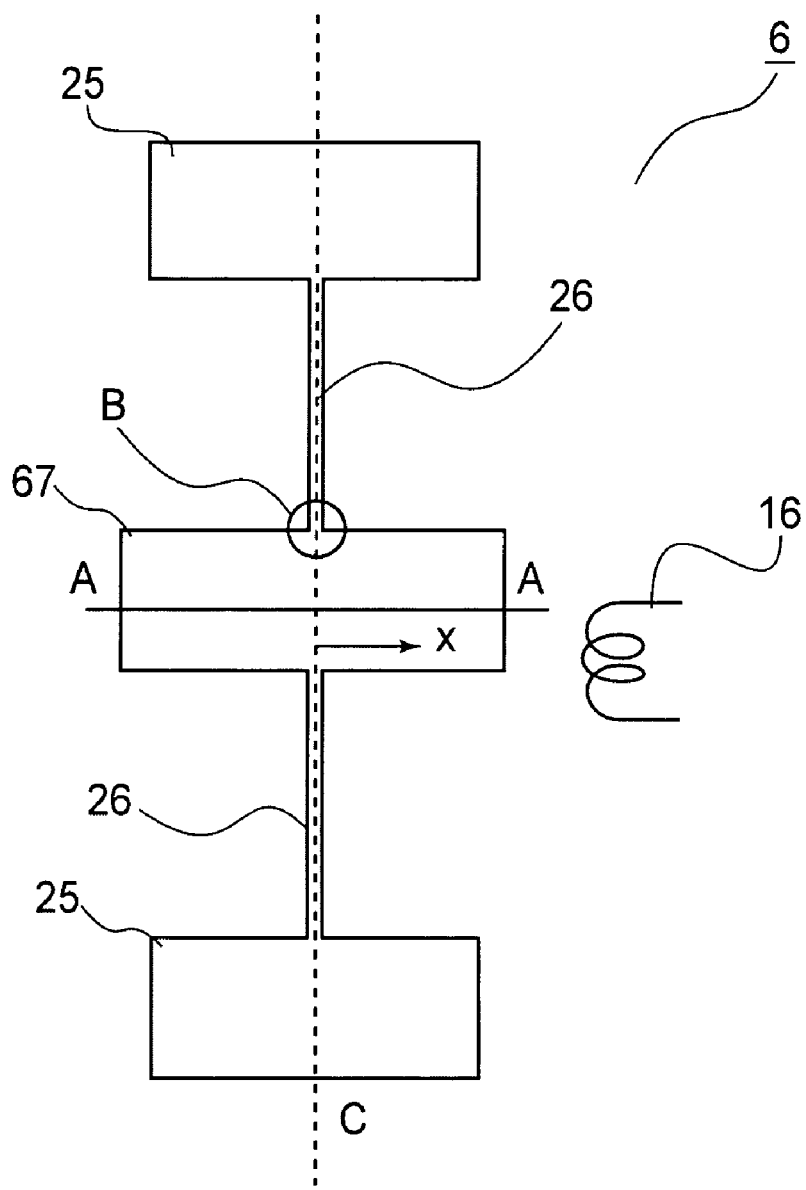
FIG. 5 is a schematic view, showing details of an optical deflector according to the first embodiment of the present invention.

FIG. 5 shows details of the optical deflector 6 in this sembodiment. As shown in FIG. 5, the optical deflector 6 comprises a movable plate 67 and a torsion spring 26 for resiliently supporting the movable plate 67 and mechanical ground supports 25. All of these components are torsionally oscillated by driving means 16 around a torsional axis C (an axis parallel to the sub-scan direction). The driving means 16 may comprise a fixed electromagnet coil and a movable magnet mounted on the movable plate 67, for example.

The movable plate 67 is provided with a deflecting surface (not shown) for deflecting the light beam, and the light beam from the light source means 1 is deflectively scanned on the basis of the torsional oscillation of the movable plate 67.

Generally, in optical deflectors for which high-speed motion is required, the deflecting surface thereof receives large angular acceleration since it is torsionally oscillated within a particular angle. Hence, during the drive, an inertia force due to the dead weight thereof is applied to the deflecting surface such that the deflecting surface would be distorted largely.

Figure 6A:
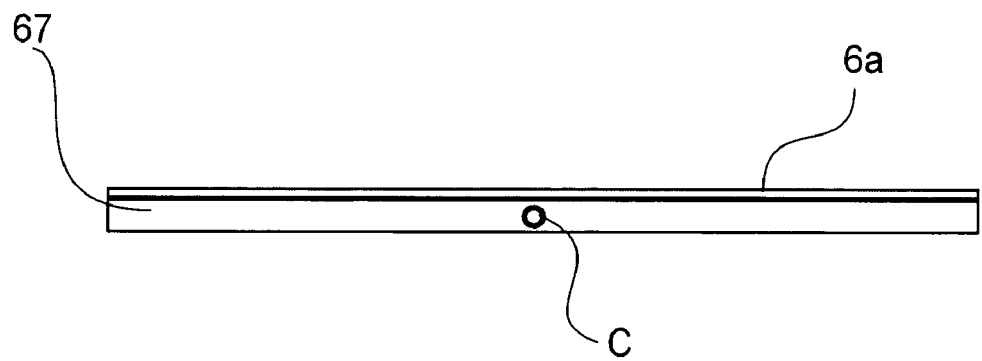
FIG. 6A is a sectional view of a movable plate of an optical deflector according to the first embodiment of the present invention.

FIG. 6A is a sectional view, taken along a line A-A in FIG. 5, of the movable plate 67 in a case where it comprises a flat plate (rectangular parallelepiped).

The optical deflector 6 of this embodiment is driven near the resonance frequency and is torsionally oscillated. Hence, the deflection angle of the movable plate 67 with respect to time changes sinusoidally. Thus, at the moment whereat a largest angular speed is applied (e.g., largest deflection angle in the case of sine oscillation), largest deformation occurs.

Figure 6B:
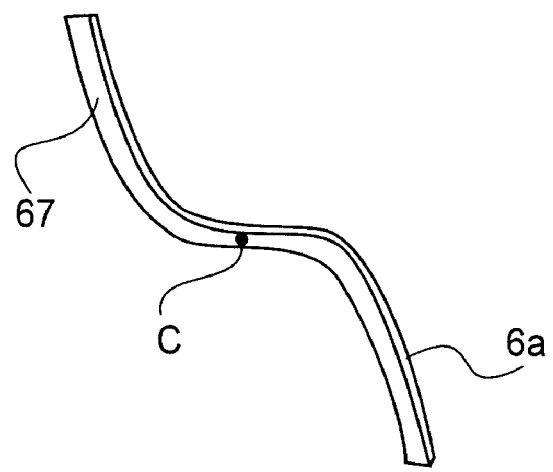
FIG. 6B is a schematic view for explaining deformation of the movable plate of the optical deflector according to the first embodiment of the present invention.
Figure 7:
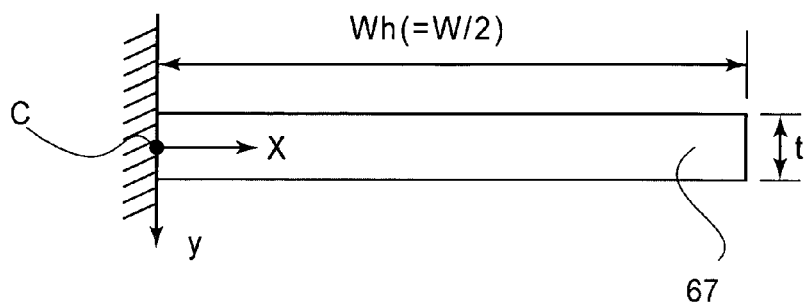
FIG. 7 is a schematic view, showing an approximation model prepared to consider deformation of the movable plate, in the first embodiment of the present invention.

FIG. 6B shows deformation of the movable plate 67 at that moment. It is seen from FIG. 6B that, if the movable plate 67 deforms, the deflecting surface 6a formed on the movable plate 67 is deformed similarly.

Where the movable plate 67 comprises a rectangular parallelepiped, deformation of the movable plate 67 during torsional oscillation can be explained by using an approximation model shown in FIG. 7.

The illustration made in FIG. 7 corresponds specifically to the right-hand half of the sectional view of the movable plate 67 in FIG. 6A. The deformation of the movable plate 67 is point-symmetrical about the torsional axis C, and it can be approximated as a deformation of a structural beam having its central portion fixed-end supported as illustrated in the drawing.

When an angular acceleration $\theta \times (2\pi f)^2$ (where θ is the deflection angle and f is a torsional oscillation frequency) is applied to the movable plate 67 due to torsional oscillation, a resultant deformation (distortion) y of the structual beam shown in FIG. 7 can be given by Equation (1) below.

$$y = 12 \cdot \theta \cdot (2\pi f)^2 \cdot \frac{\rho W_h^5}{Et^2} \left( \frac{x^5}{120} - \frac{x^3}{12} + \frac{x^2}{6} \right) \quad (1)$$

wherein:

x is the distance from the torsional axis C shown in FIG. 7;

ρ is the density of the movable plate 67;

E is the Young's modulus of the movable plate 67;

t is the thickness of the movable plate 67; and $W_h$ is a half value of the width D of the deflecting surface in the main scan direction.

From Equation (1) it is seen that, since the deformation (distortion) y is proportional to the deflection angle θ, the fifth power of $W_h$ and the square of the frequency f, the influence of deformation of the movable plate 67 due to the dead weight thereof would be notable in a case where the width of the deflection surface in the main scan direction is large (namely, the deflection surface opening is large), a case where the deflection angle is large and a case where high frequency drive is necessary.

The optical deflector 6 of this embodiment is arranged so that the natural oscillation frequency of the torsional oscillation is 2 KHz, the width (the value of aforementioned W) of the movable plate 67 in the main scan direction is 3 mm, the width thereof in the sub-scan direction is 1 mm, and the thickness t is 200 μm. As described above, the movable plate 67 receives an inertia force due to the dead weight thereof during the oscillation, and it is deformed thereby.

Figure 8:
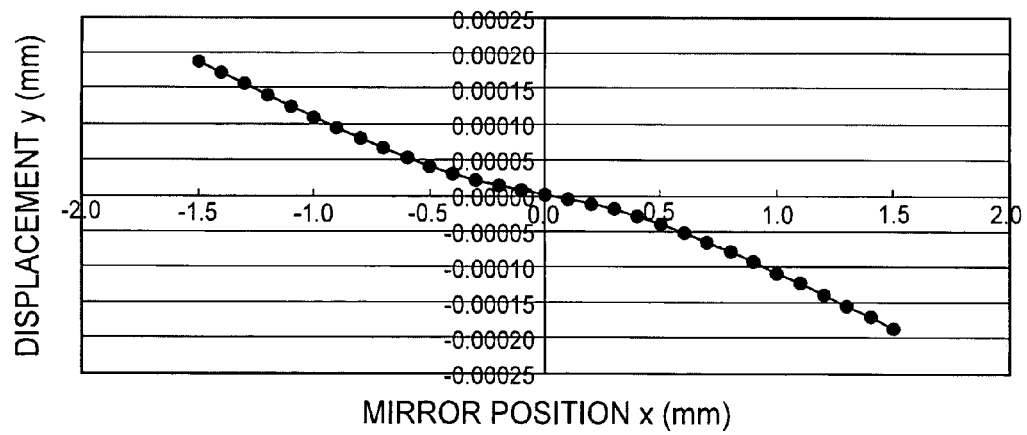
FIG. 8 is a graph, showing the result of calculation made to deformation of the movable plate of the first embodiment of the present invention, in accordance with the finite element method.

FIG. 8 is a graph showing the result of calculation made to the deformation of the movable plate 67 in accordance with the finite element method. It shows deformation of the A-A section in FIG. 5 in a case where the mechanical effective deflection angle during 2 KHz driving is +22.5 degrees. Here, the tilt of connection between the torsion spring 26 and the movable plate 67 (that is, the portion B in FIG. 5) was taken as zero.

Here, definitions of the scan angle and the deflection angle are given as follows.

The scan angle can be specified as an angle defined in the main scan section and between the optical axis of the imaging optical system 7 and the principal ray of the light beam deflectively scanned by the deflecting surface of the optical deflector 6. Hence, the scan angle is twice the deflection angle (oscillation angle).

Here, it is assumed that, while taking the scan center (optical axis of the imaging optical system 7) of the scan line on the surface to be scanned as a center, the deflection angle at the scan-line-writing-start-position side on the surface to be scanned (upper in the sheet of FIG. 1 and on the opposite side of the input optical system LA) has a positive (+) sign.

On the other hand, it is assumed that, while taking the scan center (optical axis of the imaging optical system 7) of the scan line on the surface to be scanned as a center, the deflection angle at the scan-line-writing-end-position side on the surface to be scanned (lower in the sheet of FIG. 1 and at the input optical system LA side) has a negative (−) sign.

The direction of positive sign of y in FIG. 8 corresponds to the advancement direction (rightward direction in the drawing) of the light beam reflected by the deflecting surface 6a in FIG. 1, whereas the direction of positive sign of x corresponds to the scan-line-writing-start-position side of the deflecting surface 6a in FIG. 1 (upper in the sheet of FIG. 1 and on the opposite side of the input optical system LA).

Figure 9:
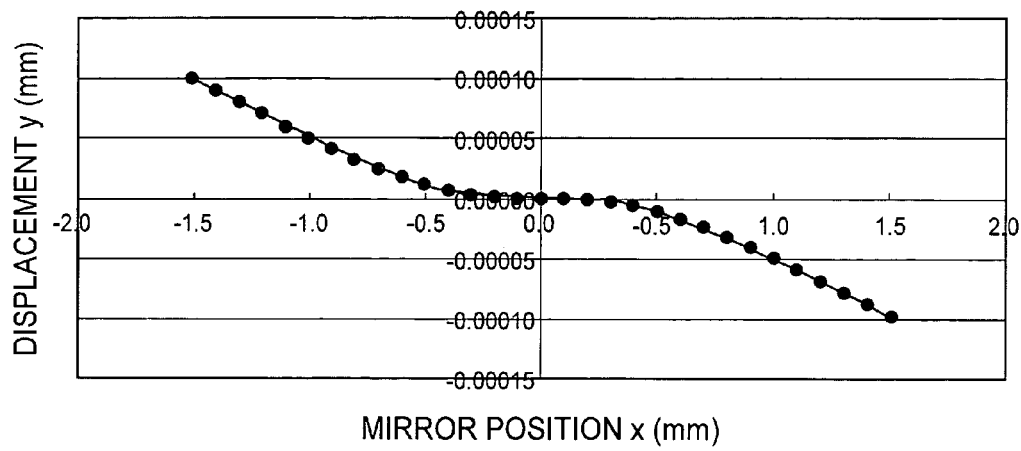
FIG. 9 is a graph for explaining deformation of the movable plate where the tilt at the origin in FIG. 8 is taken as zero.

FIG. 9 is a graph showing deformation of the A-A section in FIG. 5, wherein the tilt at the origin in the graph of FIG. 8 is taken as zero. It is seen in FIG. 9 that a deformation analogous to the deformation y given by Equation (1) above was obtained, and that the movable plate 67 was deformed by torsional oscillation.

Here, if the deflecting surface 6a of the optical deflector 6 is being deformed such as shown in FIG. 9, the light beam reflected by the deflecting surface 6a would have wavefront aberration of an amount twice the deformation y shown in FIG. 9. Hence, an adverse influence would be exerted to the focused spot on the photosensitive drum surface 8.

Actually, from FIG. 9, it is seen that coma of wavefront aberration was being produced.

In optical scanning systems having a rotational polygonal mirror as an optical deflector 6, since the rotational polygonal mirror is being rotated at a constant angular speed, the angular acceleration is continuously zero. Hence, a large angular acceleration is not put on it as compared with optical deflectors using sine oscillation. Normally, therefore, wavefront aberraton such as mentioned above would not be produced.

For these reasons, when an imaging lens to be used in optical scanning systems having a rotational polygonal mirror is designed, in many cases no particular attention is paid to the deformation of the deflecting surface.

However, if an optical deflector having sine oscillation is used in combination with an imaging lens having been designed as above (namely, without paying attention to deformation of the deflecting surface), due to wavefront aberration caused by deformation of the deflecting surface 6a the focused spot would be deteriorated.

Figure 10:
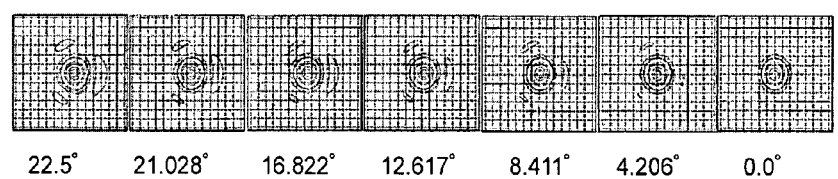
FIG. 10 is a schematic view, showing profiles of spots at respective scan positions on the surface to be scanned, in the first embodiment of the present invention.

FIG. 10 shows an example wherein an imaging lens having been designed to be used with a rotational polygonal mirror is used and, on the other hand, an optical deflector according to this embodiment (natural oscillation frequency of the torsion oscillation is 2 KHz, the width W of the movable plate in the main scan direction is 3 mm, the width thereof in the sub-scan direction is 1 mm, and the thickness t is 200 μm) is used as an optical deflector.

FIG. 10 illustrates the shapes of spots on the photosensitive drum 8 surface where the mechanical deflection angle is +22.5 degrees, +21.028 degrees, +16.822 degrees, +12.617 degrees, +8.411 degrees, +4.206 degrees and 0.0 degree, respectively.

Furthermore, similarly to FIG. 3, contours of the intensity distribution of each spot are illustrated there. These contours correspond to the intensities being sliced with respect to the levels of (from the outside) 0.02, 0.05, 0.1, 0.1353, 0.3679, 0.5, 0.75 and 0.9, respectively, when the peak intensity of the focused spot is standardized to 1.

Figure 11:
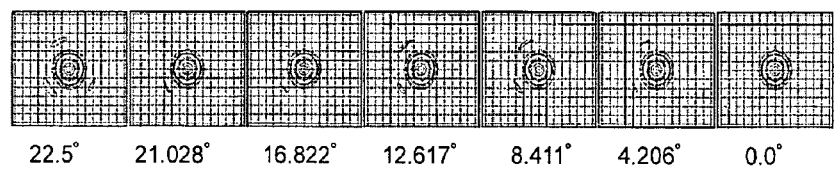
FIG. 11 is a schematic view, showing profiles of spots at respective scan positions on the surface to be scanned, in a comparative example.

As a comparative example, FIG. 11 shows shapes of spots on the photosensitive drum surface 8 in a case where the same imaging lens is used and the deflecting surface 6a is not deformed at all. In these drawings, similarly to FIG. 3, the lateral direction corresponds to the main scan direction along which the spot scans the surface, while the longitudinal direction corresponds to the sub-scan direction which is orthogonal to the main-scan direction.

It is seen from FIGS. 10 and 11 that the spot shapes in FIG. 10 where the deflecting surface 6a is being deformed include a large sidelobe in the main scan direction, as compared with the shapes of the focused spots shown in FIG. 11 where the deflecting surface 6a is not deformed at all.

In addition to this, the outer configuration itself of the focused spot is distorted asymmetrically, and the shape of the focused spot is deteriorated seriously. Furthermore, in the case of effective deflection angle +22.5 degrees, the peak intensity of the sidelobe exceeds 0.05 (namely, 5% of the peak intensity of the main spot).

It is well known that the image quality degrades as the peak intensity of a sidelobe becomes large. Particularly, when the peak intensity of the sidelobe exceeds 5% with respect to the peak intensity of a main spot, deterioration of image quality becomes quite large. This is undesirable for optical scanning systems image forming apparatuses where high quality image output is required.

Also it is seen that the larger the deflection angle is, the larger the deterioration of the spot shape of the focused spot is. The reason is that, as described hereinbefore, the larger the largest deflection angle of the deflecting surface is, the larger the deformation of the deflection surface is.

In this embodiment, to meet this, the effective deflection angle of the deflecting surface corresponding to the end portion (largest image height) of the scan line inside the effective image region on the surface to be scanned is made equal to ±22.5 degrees.

In order to reduce deterioration of the spot shape of the focused spot, the effective deflection angle of the deflecting surface should preferably be made not greater than ±30 degrees.

As described above, if an optical deflector having sine oscillation is used in combination with an imaging lens having been designed without attention to deformation of the deflecting surface, the focused spot would be deteriorated due to the wavefront aberration resulting from deformation of the deflecting surface 6a. If this occurs, it becomes very difficult to accomplish optical scanning systems or image forming apparatuses which are required to produce high quality image outputs.

The first and second f-θ lenses 71 and 72 of this embodiment shown in FIG. 1 are configured to reduce the amount of wavefront aberration produced by the deflection surface 6a, being distorted as shown in FIG. 9 due to application of large angular acceleration thereto as a result of its sine oscillation.

Here, in this embodiment, the term "first direction" is now used to refer to the direction of the phase difference of wavefront aberration in the main scan direction between a marginal ray and a principal ray of the light beam reflected by the deflecting surface 6a at an effective deflection angle of the same, the phase difference being produced as a result of reflection of the light beam by that deflecting surface. Furthermore, the term "second direction" is used to refer to the direction of the phase difference of wavefront aberration in the main scan direction between a marginal ray and a principal ray of the light beam reflected by the deflecting surface 6a at an effective deflection angle thereof, the phase difference being produced as a result of transmission of the light beam through the imaging optical system 7.

Then, in this embodiment, at least one optical system inside the imaging optical system 7 is provided with at least one optical surface having non-arculate shape in the main scan section, so as to assure that the first and second directions mentioned above are made opposite to each other.

Here, the words "light beam reflected by the deflecting surface at an effective deflection angle thereof" refer to a light beam that reaches the scan end portion (largest image height) of the scan line inside the effective image region on the surface to be scanned.

The optical principle for that will be explained below.

Figure 12:
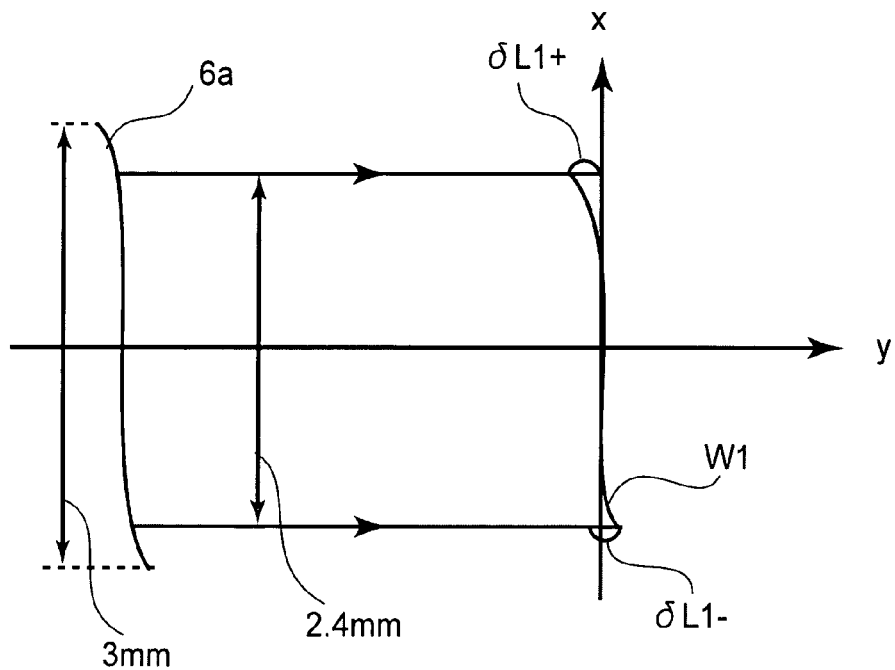
FIG. 12 is a schematic view for explaining the shape of the wavefront (equi-phase plane) of a light beam in the main scan direction, after being reflected by a flexed distorted deflecting surface.

FIG. 12 is a schematic view, showing the shape W1 of the wavefront (equi-phase plane) in the main scan direction, of the light beam after an inputted parallel light beam (plane wave) is reflected by the distorted deflecting surface 6a as shown in FIG. 9.

The direction y in FIG. 12 corresponds to the direction of displacement amount y which is taken on the axis of ordinates in the graph of FIG. 9. The state of advancement of the light beam being reflected in the positive (+) direction of the displacement amount y is illustrated there. The positive (+) direction along the x direction in FIG. 12 corresponds to the positive (+) direction along the x axis of the graph of FIG. 9.

In this example, toward a width 3 mm of the deflecting surface 6a in the main scan direction (x direction), a light beam of a width corresponding to the width 2.4 mm of the effective reflecting surface is projected.

As seen from FIG. 12, the shape of the wavefront (equi-phase plane) of the light beam in the main scan direction after it is reflected by the distorted deflection surface 6a is being deformed by an amount twice the distorted shape of the deflection surface 6a.

More specifically, differences $\delta L1_+$ and $\delta L1_-$ are produced in the optical path length at the light beam end portions (marginal rays) in the main scan direction (x direction in FIG. 12), with respect to that of the light beam central portion (principal ray of the light beam).

Here, $\delta L1_+$ refers to the optical path difference at the positive (upper) side in the main scan direction, and $\delta L1_-$ refers to the optical path difference at the negative (lower) side in the main scan direction. The marginal ray at the positive (upper) side in the main scan direction can be defined as a marginal ray at the scan-line-writing-start-position side (upper in FIG. 3 and opposite to the input optical system LA) with respect to the principal ray of the light beam. Also, the marginal ray at the negative (lower) side in the main scan direction can be defined as a marginal ray at the scan-line-writing-end-position side (lower in FIG. 1 and at the input optical system LA side).

Next, the shape of the wavefront (equi-phase plane) after a parallel light beam (plane wave) passed through the f-θ lens system 7 will be considered.

Figure 13:
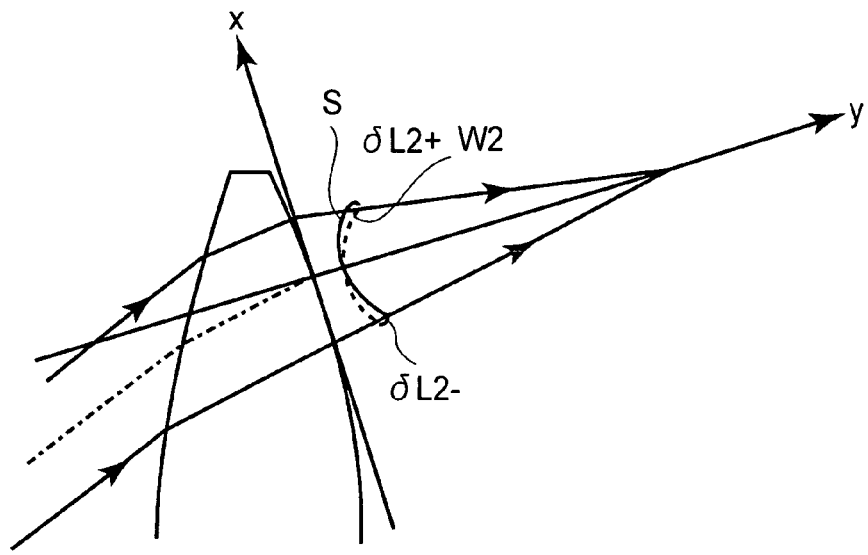
FIG. 13 is a schematic view for explaining the shape of the wavefront (equi-phase plane) defined after a parallel light beam (plane wave) passed through an f-θ lens system.

FIG. 13 is a schematic view, showing the shape of the wavefront (plane wave) after a parallel light beam (plane wave) passes through the f-θ lens system 7, in a case where the effective deflection angle of the deflecting surface 6a is +22.5 degrees (at the scan-line-writing-start-position side). If the f-θ lens system 7 is an idealistic lens having no aberration, the wavefront (equi-phase plane) after passing through the f-θ lens system 7 forms a spherical wave S (solid line). Here, the wavefront (equi-phase plane) after passing through the f-θ lens system 7 is shaped such as shown at W2 in FIG. 13 (broken line); that is, differences $\delta L2_+$ and $\delta L2_-$ are produced in the optical path length of the light beam end portions (marginal rays) in the main scan direction (x direction in FIG. 13), relative to the light beam central portion (principal ray of the light beam). Also, $\delta L2_+$ refers to the optical path difference at the positive (upper) side (+x direction in FIG. 12) in the main scan direction, and $\delta L2_-$ refers to the optical path difference at the negative (lower) side (-x direction in FIG. 12) in the main scan direction.

As seen from FIG. 13, on the basis of the optical path differences of the wavefront (equi-phase plane) after passing through the f-θ lens system 7, with respect to the spherical wave S (solid line), the wavefront (equi-phase plane) of the light beam in the main scan direction being reflected by the distorted deflecting surface 6a as shown in FIG. 12 is reduced. In other words, the wavefront aberration produced by the distorted deflecting surface 6a is corrected when the same passes through the f-θ lens system 7.

Here, in order to make it sure that the wavefront aberration produced by the distorted deflecting surface 6a is well corrected when the light beam passes through the f-θ lens system 7, the following condition should preferably be satisfied.

$$0.8 \leq \frac{\delta L2_- - \delta L2_+}{\delta L1_+ - \delta L1_-} \leq 1.2 \qquad (2)$$

More preferably, $$0.9 \leq \frac{\delta L2_- - \delta L2_+}{\delta L1_+ - \delta L1_-} \leq 1.1 \qquad (3)$$

Figure 14:
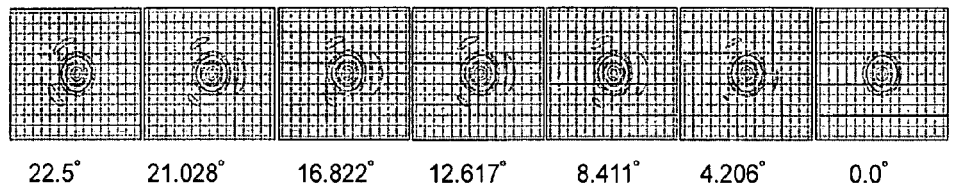
FIG. 14 is a schematic view, showing profiles of spots at respective scan positions on the surface to be scanned, in the first embodiment of the present invention.

FIG. 14 shows the shapes of focused spots on the photosensitive drum surface 8 according to this embodiment of the present invention.

In accordance with this embodiment, the wavefront aberration produced by the deflecting surface 6a being distorted by large angular acceleration applied thereto in response to sine oscillation, is reduced by means of the f-θ lens system 7. As a result of this, it is seen from FIG. 14 that, as compared with the spot shapes of the focused spots shown in FIG. 10, the sidelobes have been diminished and the outer configuration of the focused spots itself has been improved. Particularly, at +22.5 degrees which is an effective deflection angle, the sidelobe having 5% peak intensity as shown in FIG. 9 has been corrected completely.

Figure 15:
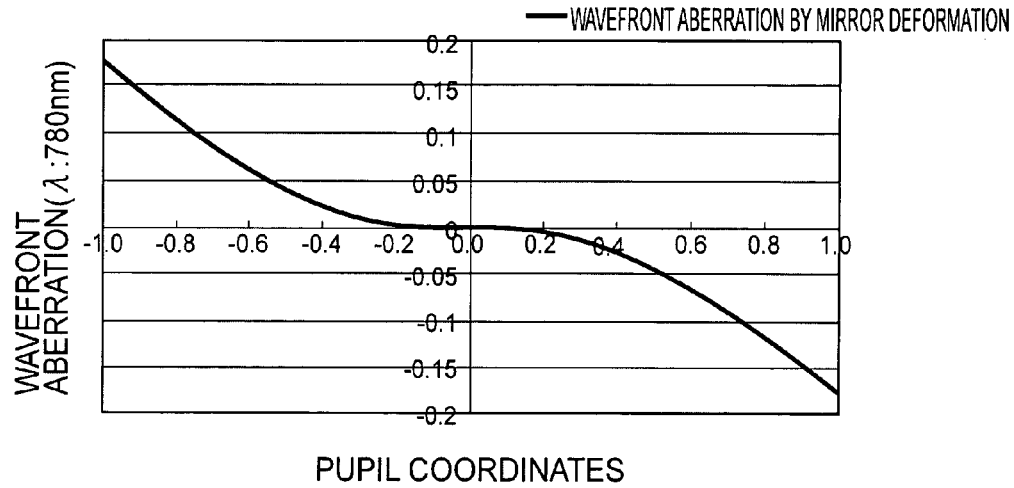
FIG. 15 is a graph for explaining wavefront aberration as produced by deformation of the deflecting surface, in the first embodiment of the present invention.

FIG. 15 is a graph, showing wavefront aberration (here, differences of an actual wavefront having been influenced by the deformation, with respect to an idealistic plane wave) being produced by deformation of the deflecting surface 6a at an effective deflection angle +22.5 deg. of the same, in this embodiment. The axis of abscissa of the graph (unit: mm) corresponds to the pupil coordinates, in the main scan direction, at the entrance pupil position of the optical system, wherein the pupil diameter 1.2 mm has been standardized to 1.

It is seen from FIG. 15 that there is coma of wavefront aberration.

The axis of ordinates denotes the amount of wavefront aberration, and the unit is λ (780 nm). As regards the direction of the wavefront aberration, the direction of any delay of the actual wavefront relative to the idealistic wavefront with respect to the wavefront advancement direction is taken as negative (-).

It is seen that, since the deflecting surface 6a is being deformed such as shown in FIG. 9, a large wavefront aberration is being produced there.

Figure 16:
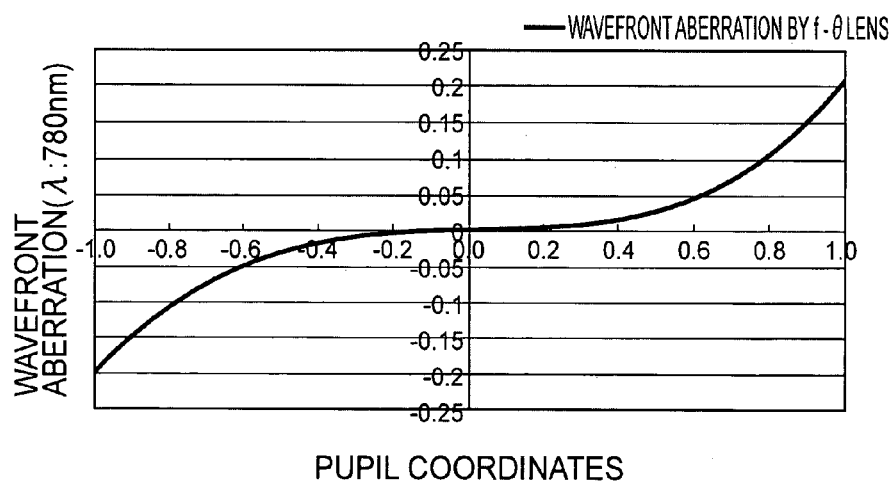
FIG. 16 is a graph for explaining wavefront aberration as produced by an f-θ lens according to the first embodiment of the present invention.

FIG. 16 is a graph, showing wavefront aberration (differences of the actual wavefront to the spherical wave S described hereinbefore) being produced after a parallel light beam (plane wave) passes through the f-θ lens system 7 where the effective deflection angle is +22.5 deg. in this embodiment.

Like FIG. 15, the axis of abscissa of the graph corresponds to the pupil coordinates, in the main scan direction, at the entrance pupil position of the optical system, wherein the pupil diameter 1.2 mm has been standardized to 1. The axis of ordinates denotes the amount of wavefront aberration, and the unit is λ (780 nm). As regards the direction of the wavefront aberration, the direction of any delay of the actual wavefront relative to the idealistic wavefront with respect to the wavefront advancement direction is taken as negative (−).

The f-θ lens system 7 of this embodiment is configured to positively produce a wavefront aberration of the same amount as the wavefront aberration produced by the deformation of the deflecting surface 6a shown in FIG. 15, and in the opposite direction (cancelling direction).

Figure 17:
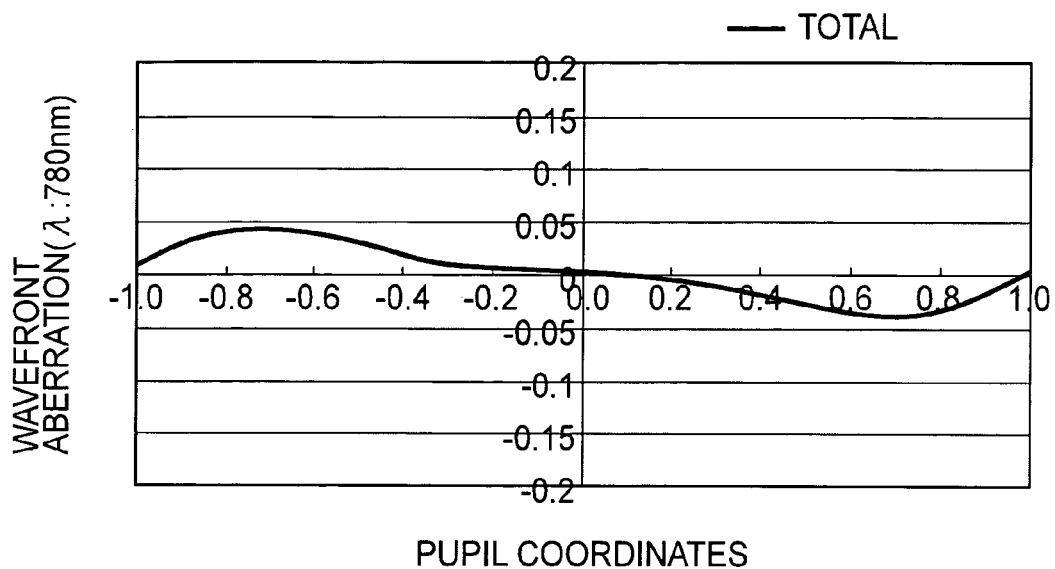
FIG. 17 is a graph for explaining wavefront aberration that can be provided by correcting the wavefront aberration produced by deformation of the deflecting surface, in the first embodiment of the present invention.

FIG. 17 is a graph, showing wavefront aberration (differences of the actual wavefront to the spherical wave S described hereinbefore) being produced after a light beam having wavefront aberration produced as a result of deformation of the deflecting surface 6a passes through the f-θ lens system 7. Like FIG. 15, the axis of abscissa of the graph corresponds to the pupil coordinates, in the main scan direction, at the entrance pupil position of the optical system, wherein the pupil diameter 1.2 mm has been standardized to 1. The axis of ordinates denotes the amount of wavefront aberration, and the unit is λ (780 nm). As regards the direction of the wavefront aberration, the direction of any delay of the actual wavefront relative to the idealistic wavefront with respect to the wavefront advancement direction is taken as negative (−).

It is seen from FIG. 17 that the wavefront aberration produced due to the deformation of the deflecting surface 6a shown in FIG. 15 is compensated by positively producing, through the f-θ lens, a wavefront aberration of the same amount as the wavefront aberration produced by the deformation of the deflecting surface 6a and in the opposite direction (cancelling direction) as shown in FIG. 16. By this, good wavefront aberration is accomplished.

In this embodiment, a first wavefront aberration produced as a result of deformation of the deflecting surface 6a of the optical deflector 6 based on sine oscillation, is compensated by positively producing, through the f-θ lens system 7, a wavefront aberration of the same amount as the first wavefront aberration and in the opposite direction thereto.

Here, in this embodiment, first, $\delta L1_+$ is used to refer to the optical path difference between one of marginal rays (upper light ray) and the principal ray of the light beam reflected by the deflecting surface at an effective deflection angle +22.5 deg. thereof, the difference being produced as a result of reflection of the light beam by the deflecting surface. Second, $\delta L1_-$ is used to refer to the optical path difference between the other marginal ray (lower light ray) and the principal ray of the light beam reflected by the deflecting surface at an effective deflection angle +22.5 deg. thereof, the difference being produced as a result of reflection of the light beam by the deflecting surface.

Third, $\delta L2_+$ is used to refer to the optical path difference between one of marginal rays (upper light ray) and the principal ray of the light beam reflected by the deflecting surface at an effective deflection angle +22.5 deg. of the same, the difference being produced as a result of transmission of the light beam through the imaging optical system. Fourth, $\delta L2_-$ is used to refer to the optical path difference between the other marginal ray (lower light ray) and the principal ray of the light beam reflected by the deflecting surface at an effective deflection angle +22.5 deg. of the same, the difference being produced as a result of transmission of the light beam through the imaging optical system.

Then, the imaging optical system satisfies the following relation.

$$0.8 \leq \frac{\delta L2_- - \delta L2_+}{\delta L1_+ - \delta L1_-} \leq 1.2 \tag{4}$$

Although in this embodiment a case of effective deflection angle +22.5 deg. for the deflecting surface has been taken as an example and description has been made to demonstrate that Equation (4) above is satisfied, in this embodiment Equation (4) can still be satisfied where the effective deflection angle of the deflecting surface is −22.5 deg. Furthermore, it should be noted that in this embodiment Equation (4) is satisfied with all deflection angles which are within the effective deflection angle range of ±22.5 degrees.

Here, the words "light beam reflected by the deflecting surface at an effective deflection angle thereof" refer to a light beam that reaches the scan end portion (largest image height) of the scan line inside the effective image region on the surface to be scanned.

It is seen from the above that the amount of wavefront aberration produced by deformation of the deflecting surface 6a can be reduced significantly.

In accordance with this embodiment of the present invention as described hereinbefore, optical scanning systems or image forming apparatuses are accomplished by which high speed scan is attainable while using an optical deflector 6 based on sine oscillation and by which deterioration of image quality is reduced or avoided and high quality image outputs can be produced.

Table 1-1 and Table 1-2 below show specifications of an optical system of an optical scanning system according to this embodiment of the present invention.

TABLE 1-1

| | | | | | | | |
|---|---|---|---|---|---|---|---|
| Used Reference Wavelength | λ(nm) | | | 780 | | | |
| No. of Light Emission Paints | n | | | 1 | | | |
| Position of Light Emission Points | x0(mm) | −29.38709 | y0(mm) | −75.99937 | z0(mm) | −3.57057 |
| Semiconductor Laser Cover Glass Refractive Index | n0 | | | 1.51072 | | | |
| Semiconductor Laser Cover Glass Thickness | deg(mm) | | | 0.25 | | | |
| Position of Stop | x1(mm) | −17.80914 | y1(mm) | −55.94578 | z1(mm) | −2.76195 |

TABLE 1-1-continued

| | | | | | | | |
|---|---|---|---|---|---|---|---|
| Shape of Stop | Elliptical | | Main-scan 2.4 mm × Sub-scan 1.72 mm | | | | |
| Light Emission Point to Collimator Lens 1st Surface Distance | d0(mm) | | 23.67000 | | | | |
| Collimator Lens 1st Surface Position | x2(mm) | −17.55930 | y2(mm) | −55.51303 | z2(mm) | −2.74450 | |
| Collimator Lens 2nd Surface Position | x3(mm) | −16.55991 | y3(mm) | −53.78204 | z3(mm) | −2.67470 | |
| Collimator Lens Thickness | d1(mm) | | 2.00000 | | | | |
| Collimator Lens Refractive Index | n1 | | 1.76203 | | | | |
| Collimator Lens 1st Surface Curvature Radius | R1(mm) | | 182.21200 | | | | |
| Collimator Lens 2nd Surface Curvature Radius | R2(mm) | | −20.83080 | | | | |
| Collimator Lens 2nd Surface to Cylindrical Lens 1st Surface Distance | d2(mm) | | 19.76000 | | | | |
| Cylindrical Lens 1st Surface Position | x4(mm) | −6.68592 | y4(mm) | −36.67980 | z4(mm) | −1.98508 | |
| Cylindrical Lens 2nd Surface Position | x5(mm) | −3.68775 | y5(mm) | −31.48681 | z5(mm) | −1.77569 | |
| Cylindrical Lens Thickness | d3(mm) | | 6.00000 | | | | |
| Cylindrical Lens Refractive Index | n2 | | 1.51072 | | | | |
| Cylindrical Lens 1st Surface Sub-Scan Direction Curvature Radius | Rs3(mm) | | 26.99300 | | | | |
| Cylindrical Lens 1st Surface Main-Scan Direction Curvature Radius | Rm3(mm) | | infinite | | | | |
| Cylindrical Lens 2nd Surface Curvature Radius | R4(mm) | | infinite | | | | |
| Cylindrical Lens 2nd Surface to Light Path Folding Mirror Distance | d4(mm) | | 36.38000 | | | | |
| Light Path Folding Mirror Position | x6(mm) | 14.49117 | y6(mm) | 0.00000 | z6(mm) | −0.50604 | |
| Light Path Folding Mirror Curvature Radius | R5(mm) | | infinite | | | | |
| Light Path Folding Mirror to Deflective Reflection Surface Distance | d5(mm) | | 14.50000 | | | | |
| Deflective Reflection Surface Position | x6(mm) | 0.00000 | y6(mm) | 0.00000 | z6(mm) | 0.00000 | |
| Deflective Reflection Surface to 1st f-θ Lens 1st Surface Distance | d6(mm) | | 24.50000 | | | | |
| 1st f-θ Lens 1st Surface Position | x6(mm) | 24.48508 | y6(mm) | 0.00000 | z6(mm) | 0.85504 | |
| 1st f-θ Lens 2nd Surface Position | x7(mm) | 32.48020 | y7(mm) | 0.00000 | z7(mm) | 1.13423 | |
| 1st f-θ Lens Thickness | d7(mm) | | 8.00000 | | | | |
| 1st f-θ Lens Refractive Index | n3 | | 1.52420 | | | | |
| 1st f-θ Lens 2nd Surface to 2nd f-θ Lens 1st Surface Distance | d8(mm) | | 15.00000 | | | | |
| 2nd f-θ Lens 1st Surface Position | x8(mm) | 47.47106 | y8(mm) | 0.00000 | z8(mm) | 1.11088 | |
| 2nd f-θ Lens 2nd Surface Position | x9(mm) | 54.46748 | y9(mm) | 0.00000 | z9(mm) | 0.88685 | |
| 2nd f-θ Lens Thickness | d9(mm) | | 7.00000 | | | | |
| 2nd f-θ Lens Refractive Index | n4 | | 1.52420 | | | | |
| 2nd f-θ Lens 2nd Surface to Scanned-Surfaced Distance | d10(mm) | | 173.72622 | | | | |
| Scanned-Surface Position | x10(mm) | 173.70276 | y10(mm) | 0.00000 | z10(mm) | 2.85489 | |
| f-θ Lens Main-Scan Direction Focal Length | f(mm) | | 135.75817 | | | | |
| Incidence Optical System Incidence Angle (Main-Scan Section) | γ(deg) | | 120.00000 | | | | |
| Incidence Optical System Oblique Incidence Angle (Sub-Scan Section) | β(deg) | | 2.00000 | | | | |
| 1st f-θ Lens Upward Angle (Sub-Scan Section) | δ(deg) | | 2.00000 | | | | |
| 1st f-θ Lens Downward Angle (Sub-Scan Section) | η(deg) | | 1.83383 | | | | |
| Optical Deflector Maximum Scan Angle | ζ(deg) | | 36.00000 | | | | |
| Optical Deflector Effective Scan Angle | ξ(deg) | | 22.50000 | | | | |

TABLE 1-1-continued

| | | |
|---|---|---|
| Optical Deflector Resonance Frequency | f0(KHz) | 2.00000 |
| Optical Deflector Deflective Reflection Surface Size | Oblong | Main-scan 3 mm × Sub-scan 1 mm (Thickness 0.2 mm) |

TABLE 1-2

| | 1st Surface | | 2nd Surface |
|---|---|---|---|
| | 1st f-θ Lens Shape | | |
| R | −61.83626 | R | −35.48526 |
| k | −5.87163E+00 | k | −2.45242E+00 |
| B4 | 3.76675E−06 | B4 | −3.86823E−07 |
| B6 | −1.30464E−10 | B6 | 2.56668E−09 |
| B8 | −1.27161E−13 | B8 | 3.57959E−13 |
| B10 | 5.42375E−18 | B10 | 0.00000E+00 |
| r | −62.21270 | r | −59.18750 |
| D2 | 2.50064E−03 | D2 | −9.00838E−05 |
| D4 | 4.47165E−06 | D4 | −1.99468E−06 |
| D6 | −3.38261E−09 | D6 | 3.02931E−09 |
| D8 | −2.44356E−12 | D8 | 3.76989E−13 |
| D10 | 2.15635E−14 | D10 | 6.61287E−16 |
| | 2nd f-θ Lens Shape | | |
| R | 77.24019 | R | 77.21539 |
| k | −1.11058E+00 | k | −1.40572E+01 |
| B4 | −4.81789E−06 | B4 | −3.14620E−06 |
| B6 | 2.28668E−09 | B6 | 1.22437E−09 |
| B8 | −7.53262E−13 | B8 | −3.42569E−13 |
| B10 | 9.70410E−17 | B10 | 2.45104E−17 |
| r | −37.74570 | r | −13.93790 |
| D2 | 3.67322E−03 | D2 | 1.33995E−03 |
| D4 | 3.51750E−06 | D4 | −1.12369E−06 |
| D6 | 8.37822E−10 | D6 | 6.90229E−10 |
| D8 | −4.71373E−13 | D8 | −2.56901E−13 |
| D10 | −9.72956E−17 | D10 | 3.91913E−17 |

With regard to the aspherical shape of the f-θ lens in the main scan section, the point of intersection between each lens surface and the optical axis is taken as an origin. The optical axis direction is taken as an X axis, the axis in the main scan section and being orthogonal to the optical axis is taken as a Y axis, and an axis in the sub-scan section and being orthogonal to the optical axis is taken as a Z axis.

Here, the following relation is given.

$$x = \frac{y^2/R}{1 + \left(1 - (1+k)(y/R)^2\right)^{1/2}} + \sum_{i=4}^{10} B_i y^i \quad (5)$$

wherein R is the curvature radius, and k and $B_4$-$B_{10}$ are aspherical coefficients.

Furthermore, the shape in the sub-scan section is such that the curvature radius r' at the lens surface coordinates of Y in the main scan direction can be given by the following equation.

$$r' = r\left(1 + \sum_{j=2}^{10} D_j y^j\right) \quad (6)$$

where r is the curvature radius on the optical axis, and $D_2$-$D_{10}$ are coefficients.

With regard to the non-arcuate shape of the f-θ lenses 71 and 72 in the main scan section, where the number of the optical surfaces (lens surfaces) that constitute the f-θ lens system is m and the surface shape of each optical surface in the main scan section is expressed by:

$$x = \frac{y^2/R}{1 + \left(1 - (1+k)(y/R)^2\right)^{1/2}} + \sum_{i=4}^{10} B_i y^i \quad (7)$$

the following conditions are satisfied.

If $Y < 0$ \quad (8)

$$\sum_{j=1}^{m}\left[U_j(N_j - 1)\left(\frac{dX}{dY_{(out)j}} + \frac{dX}{dY_{(in)j}} - 2\frac{dX}{dY_{(p)j}}\right)\right] < 0$$

If $Y > 0$ $$\sum_{j=1}^{m}\left[U_j(N_j - 1)\left(\frac{dX}{dY_{(out)j}} + \frac{dX}{dY_{(in)j}} - 2\frac{dX}{dY_{(p)j}}\right)\right] > 0$$

wherein $U_j$ is a coefficient and $U_j=-1$ if the optical surface is a transmission surface and it is a light entrance surface; $U_j=+1$ if the optical surface is a transmission surface and it is a light exit surface; and $U_j=+1$ if the optical surface is a reflection surface. Also, $N_j$ is a coefficient and $N_j$ is equal to the refractive index of the glass material if the optical surface is a transmission surface; and $N_j=2$ if the optical surface is a reflection surface.

Furthermore, in Equation (8), $dX/dY_{(out)j}$ is the tilt, in the main scan section, of the scan end portion with respect to the optical axis of the optical surface at the position where an outer scan marginal ray of the light beam, impinging on the largest scan position in the effective scan region on the surface to be scanned, passes through the j-th surface; $dX/dY_{(in)j}$ is the tilt, in the main scan section, of the scan central portion with respect to the optical axis of the optical surface at the position where an inner scan marginal ray of the light beam, impinging on the largest scan position in the effective scan region on the surface to be scanned, passes through the j-th surface; and $dX/dY_{(p)j}$ is the tilt, in the main scan section, with respect to the optical axis of the optical surface at the position where the principal ray of the light beam, impinging on the largest scan position in the effective scan region on the surface to be scanned, passes through the j-th surface.

Conditional equation (8) mentioned above represents the correlation between (i) the asymmetrical component of the wavefront aberration to the principal ray, exerted to the light beam impinging on the largest scan position in the effective scan region on the surface to be scanned, when that light beam passes through the f-θ lens system 7, and (ii) the surface shape of each surface of the f-θ lens system 7.

As shown in FIG. 16, the f-θ lens system 7 of this embodiment is configured to positively produce a wavefront aberration of the same amount as the wavefront aberration produced by the deformation of the deflecting surface 6a, and in the opposite direction (cancelling direction).

Figure 44:
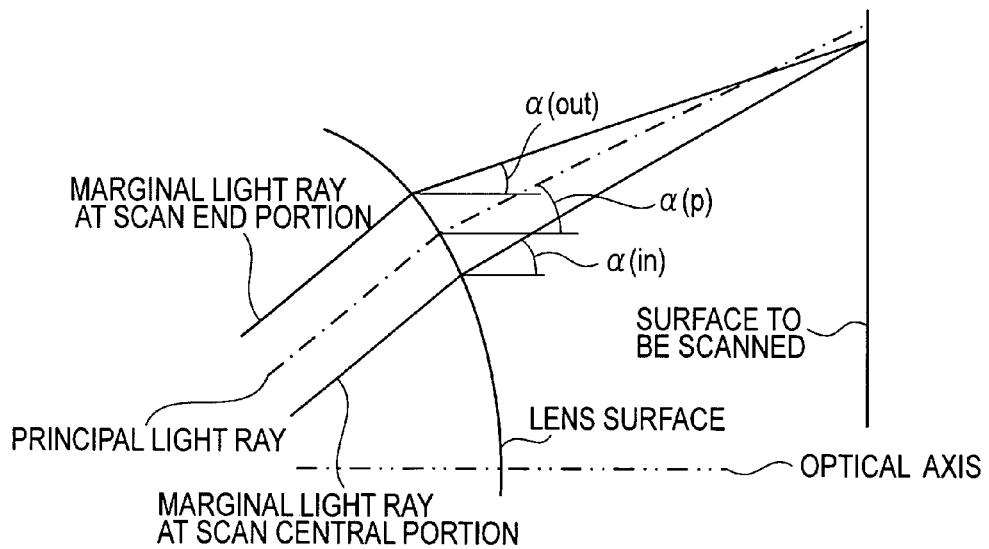
FIG. 44 is a schematic view for explaining wavefront aberration being produced by an f-θ lens system according to the present invention.

FIG. 44 illustrates a principal ray and a marginal ray that reach the largest scan position in the effective scan region on the surface to be scanned (here, in the case of Y>0) and an arbitrary lens surface of the f-θ lens system 7 (here, the last surface, as an example).

In order to produce wavefront aberration such as shown in FIG. 16, an angular difference should be present, in the main scan section, between (i) the angle defined by the marginal ray and the principal ray at the scan end portion side emerging from the lens surface and (ii) the angle defined by the marginal ray and the principal ray at the scan central portion side.

More specifically, in FIG. 44, with respect to the position of impingement of the principal ray on the surface to be scanned, both the marginal ray at the scan end portion side and the marginal ray at the scan central portion side have to reach the scan central portion side.

In order to meet this, the following condition should be satisfied.

First, $\alpha_{(out)}$ is used to refer to the angle defined, in the main scan section, between (i) a marginal ray at the scan end portion side of the light beam passed through the lens surface and impinging on the largest scan position (here, Y>0) of the effective scan region on the surface to be scanned and (ii) the optical axis of the f-θ lens system 7. Second, $\alpha_{(in)}$ is used to refer to the angle defined, in the main scan section, between (i) a marginal ray at the scan central portion side of the light beam passed through the lens surface and impinging on the largest scan position (here, Y>0) of the effective scan region on the surface to be scanned and (ii) the optical axis of the f-θ lens system 7. Third, $\alpha_{(p)}$ is used to refer to the angle defined, in the main scan section, between (i) the principal ray of the light beam passed through the lens surface and impinging on the largest scan position (here, Y>0) —of the effective scan region on the surface to be scanned and (ii) the optical axis of the f-θ lens system 7. Then, the following condition is satisfied.

$$(\alpha_{(out)} - \alpha_{(p)}) - (\alpha_{(p)} - \alpha_{(in)}) > 0$$

Namely, $$\alpha_{(out)} + \alpha_{(in)} - 2\alpha_{(p)} > 0 \qquad (9)$$

Here, $dx/dy_{(out)}$ is used to refer to the tilt, in the main scan section, of the lens surface with respect to the optical axis of the f-θ lens system 7 at the position where a scan end portion side marginal ray of the light beam, impinging on the largest scan position (here, Y>0) in the effective scan region on the surface to be scanned, passes through the lens surface. Also, $dx/dy_{(in)}$ is used to refer to the tilt, in the main scan section, of the lens surface with respect to the optical axis of the f-θ lens system 7 at the position where a scan central portion side marginal ray of the light beam, impinging on the largest scan position (here, Y>0) in the effective scan region on the surface to be scanned, passes through the lens surface. Further, $dx/dy_{(p)}$ is used to refer to the tilt, in the main scan section, of the lens surface with respect to the optical axis of the f-θ lens system 7 at the position where the principal ray of the light beam, impinging on the largest scan position (here, Y>0) in the effective scan region on the surface to be scanned, passes through the lens surface. Furthermore, the refractive index of the light entrance side of the lens surface is denoted by N, and the refractive index of the light exit side of the lens surface is denoted by 1.

Then, Equation (9) mentioned above can be rewritten as $$(N-1)\left(\frac{dx}{dy_{(out)}} + \frac{dx}{dy_{(in)}} + 2\frac{dx}{dy_{(p)}}\right) > 0 \qquad (10)$$

Although description has been made with reference to an example of a single optical surface for the sake of simplicity, if there are plural optical surfaces, the total of the tilt relationships of the lens surfaces should satisfy Equation (10) above.

If there are plural optical surfaces, regarding $U_j$, $U_j=-1$ where the optical surface is a transmission surface and it is a light entrance surface; $U_j=+1$ where the optical surface is a transmission surface and it is a light exit surface; and $U_j=+1$ where the optical surface is a reflection surface. Also, $N_j$ is a coefficient and $N_j$ is equal to the refractive index of the glass material if the optical surface is a transmission surface; and $N_j=2$ if the optical surface is a reflection surface. Hence, in place of Equation (10) above, the following condition should be satisfied.

If $Y < 0$ (11)

$$\sum_{j=1}^{m}\left[U_j(N_j-1)\left(\frac{dX}{dY_{(out)j}} + \frac{dX}{dY_{(in)j}} - 2\frac{dX}{dY_{(p)j}}\right)\right] < 0$$

If $Y > 0$ $$\sum_{j=1}^{m}\left[U_j(N_j-1)\left(\frac{dX}{dY_{(out)j}} + \frac{dX}{dY_{(in)j}} - 2\frac{dX}{dY_{(p)j}}\right)\right] > 0$$

Table 1-3 and Table 1-4 below show numerical values in this embodiment as well as numerical values of the left side of Equation (11) above.

TABLE 1-3

| | Y > 0 | | | |
|---|---|---|---|---|
| | 1st Surface | 2nd Surface | 3rd Surface | 4th Surface |
| Scan End Side Marginal Ray Passage Y Coordinate | 23.5078 | 25.5376 | 43.6122 | 45.4727 |
| Principal Ray Passage Y Coordinate | 21.9026 | 24.1839 | 42.1086 | 44.0691 |
| Scan Central Side Marginal Ray Passage Y Coordinate | 20.3084 | 22.8352 | 40.5895 | 42.6369 |
| dx/dy (out) | −0.10503 | −0.38188 | −0.13347 | −0.40257 |
| dx/dy (up) | −0.12708 | −0.40728 | −0.09675 | −0.33802 |
| dx/dy (in) | −0.14383 | −0.42204 | −0.06310 | −0.28078 |
| U | −1 | 1 | −1 | −1 |
| N | 1.52420 | 1.52420 | 1.52420 | 1.52420 |
| U(N − 1)(dx/dy(out) + dy/dy(in) − 2dx/dy(p)) | −0.00278 | 0.00558 | 0.00161 | 0.00383 |
| Conditional Equation (11) Left Side | 0.00824 | | | |

TABLE 1-4

| | Y < 0 | | | |
|---|---|---|---|---|
| | 1st Surface | 2nd Surface | 3rd Surface | 4th Surface |
| Scan End Side Marginal Ray Passage Y Coordinate | −23.5078 | −25.5376 | −43.6122 | −45.4727 |
| Principal Ray Passage Y Coordinate | −21.9026 | −24.1839 | −42.1086 | −44.0691 |
| Scan Central Side Marginal Ray Passage Y Coordinate | −20.3084 | −22.8352 | −40.5895 | −42.6369 |
| dx/dy (out) | 0.10503 | 0.38188 | 0.13347 | 0.40257 |
| dx/dy (up) | 0.12708 | 0.40728 | 0.09675 | 0.33802 |
| dx/dy (in) | 0.14383 | 0.42204 | 0.06310 | 0.28078 |
| U | −1 | 1 | −1 | −1 |
| N | 1.52420 | 1.52420 | 1.52420 | 1.52420 |
| U(N − 1)(dx/dy(out) + dy/dy(in) − 2dx/dy(p)) | 0.00278 | −0.00558 | −0.00161 | −0.00383 |
| Conditional Equation (11) Left Side | −0.00824 | | | |

It is seen from these tables that, in this embodiment, the value of the left side of Equation (11) is positive when Y>0, and it is negative when Y<0, such that Equation (11) is surely satisfied.

In accordance with this embodiment, Equation (11) is satisfied to thereby positively produce a wavefront aberration of the same amount as the wavefront aberration produced by the deformation of the deflecting surface 6a as shown in FIG. 16, and in the opposite direction (cancelling direction). With this arrangement, the wavefront aberration produced as a result of deformation of the deflecting surface 6a is effectively reduced, and high-quality image output is accomplished.

Embodiment 2

Figure 18:
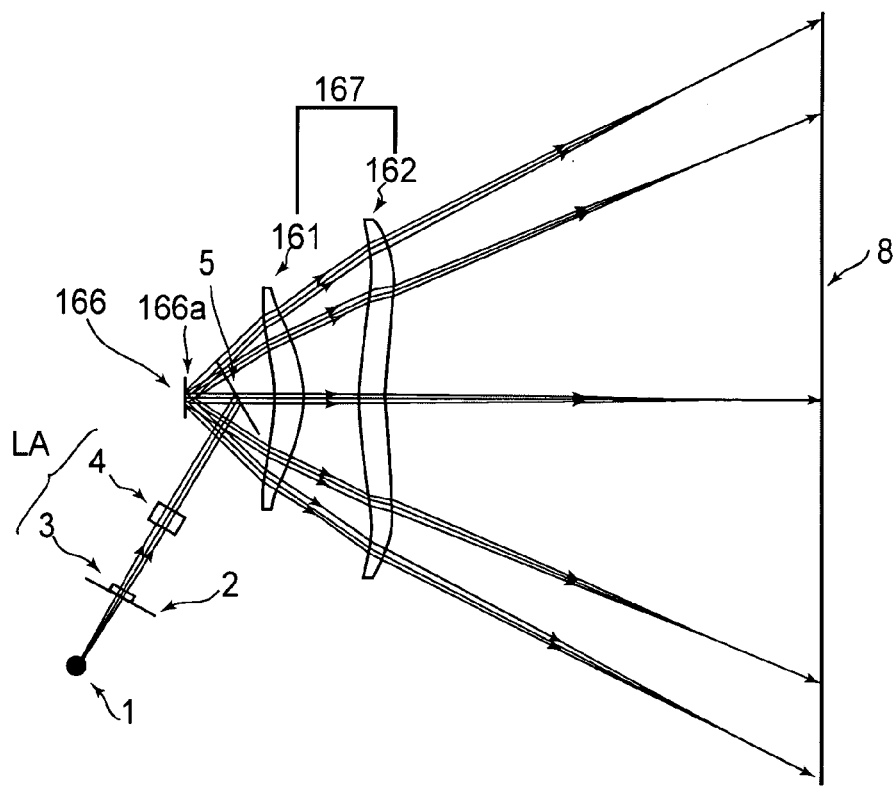
FIG. 18 is a sectional view along a main scan section, for explaining a second embodiment of the present invention.

FIG. 18 illustrates a section (main scan section) of a main portion of a second embodiment of the present invention, in the main scan direction. In FIG. 18, elements corresponding to those shown in FIG. 1 are denoted by like numerals.

This embodiment differs from the first embodiment in that an optical deflector 166 having a structure different from that of the optical deflector 6 of the first embodiment is used as the deflecting means. In addition to this, first and second imaging lenses (f-θ lenses) 161 and 162 that constitute an f-θ lens system 167 have different shapes. The remaining portions have a similar structure and optical function as of the first embodiment, and similar advantageous results are provided.

Figure 19:
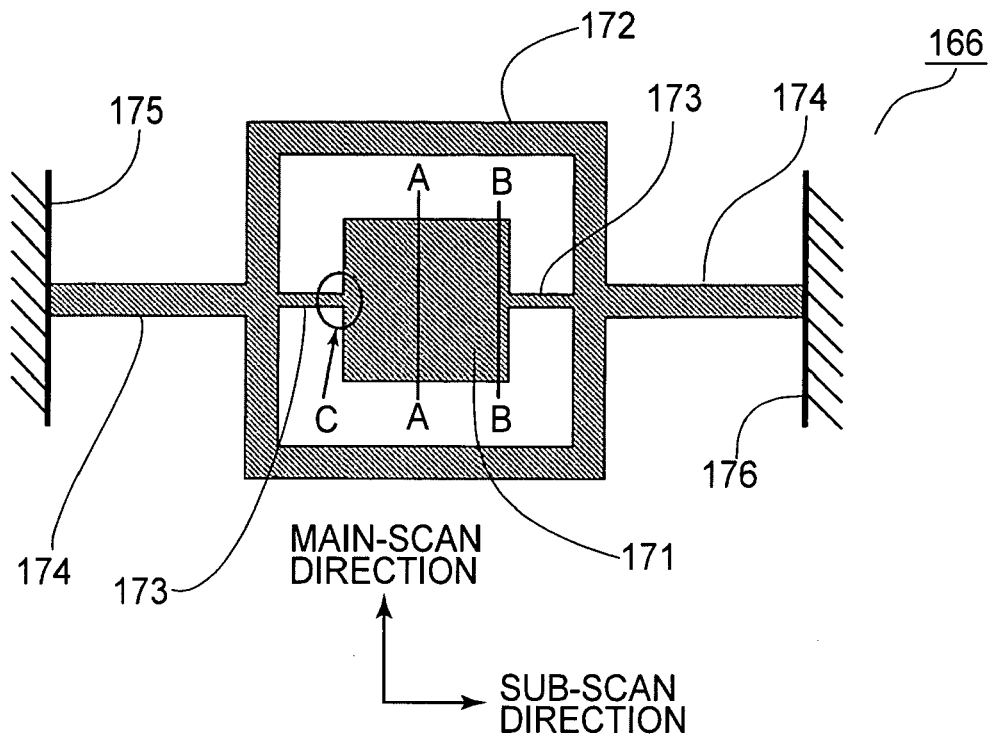
FIG. 19 is a schematic view, showing details of an optical deflector according to the second embodiment of the present invention.

In FIG. 18, denoted at 166 is an optical deflector (deflecting means), and it has a structure such a shown in FIG. 19.

In FIG. 19, the optical deflector 166 comprises a plurality of movable plates 171 and 172 and a plurality of torsion springs 173 and 174 which are formed integrally out of a single plate, wherein the torsion springs 173 and 174 are fixed to support members 175 and 176, respectively. The optical deflector 166 has a deflecting surface which is formed on one (171) of the plural movable plates.

As seen from FIG. 19, the torsion springs 173 and 174 are disposed rectilinearly along one and the same axis. By coupling plural movable plates 171 and 172 in series into an integral structure, these movable plates 171 and 172 can be swingingly moved about the torsional axis of the torsion springs 173 and 174 (i.e., an axis parallel to the sub-scan direction).

Furthermore, a deflecting surface (not shown) is provided on the movable plate 171, for deflectively scanning a light beam. Through the torsional oscillation of the movable plate 171, the light beam from the light source means can be deflectively scanned in the main scan direction.

Next, referring to FIG. 20, the principle of the optical deflector 166 of the structure described above, will be explained.

Figure 20:
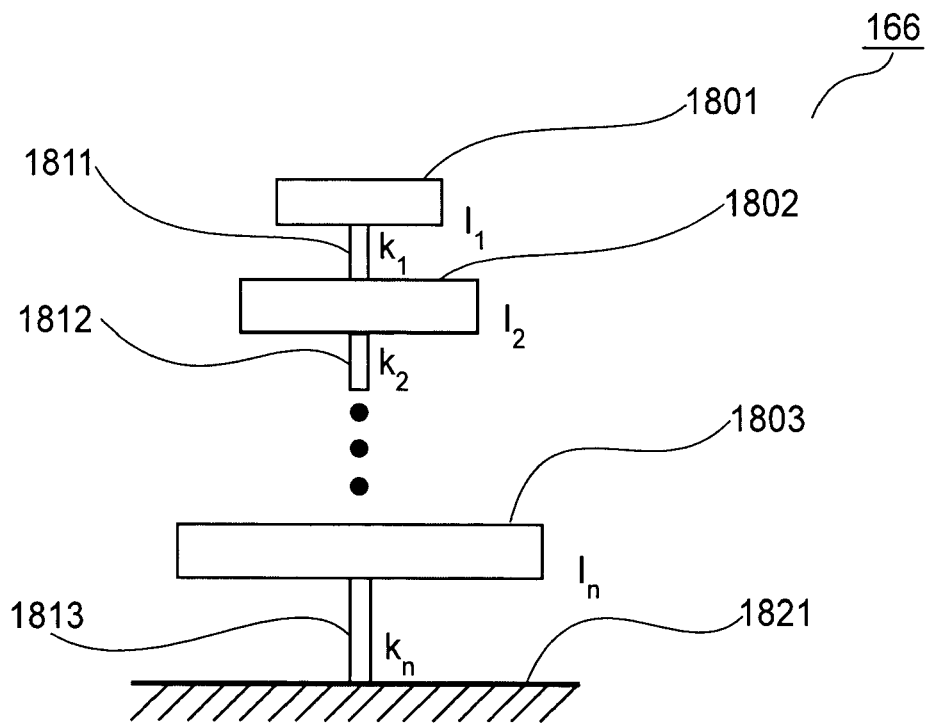
FIG. 20 is a schematic view for explaining the principle of an optical deflector according to the second embodiment of the present invention.

FIG. 20 is a schematic view for explaining the principle of the optical deflector 166. In FIG. 20, denoted at 1801-1803 are movable plates of a number n. Denoted at 1811-1813 are torsion springs of a number n, and denoted at 1821 is a support.

The torsion springs 1811-1813 are disposed along a straight line, and the movable plates 1801-1803 are arranged to be swingingly moved around the torsional axis of the springs 1811-1813.

An equation for free oscillation of such system will be given as follows.

$$M\ddot{\theta} + K\theta = 0 \quad (12)$$

$$\theta = \begin{pmatrix} \theta_1 \\ \theta_2 \\ M \\ \theta_n \end{pmatrix}, M = \begin{pmatrix} I_1 & & & \\ & I_2 & & \\ & & O & \\ & & & I_n \end{pmatrix},$$

$$K = \begin{pmatrix} k_1 & -k_1 & & \\ -k_1 & k_1+k_2 & -k_2 & \\ & & O & \\ & & -k_{n-1} & k_{n-1}+k_n \end{pmatrix}$$

where $I_k$ is the inertia moment of the movable plate, $K_k$ is the spring constant of the torsion spring, $\theta_k$ is the torsion angle of the movable plate (k=1, . . . , n).

If the eigen value of $M^1K$ of this system is λk (k= 1, . . . , n), the angular frequency $\omega_k$ in the natural mode is given by:

$$\omega_k = \sqrt{(\lambda_k)} \quad (13)$$

In the optical deflector 166 of this embodiment, a reference frequency and a frequency or frequencies corresponding to a multiple, by an integral number, of the reference frequency are included in the angular frequency $\omega_k$ of the natural mode.

In other words, the reciprocating motion of the deflecting surface of the optical deflector of this embodiment has a plurality of discrete natural oscillation modes. And, in these discrete natural oscillation modes, a reference oscillation mode which is a natural oscillation mode at the reference frequency as well as an integral-number-multiple oscillation mode which is a natural oscillation mode at a frequency corresponding to a multiple, by an integral number of not less than 2, of the reference frequency are included.

Figure 21:
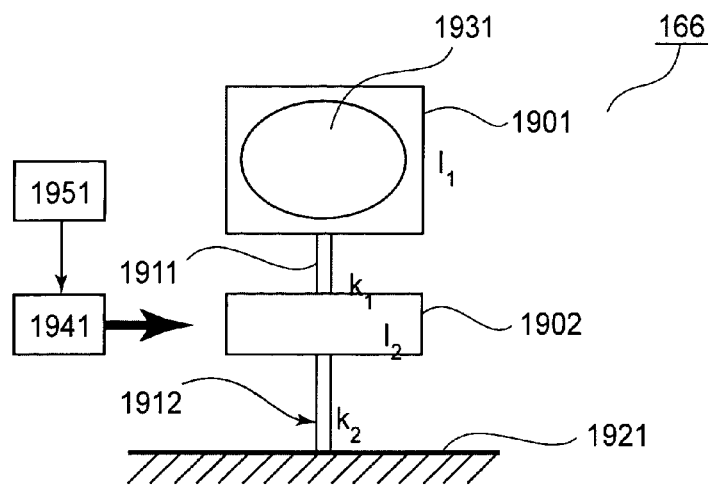
FIG. 21 is a schematic view, showing a model for explaining a resonance type optical deflector having two movable plates.

Here, as an example, a resonance type optical deflector 166 having two movable plates such as shown in FIG. 21 will be explained.

The optical deflector 166 shown in FIG. 21 comprises two movable plates 1901 and 1902, and two torsion springs 1911 and 1912 for coupling the two movable plates 1901 and 1902 in series and being disposed along one and the same axis.

Furthermore, there is a support 1921 for supporting a portion of the two torsion springs 1911 and 1912. Additionally, there is driving means 1941 for applying a torque to at least one of the two movable plates 1901 and 1902, and drive control means 1951 for controlling the driving means 1941.

It is assumed here that:

$I_1 = 1.3951 \times 10^{-11}$ [kgm²], $I_2 = 1.7143 \times 10^{-10}$ [kgm²], $k_1 = 7.91914 \times 10^{-3}$ [N/m], $k_2 = 3.0123 \times 10^{-2}$ [N/m], (14)

Here, the eigen value of $M^-K$ is $\lambda_1 = 1.5790 \times 10^8$ $\lambda_2 = 6.3166 \times 10^8$ and thus corresponding natural frequency is given by:

$\omega_1 = 2\pi \times 2000$ [H$_Z$]

$\omega_2 = 2\pi \times 4000$ [H$_Z$]

Namely, $\omega_2 \approx 2\omega_1$. Hereinafter, these oscillation modes will be referred to as "Mode 1" (reference oscillation mode) and "Mode 2" (integral-number-multiple oscillation mode).

In the optical deflector 166 of this embodiment, the drive control means 1951 controls the driving means 1941 so that the system constituted by two movable plates 1901 and 1902 and two torsion springs 1911 and 1912 can be oscillated at the reference frequency and a frequency corresponding to a multiple thereof by an integral number, at the same time.

At that moment, the amplitude and phase of the movable plates at the reference frequency and a frequency corresponding to a multiple thereof by an integral number may be changed in various ways, by which the driving can be done in various manners.

In this embodiment, the drive control means 1951 controls the driving means 1941 so as to set the following conditions. That is, in FIG. 19:

1) The largest oscillation amplitude $\phi_1$ of the movable plate 171 in the Mode 1 is:

$\phi_1 = 36.68757$ deg.

2) The angular frequency $\omega_1$ is:

$\omega_1 = 2\pi \times 2000$ [H$_Z$]

3) The largest oscillation amplitude $\phi_2$ of the movable plate 171 in the Mode 2 is:

$\phi_2 = 5.61180$ deg.

4) The angular frequency $\omega_2$ is:

$\omega_2 = 2\pi \times 4000$ [H$_Z$]

5) And, the respective phases have a difference of 180 deg.

The size of the movable plate 171 is 3.0 mm in the longitudinal direction in FIG. 19 (main scan direction) and it is 2.0 mm in the lateral direction (sub-scan direction).

The oscillation angle (deflection angle) $\theta_1$ of the movable plate 171 here is given by:

$\theta_1 = \phi_1 \sin(\omega_1 t) - \phi_2 \sin(\omega_2 t)$ (15)

The movable plate 171 is provided with a deflecting surface (not shown), such that the light beam from the semiconductor laser 1 is deflectively scanned at an angle $2\theta_1$, that is, twice the angle of Equation (15) above.

On the other hand, the angular speed $d\theta_1/dt$ and the angular acceleration $d^2\theta_1/dt^2$ of the movable plate are given by:

$$\frac{d\theta_1}{dt} = \phi_1 \omega_1 \cos(\omega_1 t) - \phi_2 \omega_2 \cos(\omega_2 t) \quad (16)$$

$$\frac{d^2\theta_1}{dt^2} = -\phi_1 \omega_1^2 \sin(\omega_1 t) + \phi_2 \omega_2^2 \cos(\omega_2 t) \quad (17)$$

Figure 22:
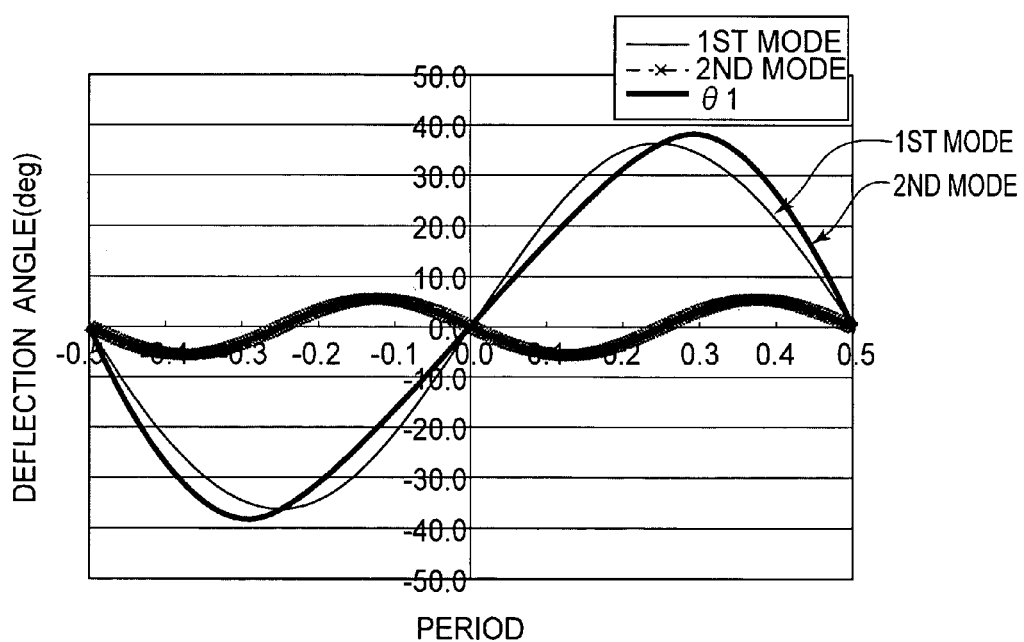
FIG. 22 is a graph for explaining the oscillation angle (deflection angle) of a movable plate of an optical deflector according to the second embodiment of the present invention.

FIG. 22 is a graph for explaining the oscillation angle (deflection angle) $\theta_1$ of the movable plate 171 of the optical deflector 166 of this embodiment. In FIG. 22, the axis of abscissa denotes the period (time), and the axis of ordinates denotes the oscillation angle (deflection angle) $\theta_1$ wherein the unit is deg.

It is seen from FIG. 22 that, in this embodiment, by exciting the above-described Mode 1 and Mode 2 simultaneously, as compared with normal sine oscillation, there is produced a region in which the oscillation angle $\theta_1$ is nearly proportional to time (namely, the region in which the oscillation angle can be regarded as being proportional to time).

In the first embodiment described hereinbefore, the optical deflector 6 comprises a deflector which is based on sine oscillation and an f-θ lens is used as an imaging lens to be combined with this deflector.

If an f-θ lens is used simply as an imaging lens in combination with a sine-oscillation optical deflector, it raises a problem that, as compared with the scan central portion on the photosensitive drum surface 8, the scan speed at the scan end portion on the photosensitive drum surface 8 becomes slower to cause contraction of an image in the main scan direction.

In the first embodiment, the modulation clock of the semiconductor laser 1 is changed continuously in synchronism with the scan position, in the main scan direction, on the photosensitive drum surface 8, by which the above-described inconvenience is avoided.

As compared therewith, in the optical deflector 166 of this embodiment, the above-described Mode 1 and Mode 2 are excited simultaneously by which, as compared with normal sine oscillation, there is produced a region in which the oscillation angle (deflection angle) 01 is nearly proportional to time (namely, the region in which the oscillation angle can be regarded as being proportional to time).

In other words, there is a region in which the deflecting surface can be regarded as being deflected at a uniform angular speed. Therefore, an ordinary f-θ lens may be used as an imaging lens to be combined therewith, by which, on the photosensitive drum surface 8, nearly uniform speed scan can be accomplished.

This is advantageous in that there is no need of continuously changing the modulation clock of a semiconductor laser 1 in synchronism with the scan position on the photosensitive drum surface 8 in the main scan direction, as in the first embodiment.

Figure 23:
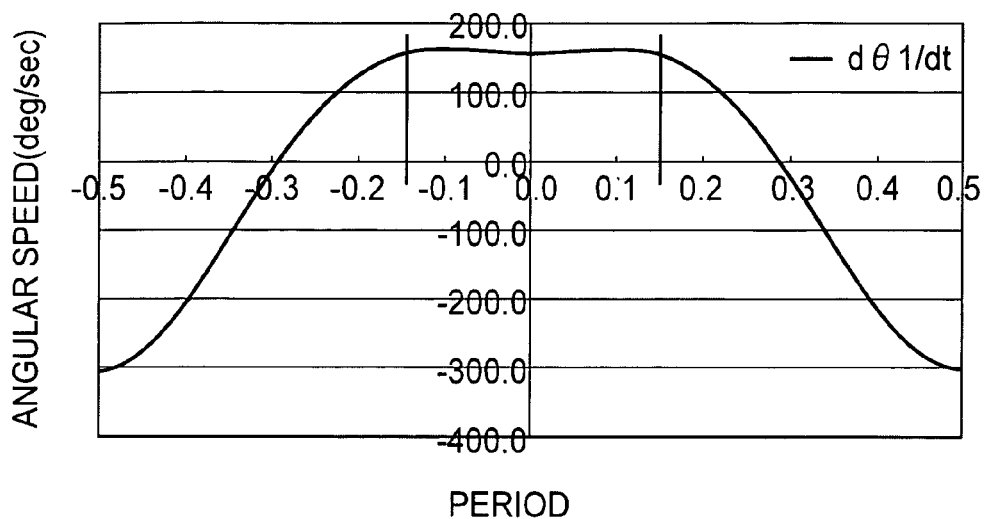
FIG. 23 is a graph for explaining the angular speed of a movable plate of an optical deflector according to the second embodiment of the present invention.

FIG. 23 is a graph for explaining the angular speed $d\theta_1/dt$ of the movable plate 171 of the optical deflector of this embodiment. Specifically, the angular speed $d\theta_1/dt$ at the scan center (period is 0) is 160.0 (deg/sec), and the angular speed increases as the scan position comes close to the scan end portion. The angular speed $d\theta_1/dt$ becomes largest at the period ±0.098, and it takes a value 164.708 (deg/sec) at that time.

After this, as the scan position comes close to the scan end portion, the angular speed decreases and, at the largest scan position (period is ±0.14) in the effective scan region, the angular speed $d\theta_1/dt$ takes a value 160.0 (deg/sec).

With regard to the uniformness of the angular speed of the movable plate 171 within the effective scan region, where the angular speed of the deflecting surface at an arbitrary position inside the effective scan region is denoted by $d\theta_1/dt$, the largest value of $d\theta_1/dt$ is 164.708 (deg/sec) and the smallest value of $d\theta_1/dt$ is 160.0 (deg/sec). Therefore, the angular speed uniformness may be set as follows:

$$(d\theta_1/dt)/(d\theta_0/dt)=164.708/160.0=1.0294$$

Namely, it may be set to be not greater than 2.94%.

Figure 24:
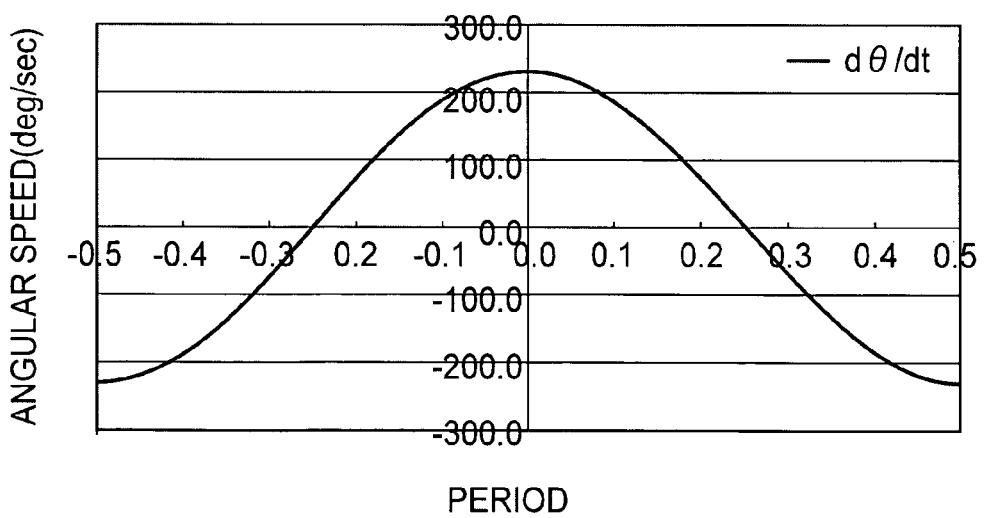
FIG. 24 is a graph for explaining the angular speed of a movable plate, in a comparative example wherein there is Mode 1 only.

As a comparison, FIG. 24 illustrates an example of angular speed $d\theta/dt$ of a movable plate 171 which has only Mode 1.

In the case of Mode 1 only shown in FIG. 24, sine oscillation is simply provided. Therefore, the angular speed changes sinusoidally. Obviously, there is no region in which the angular speed can be regarded as constant, such as shown in FIG. 23.

On the other hand, although the angular speed $d\theta_1/dt$ of this embodiment is almost uniform, it is not a completely uniform angular speed.

Figure 25:
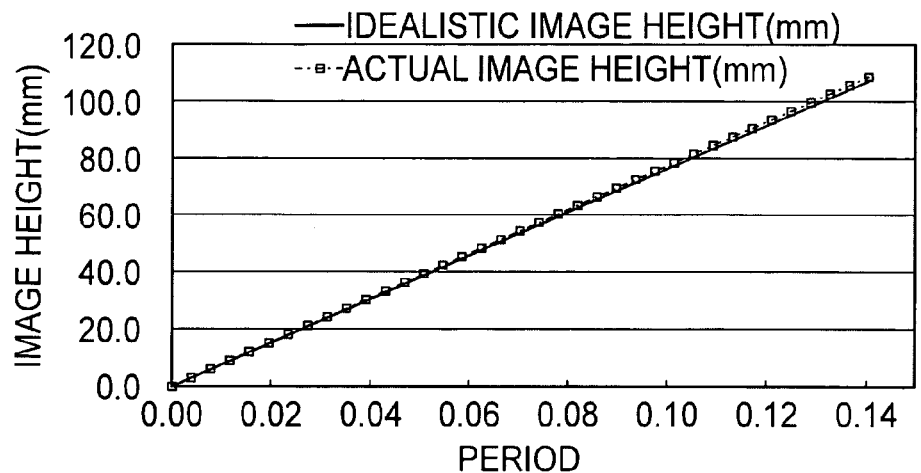
FIG. 25 is a graph, showing an idealistic image height where the scan is made by using an idealistic f-θ lens in the second embodiment as well as an actual image height where the scan is made by using the same f-θ lens.

FIG. 25 shows an idealistic image height wherein a light beam which is being deflectively scanned, up to a period 0.14, by means of a deflecting surface which is being deflected at a completely uniform angular speed corresponding to the value of angular speed at the period 0 (t=0) shown in FIG. 23, is scanned by an idealistic f-θ lens having a focal length for focusing at an image height 107 mm.

FIG. 25 further shows an actual image height wherein a light beam which is being reflected and deflectively scanned, up to a period 0.14, by means of the deflecting surface 166a of the optical deflector 166 of this embodiment, having an angular speed $d\theta_1/dt$, shown in FIG. 23, is scanned by the same f-θ lens.

The angular speed $d\theta_1/dt$ of the optical deflector 166 of this embodiment gradually increases with the lapse of time from time t=0 and, at the period 0.14, it coincides with the angular speed at time t=0.

Thus, the light beam deflectively scanned, up to the period 0.14, by the reflecting surface which is being deflected at a completely uniform angular speed corresponding to the value of angular speed at the period 0 (t=0), is compared with the idealistic image height provided by scanning by using the idealistic f-θ lens.

Then, it is seen that the actual image height which is provided by scanning, by use of the idealistic f-θ lens, the light beam reflected by the deflecting surface 166a having an angular speed $d\theta_1/dt$ shown in FIG. 23 and deflectively scanned up to the period 0.14, has a larger value.

Figure 26:
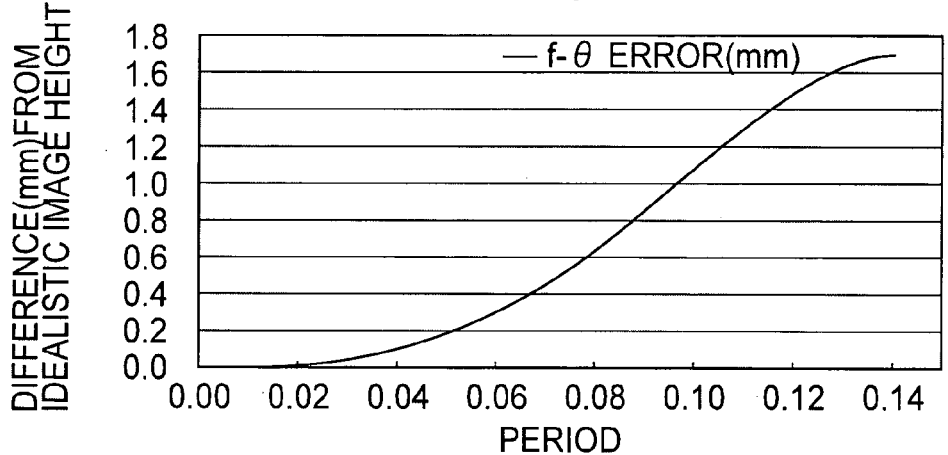
FIG. 26 is a graph, showing the difference (f-θ error) between two curves in FIG. 23.

FIG. 26 shows this difference as an f-θ error.

It is seen that there is a largest error of about 1.7 mm at the scan end portion (period 0.14) on the surface to be scanned. If, in an image forming apparatus into which a scanning optical system is to be incorporated, such an error can be disregarded according to the specifications thereof, the deflector may be used in this state.

In the f-θ lens system 167 of this embodiment, the f-θ error component shown in FIG. 26 as produced by a deviation of the above-described angular speed $d\theta_1/dt$ from the uniform angular speed, is corrected by means of the f-θ lens system 167.

Figure 27:
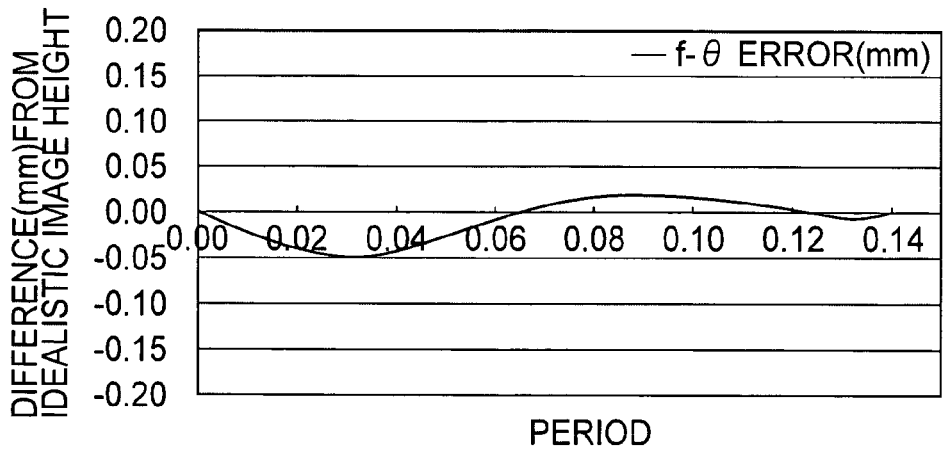
FIG. 27 is a graph, showing an f-θ error of an f-θ lens according to the second embodiment of the present invention.

FIG. 27 is a graph showing an f-θ error in a case where the light beam reflected by the deflecting surface 166a having an angular speed $d\theta_1/dt$ shown in FIG. 23 is scanned with the f-θ lens system 167. It is seen that, as compared with FIG. 26, the f-θ error is remarkably reduced.

Figure 28:
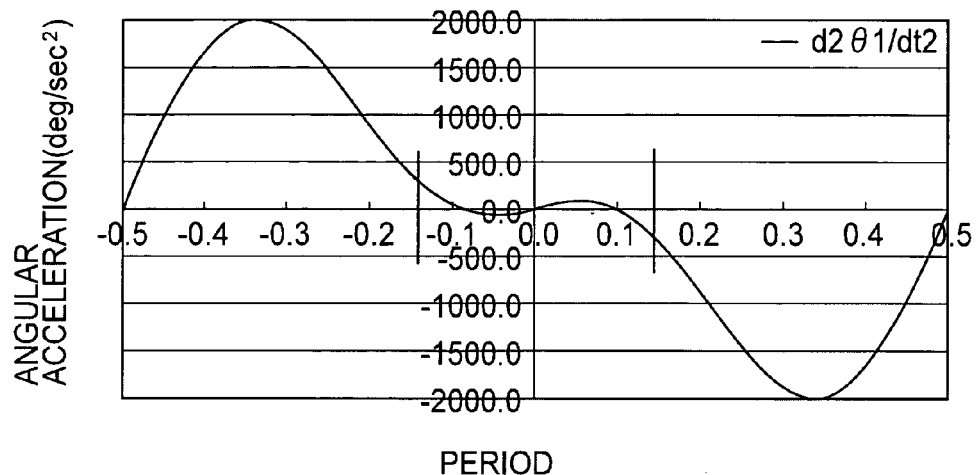
FIG. 28 is a graph for explaining the angular acceleration of a movable plate of an optical deflector according to the second embodiment of the present invention.
Figure 29:
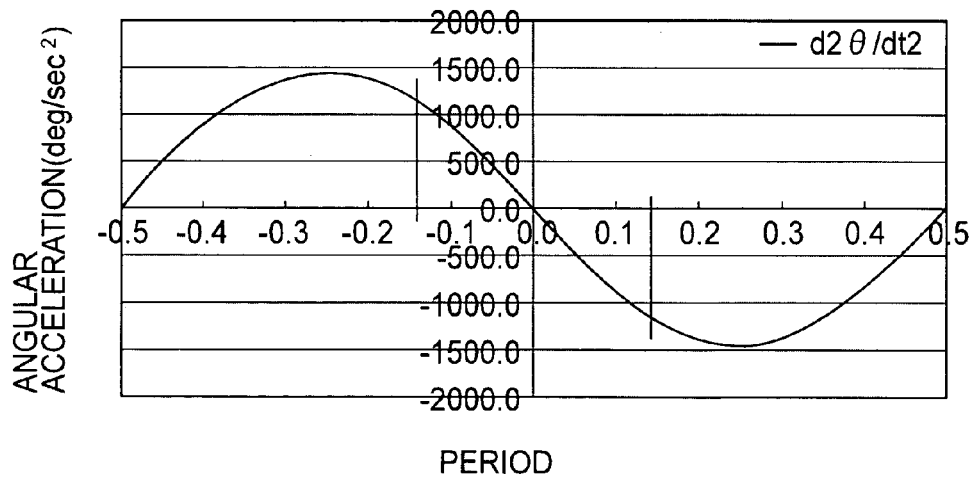
FIG. 29 is a graph for explaining the angular acceleration of a movable plate, in a comparative example wherein there is Mode 1 only.

Next, FIG. 28 shows the angular acceleration $d^2\theta_1/dt^2$ of the movable plate 171 of the optical deflector 166 of this embodiment and, as a comparative example, FIG. 29 shows the angular acceleration $d^2\theta/dt^2$ of the movable plate 171 exited in Mode 1 only.

It is seen from FIGS. 28 and 29 that the angular acceleration of the movable plate 171 of the optical deflector 166 at the period 0.14 (outermost end of scan) is notably smaller in FIG. 28. Namely, it is seen that the angular acceleration of the movable plate 171 of the optical deflector 166 at the periods from 0 to ±0.14 (outermost end of scan) is smaller in FIG. 28 than in FIG. 29.

In the optical deflector 166 of this embodiment, by exciting the above-described Mode 1 and Mode 2 simultaneously, as compared with normal sine oscillation, the angular acceleration $d^2\theta_1/dt^2$ of the movable plate 171 can be reduced significantly.

On the other hand, as has been described with reference to the first embodiment, the movable plate 171 may be deformed due to the angular acceleration during oscillation. However, since the angular acceleration of the movable plate 171 in this embodiment is quite small as compared with the angular acceleration during simple sine oscillation, deformation of the movable plate 171 would be very small.

Figure 30:
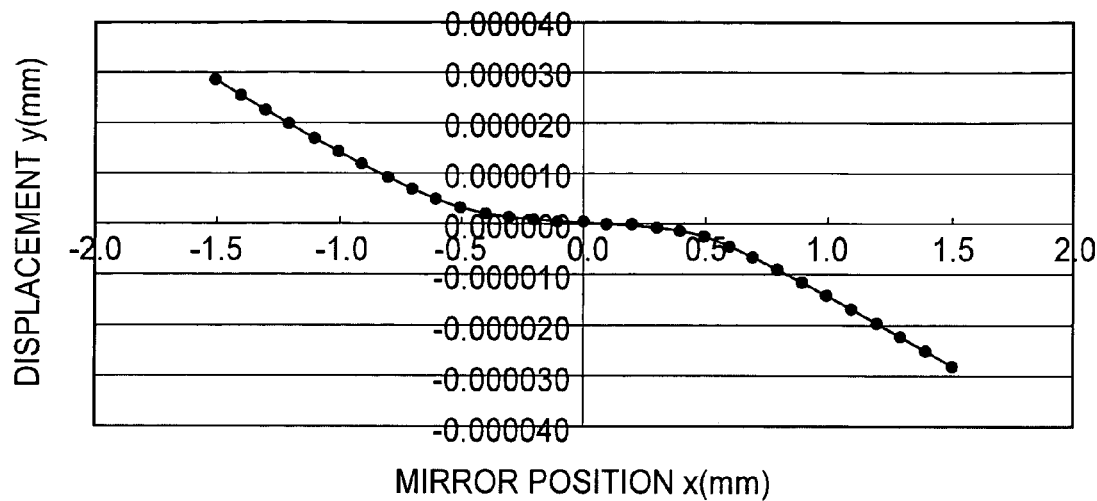
FIG. 30 is a graph, showing the result of calculation made to deformation of the movable plate of the second embodiment of the present invention, in accordance with the finite element method.

FIG. 30 is a graph, showing the result of calculation made to deformation of the movable plate 171 of this embodiment, in accordance with the finite element method. Here, the width of the movable plate 171 in the main scan direction is 3 mm, and the width in the sub-scan direction is 1 mm. The thickness is 200 μm. As compared with the deformation amount (FIG. 9) in the first embodiment, it is seen that the deformation amount is less than one-third.

Hence, although the deflecting surface 166a would be deformed similarly in response to the deformation of the movable plate 171, since that deformation would be about one-third as compared with the first embodiment, the wavefront aberration to be produced by the deflecting surface 166a would be about one-third of that in the first embodiment.

In that occasion, therefore, adverse influence to the focused spot on the photosensitive drum surface 8 would be very small.

Figure 31:
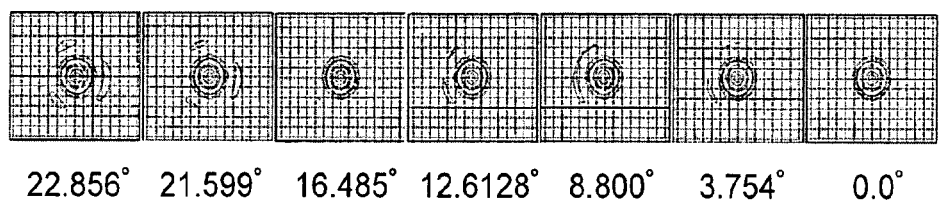
FIG. 31 is a schematic view, showing profiles of spots at respective scan positions on the surface to be scanned, in the second embodiment of the present invention.

FIG. 31 shows an example wherein an f-θ lens having been designed on an assumption that the deflecting surface 166a has no deformation is used, but actually the deflecting surface 166a is being deformed as described above.

Specifically, FIG. 31 shows shapes of spots on the photosensitive drum surface 8 that correspond to the deflection angles, of the deflecting surface 166a, of +22.856 deg. (corresponding to the period 0.14), +21.599 deg., +16.485 deg., +12.628 deg., +8.800 deg., +3.754 deg. and 0.0 deg.

FIG. 31 illustrates contours of the intensity distribution of each spot, similar to FIG. 14. The contour lines in FIG. 31 depict intensities having been sliced with respect to the levels of (from the outside) 0.02, 0.05, 0.1, 0.1353, 0.3679, 0.5, 0.75 and 0.9, respectively, with the peak intensity of the focused spot being standardized to 1.

At the scan end portion (+22.856 deg.) on the surface to be scanned, there are many sidelobes in the main scan direction. However, as compared with the spot shapes shown in FIG. 10, the spot shapes are quite good.

Since the peak intensity of the sidelobe does not exceed 0.05 (i.e., 5% of the peak intensity of the main focused spot), it would not cause serious image deterioration. However, the spot shapes at the deflection angles of +22.856 deg. and +21.599 deg. are not so good. In consideration of this, in this embodiment, like the first embodiment, the amount of wavefront aberration produced as a result of deformation of the deflecting surface 166a is corrected by means of the f-θ lens system 167.

Here, in this embodiment, first, $\delta L1_+$ is used to refer to the optical path difference between one of marginal rays (upper light ray) and the principal ray of the light beam reflected by the deflecting surface at an effective deflection angle +22.85 deg. thereof, the difference being produced as a result of reflection of the light beam by the deflecting surface. Second, $\delta L1_-$ is used to refer to the optical path difference between the other marginal ray (lower light ray) and the principal ray of the light beam reflected by the deflecting surface at an effective deflection angle +22.85 deg. thereof, the difference being produced as a result of reflection of the light beam by the deflecting surface.

Third, $\delta L2_+$ is used to refer to the optical path difference between one of marginal rays (upper light ray) and the principal ray of the light beam reflected by the deflecting surface at an effective deflection angle +22.85 deg. of the same, the difference being produced as a result of transmission of the light beam through the imaging optical system.

Here, the marginal ray at the positive (upper) side with respect to the main scan direction refers to a light ray which is at the scan-line-writing-start-position side (upper in the sheet of FIG. 19 and on the opposite side of the input optical system LA) on the surface to be scanned with respect to the principal ray of the light beam. Furthermore, the marginal ray at the negative (lower) side with respect to the main scan direction refers to a light ray which is at the scan-line-writing-end-position side (lower in the sheet of FIG. 19 and the input optical system LA side) on the surface to be scanned with respect to the principal ray of the light beam.

Fourth, $\delta L2_-$ is used to refer to the optical path difference between the other marginal ray (lower light ray) and the principal ray of the light beam reflected by the deflecting surface at an effective deflection angle +22.85 deg. of the same, the difference being produced as a result of transmission of the light beam through the imaging optical system.

Then, the imaging optical system satisfies the following relation.

$$0.8 \leq \frac{\delta L2_- - \delta L2_+}{\delta L1_+ - \delta L1_-} \leq 1.2 \quad (18)$$

Although in this embodiment a case of effective deflection angle +22.85 deg. for the deflecting surface has been taken as an example and description has been made to demonstrate that Equation (18) above is satisfied, in this embodiment Equation (18) can still be satisfied where the effective deflection angle of the deflecting surface is −22.85 deg. Furthermore, it should be noted that in this embodiment Equation (18) is satisfied with all deflection angles which are within the effective deflection angle range of ±22.85 degrees.

It is seen from the above that the amount of wavefront aberration produced by deformation of the deflecting surface can be reduced significantly.

Here, the words "light beam reflected by the deflecting surface at an effective deflection angle thereof" refer to a light beam that reaches the scan end portion (largest image height) of the scan line inside the effective image region on the surface to be scanned.

Figure 32:
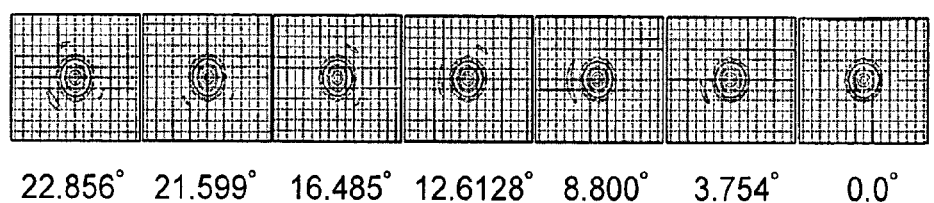
FIG. 32 is a schematic view, showing profiles of spots at respective scan positions on the surface to be scanned, in the second embodiment of the present invention.

FIG. 32 shows shapes of spots on the photosensitive drum surface 8 in this embodiment.

As compared with FIG. 31, it is seen that sidelobes of the focused spots, particularly those at the deflection angles of +22.856 deg. and +21.599 deg. have been corrected satisfactorily.

On the other hand, as shown in FIG. 23, the angular speed $d\theta_1/dt$ of the movable plate 171 of the optical deflector 166 in this embodiment is constant in the range of periods ±0.14. However, it is not yet completely constant.

In this embodiment, as described, the error component is corrected by means of the f-θ lens system 167. However, if the light beam not deflected at uniform angular speed is corrected so that it moves at uniform speed on the photosensitive drum surface 8, the spot diameter in the main scan direction would change.

Such change in the spot diameter in the main scan direction on the surface to be scanned is inversely proportional to the angular speed $d\theta_1/dt$ of the movable plate 171 of the optical deflector 166. In consideration of this, the largest oscillation amplitudes $\phi_1$ and $\phi_2$ of the movable plate 171 in the Mode 1 and Mode 2 as well as the angular frequencies $\omega_1$ and $\omega_2$ thereof, the phase differences, and so on, are chosen optimally. Then, by setting the change in angular speed inside the effective scan region smallest, the change in spot diameter in the main scan direction can be reduced to a lowest level.

In this embodiment, the largest oscillation amplitude $\phi_1$ of the movable plate 171 in the Mode 1 is $\phi_1 = 36.68757$ deg., and the angular frequency $\omega_1$ is $\omega_1 = 2\pi \times 2000 [H_z]$ The largest oscillation amplitude $\phi_2$ of the movable plate 171 in the Mode 2 is $\phi_2 = 5.61180$ deg., and the angular frequency $\omega_2$ is $\omega_1 = 2\pi \times 4000 [H_z]$ Then, through the setting effective to make the respective phases different from each other by 180 deg., the change in angular speed in the effective scan region is made small as shown in FIG. 23. By this, the change in spot diameter in the main scan direction can be made small.

As regards the uniformness of the spot diameter in the effective scan region, if it goes beyond 10%, it becomes particularly conspicuous. In consideration of this, the largest oscillation amplitudes $\phi_1$ and $\phi_2$ of the movable plate 171 in the Mode 1 and Mode 2 as well as the angular frequencies $\omega_1$ and $\omega_2$ thereof, the phase differences, and so on, should preferably be chosen optimally, to assure that the change in angular speed $d\theta_1/dt$ of the movable plate 171 of the optical deflector 166 is suppressed to 10% or less within the effective scan region.

Namely, where the largest value of the angular speed of the deflecting surface at an arbitrary position inside the effective scan region is denoted by $(d\theta_1/dt)_{max}$ and the smallest value of the angular speed of the deflecting surface at an arbitrary position inside the effective scan region is denoted by $(d\theta_1/dt)_{min}$, a the following condition should preferably be satisfied:

$$(d\theta 1/dt)_{max}/(d\theta 1/dt)_{min}<1.1$$

Figure 33:
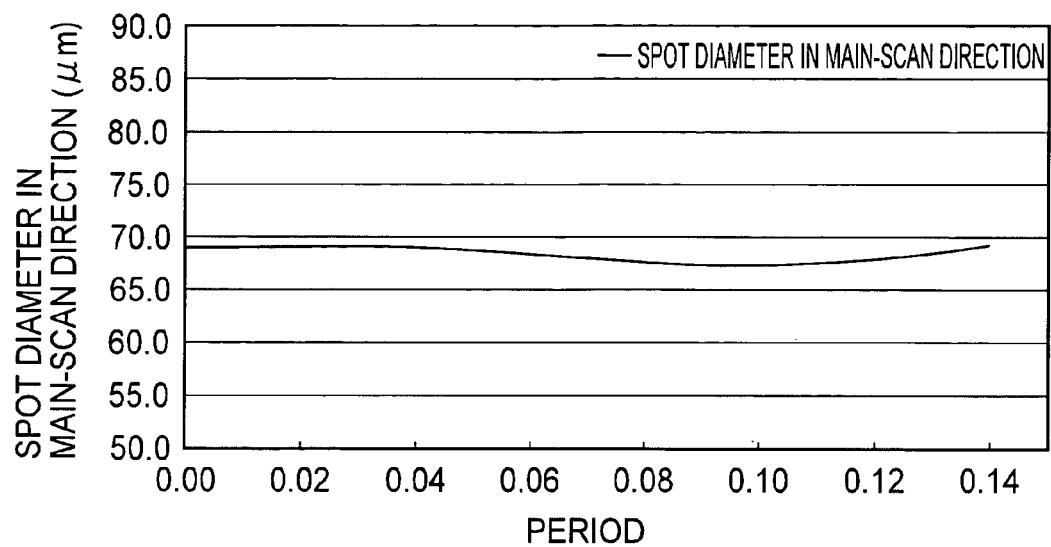
FIG. 33 is a graph, showing the spot diameter in the main scan direction upon a photosensitive drum surface, in the second embodiment of the present invention.

FIG. 33 shows the spot diameter in the main scan direction on the photosensitive drum surface 8 in this embodiment. In this embodiment, where the largest value of spot diameter of the focused spot, in the main scan direction, inside the same scan line within the effective scan region on the surface 8 to be scanned is denoted by $\phi n_1$ and the smallest value of spot diameter of the focused spot, in the main scan direction, inside the same scan line within the effective scan region on the surface 8 to be scanned is denoted by $\phi n_0$, the following relation is satisfied:

$$\phi n_1/\phi n_0<1.1 \qquad (19)$$

More preferably, a relation $$\phi n_1/\phi n_0<1.05 \qquad (20)$$

should be satisfied.

Hence, the spot diameter of the focus spot in the main scan direction, in this embodiment, changes from 67.27 μm to 69.17 μm, and thus the diameter change is kept approximately to 2.8%. As a result of this, optical scanning systems and image forming apparatuses which require high-quality image outputs can be accomplished.

Figure 34:
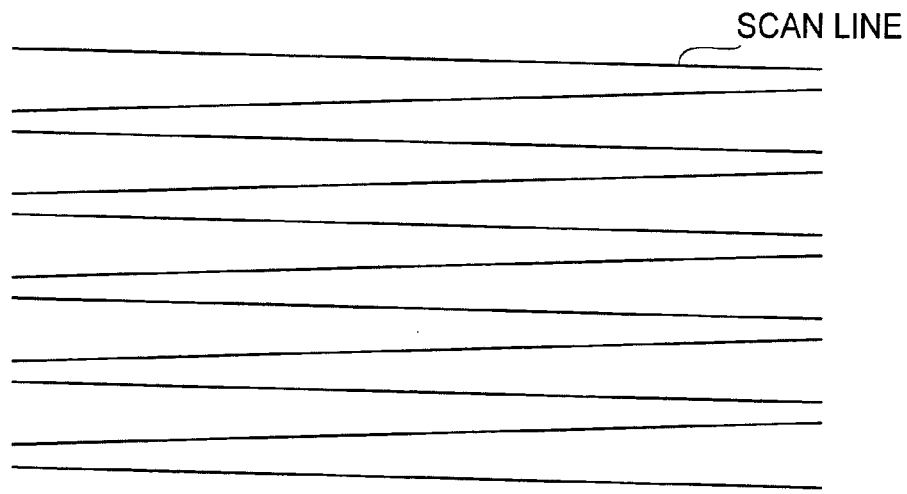
FIG. 34 is a schematic view for explaining the state of scan lines on the photosensitive drum surface, in the second embodiment of the present invention.

Since the optical scanning system of this embodiment uses an optical deflector having reciprocating motion, if an image is formed in both of the forward stroke and the backward stroke, the tilt of the scan line on the photosensitive drum surface 8 changes alternately as shown in FIG. 34. This results in unevenness of the pitch in the image end portion. In consideration of this, in the optical scanning system of this embodiment, the image formation may be carried out during the scan in one of the reciprocating strokes.

In such occasion, however, the scan efficiency decreases to a half. Hence, in order to solve this, a monolithic multiple-beam semiconductor laser or the like having plural light emission points (light emitting units) may preferably be used as the light source means.

Table 2-1 and Table 2-2 below show specifications of the scanning optical system of this embodiment.

TABLE 2-1

| | | | | | | | |
|---|---|---|---|---|---|---|---|
| Used Reference Wavelength | λ(nm) | | | 780 | | | |
| No. of Light Emission Points | n | | | 1 | | | |
| Position of Light Emission Points | x0(mm) | −29.38709 | y0(mm) | −75.99937 | z0(mm) | −3.57057 |
| Semiconductor Laser Cover Glass Refractive Index | n0 | | | 1.51072 | | | |
| Semiconductor Laser Cover Glass Thickness | deg(mm) | | | 0.25 | | | |
| Position of Stop | x1(mm) | −17.80914 | y1(mm) | −55.94578 | z1(mm) | −2.76195 |
| Shape of Stop | Elliptical | Main-scan 2.4 mm × Sub-scan 1.72 mm | | | | | |
| Light Emission Point to Collimator Lens 1st Surface Distance | d0(mm) | | | 23.67000 | | | |
| Collimator Lens 1st Surface Position | x2(mm) | −17.55930 | y2(mm) | −55.51303 | z2(mm) | −2.74450 |
| Collimator Lens 2nd Surface Position | x3(mm) | −16.55991 | y3(mm) | −53.78204 | z3(mm) | −2.67470 |
| Collimator Lens Thickness | d1(mm) | | | 2.00000 | | | |
| Collimator Lens Refractive Index | n1 | | | 1.76203 | | | |
| Collimator Lens 1st Surface Curvature Radius | R1(mm) | | | 182.21200 | | | |
| Collimator Lens 2nd Surface Curvature Radius | R2(mm) | | | −20.83080 | | | |
| Collimator Lens 2nd Surface to Cylindrical Lens 1st Surface Distance | d2(mm) | | | 19.76000 | | | |
| Cylindrical Lens 1st Surface Position | x4(mm) | −6.68592 | y4(mm) | −36.67980 | z4(mm) | −1.98508 |
| Cylindrical Lens 2nd Surface Position | x5(mm) | −3.68775 | y5(mm) | −31.48681 | z5(mm) | −1.77569 |
| Cylindrical Lens Thickness | d3(mm) | | | 6.00000 | | | |
| Cylindrical Lens Refractive Index | n2 | | | 1.51072 | | | |
| Cylindrical Lens 1st Surface Sub-Scan Direction Curvature Radius | Rs3(mm) | | | 26.99300 | | | |
| Cylindrical Lens 1st Surface Main-Scan Direction Curvature Radius | Rm3(mm) | | | infinite | | | |
| Cylindrical Lens 2nd Surface Curvature Radius | R4(mm) | | | infinite | | | |
| Cylindrical Lens 2nd Surface to Light Path Folding Mirror Distance | d4(mm) | | | 36.38000 | | | |
| Light Path Folding Mirror Position | x6(mm) | 14.49117 | y6(mm) | 0.00000 | z6(mm) | −0.50604 |
| Light Path Folding Mirror Curvature Radius | R5(mm) | | | infinite | | | |
| Light Path Folding Mirror to Deflective Reflection Surface Distance | d5(mm) | | | 14.50000 | | | |
| Deflective Reflection Surface Position | x6(mm) | 0.00000 | y6(mm) | 0.00000 | z6(mm) | 0.00000 |

TABLE 2-1-continued

| | | | | | | |
|---|---|---|---|---|---|---|
| Deflective Reflection Surface to 1st f-θ Lens 1st Surface Distance | d6(mm) | | | 24.50000 | | |
| 1st f-θ Lens 1st Surface Position | x6(mm) | 24.48508 | y6(mm) | 0.00000 | z6(mm) | 0.85504 |
| 1st f-θ Lens 2nd Surface Position | x7(mm) | 32.48020 | y7(mm) | 0.00000 | z7(mm) | 1.13423 |
| 1st f-θ Lens Thickness | d7(mm) | | | 8.00000 | | |
| 1st f-θ Lens Refractive Index | n3 | | | 1.52420 | | |
| 1st f-θ Lens 2nd Surface to 2nd f-θ Lens 1st Surface Distance | d8(mm) | | | 15.00000 | | |
| 2nd f-θ Lens 1st Surface Position | x8(mm) | 47.47106 | y8(mm) | 0.00000 | z8(mm) | 1.16583 |
| 2nd f-θ Lens 2nd Surface Position | x9(mm) | 54.46748 | y9(mm) | 0.00000 | z9(mm) | 0.94852 |
| 2nd f-θ Lens Thickness | d9(mm) | | | 7.00000 | | |
| 2nd f-θ Lens Refractive Index | n4 | | | 1.52420 | | |
| 2nd f-θ Lens 2nd Surface to Scanned-Surfaced Distance | d10(mm) | | | 174.90596 | | |
| Scanned-Surface Position | x10(mm) | 174.87914 | y10(mm) | 0.00000 | z10(mm) | 3.06292 |
| f-θ Lens Main-Scan Direction Focal Length | f(mm) | | | 135.81017 | | |
| Incidence Optical System Incidence Angle (Main-Scan Section) | γ(deg) | | | 120.00000 | | |
| Incidence Optical System Oblique Incidence Angle (Sub-Scan Section) | β(deg) | | | 2.00000 | | |
| 1st f-θ Lens Upward Angle (Sub-Scan Section) | δ(deg) | | | 2.00000 | | |
| 1st f-θ Lens Downward Angle (Sub-Scan Section) | η(deg) | | | 1.77899 | | |
| Optical Deflector Maximum Scan Angle | ζ(deg) | | | 38.24400 | | |
| Optical Deflector Effective Scan Angle | ξ(deg) | | | 22.85590 | | |
| Optical Deflector Resonance Frequency | f0(KHz) | | | 2.00000 | | |
| Optical Deflector Deflective Reflection Surface Size | Oblong | Main-scan 3 mm × Sub-scan 1 mm (Thickness 0.2 mm) | | | | |

TABLE 2-2

| | 1st Surface | | 2nd Surface |
|---|---|---|---|
| | 1st f-θ Lens Shape | | |
| R | −60.37653 | R | −35.88049 |
| k | −5.59958E+00 | k | −2.83241E+00 |
| B4 | 3.39474E+00 | B4 | −4.40767E−07 |
| B6 | −1.32326E−10 | B6 | 1.94101E−09 |
| B8 | −1.08146E−13 | B8 | 3.41840E−13 |
| B10 | 0.00000E+00 | B10 | 0.00000E+00 |
| r | −62.30060 | r | −59.33670 |
| D2 | 2.59900E−03 | D2 | −1.54472E−04 |
| D4 | 2.16896E−05 | D4 | −1.88223E−06 |
| D6 | −8.62574E−10 | D6 | 2.55867E−09 |
| D8 | −1.85569E−11 | D8 | 7.35046E−13 |
| D10 | 8.53487E−14 | D10 | 0.00000E+00 |
| | 2nd f-θ Lens Shape | | |
| R | 75.60110 | R | 80.18178 |
| k | −1.21062E+00 | k | −1.67582E+01 |
| B4 | −5.06980E−06 | B4 | −3.64676E−06 |
| B6 | 2.31400E−09 | B6 | 1.37576E−09 |
| B8 | −7.43803E−13 | B8 | −3.93865E−13 |
| B10 | 9.66145E−17 | B10 | 3.12718E−17 |
| r | −37.45820 | r | −13.93870 |
| D2 | 3.76861E−03 | D2 | 1.33908E−03 |
| D4 | 3.09223E−06 | D4 | −1.17051E−06 |
| D6 | 4.00640E−10 | D6 | 7.47398E−10 |
| D8 | −4.29864E−13 | D8 | −2.66160E−13 |
| D10 | 3.90865E−17 | D10 | 3.74682E−17 |

The coefficients in Table 2-2 have similar meanings as of the coefficients having been described with reference to the first embodiment.

With regard to the aspherical shape of the f-θ lens in the main scan section, the point of intersection between each lens surface and the optical axis is taken as an origin. The optical axis direction is taken as an X axis, the axis in the main scan section and being orthogonal to the optical axis is taken as a Y axis, and an axis in the sub-scan section and being orthogonal to the optical axis is taken as a Z axis.

Here, the following relation is given.

$$x = \frac{y^2/R}{1 + \left(1 - (1+k)(y/R)^2\right)^{1/2}} + \sum_{i=4}^{10} B_i y^i \quad (21)$$

wherein R is the curvature radius, and k and $B_4$-$B_{10}$ are aspherical coefficients.

Furthermore, the shape in the sub-scan section is such that the curvature radius r' at the lens surface coordinates of Y in the main scan direction can be given by the following equation.

$$r' = r\left(1 + \sum_{j=2}^{10} D_j y^j\right) \quad (22)$$

where r is the curvature radius on the optical axis, and $D_2$-$D_{10}$ are coefficients.

With regard to the non-arcuate shape of the f-θ lenses 161 and 162 in the main scan section, where the number of the optical surfaces (lens surfaces) that constitute the f-θ lens system is m and the surface shape of each optical surface in the main scan section is expressed by:

$$x = \frac{y^2/R}{1 + (1 - (1+k)(y/R)^2)^{1/2}} + \sum_{i=4}^{10} B_i y^i \quad (23)$$

the following conditions are satisfied.

If Y < 0 (24)

$$\sum_{j=1}^{m}\left[U_j(N_j-1)\left(\frac{dX}{dY_{(out)j}} + \frac{dX}{dY_{(in)j}} - 2\frac{dX}{dY_{(p)j}}\right)\right] < 0$$

If Y > 0

$$\sum_{j=1}^{m}\left[U_j(N_j-1)\left(\frac{dX}{dY_{(out)j}} + \frac{dX}{dY_{(in)j}} - 2\frac{dX}{dY_{(p)j}}\right)\right] > 0$$

wherein $U_j$ is a coefficient and $U_j$=−1 if the optical surface is a transmission surface and it is a light entrance surface; $U_j$=+1 if the optical surface is a transmission surface and it is a light exit surface; and $U_j$=+1 if the optical surface is a reflection surface. Also, $N_j$ is a coefficient and $N_j$ is equal to the refractive index of the glass material if the optical surface is a transmission surface; and $N_j$=2 if the optical surface is a reflection surface.

TABLE 2-3

| | Y > 0 | | | |
|---|---|---|---|---|
| | 1st Surface | 2nd Surface | 3rd Surface | 4th Surface |
| Scan End Side Marginal Ray Passage Y Coordinate | 23.8256 | 26.0248 | 44.5711 | 45.7894 |
| Principal Ray Passage Y Coordinate | 22.2286 | 24.6691 | 43.1176 | 44.5121 |
| Scan Central Side Marginal Ray Passage Y Coordinate | 20.6504 | 23.3226 | 41.6516 | 43.2030 |
| dx/dy (out) | −0.12743 | −0.39364 | −0.19294 | −0.56148 |
| dx/dy (up) | −0.14644 | −0.41363 | −0.15573 | −0.49107 |
| dx/dy (in) | −0.16058 | −0.42475 | −0.12032 | −0.42688 |
| U | −1 | 1 | −1 | −1 |
| N | 1.52420 | 1.52420 | 1.52420 | 1.52420 |
| U(N − 1)(dx/dy(out) + dy/dy(in) − 2dx/dy(p)) | −0.00255 | 0.00465 | 0.00095 | 0.00326 |
| Conditional Equation (24) Left Side | 0.00631 | | | |

TABLE 2-4

| | Y < 0 | | | |
|---|---|---|---|---|
| | 1st Surface | 2nd Surface | 3rd Surface | 4th Surface |
| Scan End Side Marginal Ray Passage Y Coordinate | −23.8256 | −26.0248 | −44.5711 | −45.7894 |
| Principal Ray Passage Y Coordinate | −22.2286 | −24.6691 | −43.1176 | −44.5121 |
| Scan Central Side Marginal Ray Passage Y Coordinate | −20.6504 | −23.3226 | −41.6516 | −43.2030 |
| dx/dy (out) | 0.12743 | 0.39364 | 0.19294 | 0.56148 |
| dx/dy (up) | 0.14644 | 0.41363 | 0.15573 | 0.49107 |
| dx/dy (in) | 0.16058 | 0.42475 | 0.12032 | 0.42688 |
| U | −1 | 1 | −1 | −1 |
| N | 1.52420 | 1.52420 | 1.52420 | 1.52420 |
| U(N − 1)(dx/dy(out) + dy/dy(in) − 2dx/dy(p)) | 0.00255 | −0.00465 | −0.00095 | −0.00326 |
| Conditional Equation (24) Left Side | −0.00631 | | | |

It is seen from these tables that, in this embodiment, the value of the left side of Equation (24) is positive when Y>0, and it is negative when Y<0, such that Equation (24) is surely satisfied.

In accordance with this embodiment, Equation (24) is satisfied to thereby positively produce a wavefront aberration of the same amount as the wavefront aberration produced by the deformation of the deflecting surface 6a as shown in FIG. 16, and in the opposite direction (cancelling direction). With this arrangement, the wavefront aberration produced as a result of deformation of the deflecting surface 6a is effectively reduced, and high-quality image output is accomplished.

Embodiment 3

Figure 35:
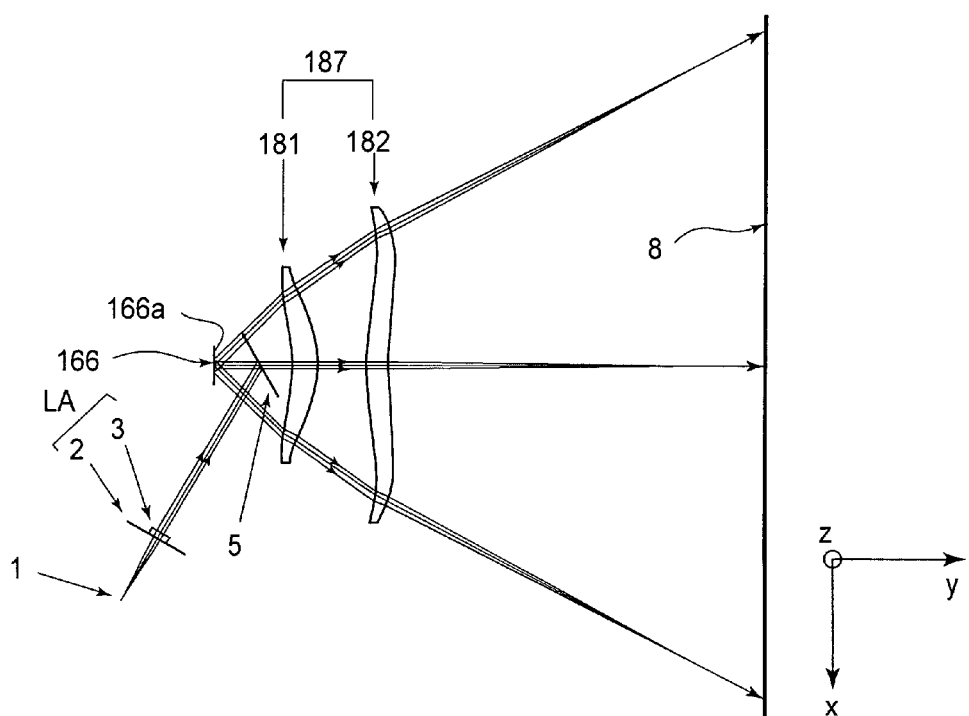
FIG. 35 is a sectional view along a main-scan section, for explaining a third embodiment of the present invention.

FIG. 35 illustrates a section (main scan section) of a main portion of a third embodiment of the present invention, in the main scan direction. In FIG. 35, elements corresponding to those shown in FIG. 18 are denoted by like numerals.

This embodiment differs from the second embodiment in that the input optical system LA is structured without a cylindrical lens 4. In addition to this, the shape of first and second imaging lenses (f-θ lenses) 181 and 182 that constitute an f-θ lens system 187 is designed while taking into account that deformation of the deflecting surface 166a in the main scan direction is changeable with the position of the deflecting surface 166a in the sub-scan direction.

The remaining portions have a similar structure and optical function as of the second embodiment, and similar advantageous results are provided.

As described hereinbefore, the optical deflector 166 based on reciprocating motion as in this embodiment has only one deflecting surface 166a and, therefore, there is no need of using a plane tilt correcting optical system.

Hence, in this embodiment, in the sub-scan section, the deflecting surface 166a and the photosensitive drum surface 8 are in a conjugate relation with each other, with respect to the f-θ lens 187. Namely, no plane tilt correcting optical system is used there. Furthermore, a cylindrical lens or the like is not disposed between the deflecting surface 166a and the light source means 1.

The structure and the principle of the optical deflector 166 of this embodiment are such as described with reference to the second embodiment.

The deflecting surface 166a of this optical deflector 166 is deformed in the main scan section (main scan direction) due to angular acceleration which results from the reciprocating motion, and the amount of this deformation is changeable in dependence upon the position of the deflecting surface 166a in the sub-scan direction.

Figure 36:
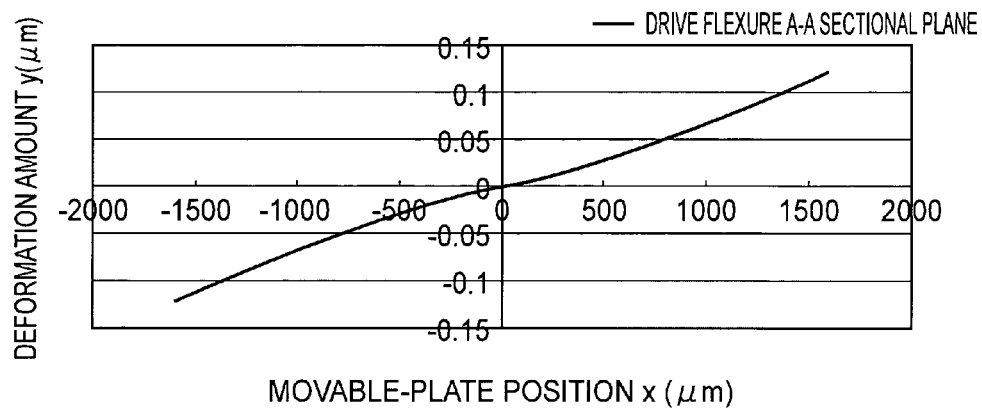
FIG. 36 is a graph, showing the result of calculation made to deformation of a movable plate of the third embodiment of the present invention, in accordance with the finite element method.

FIG. 36 is a graph showing the result of calculation made to the deformation of the movable plate 171 of this embodiment, in accordance with the finite element method.

Specifically, FIG. 36 shows deformation of the A-A section in FIG. 19 (central portion in the sub-scan direction) at the period 0.14 (light ray scan angle of 45 deg.) when the movable plate 171 that constitute the optical deflector 166 is being resonance-driven in accordance with the aforementioned Equation (15).

Here, the tilt of connection (at C in FIG. 19) between the torsion spring 173 and the movable plate 171 is taken as zero. The axis of abscissa denotes the position coordinates of the movable plate 171 (unit is μm), and the axis of ordinates denotes the deformation amount y of the movable plate 171 (unit is μm).

Figure 37:
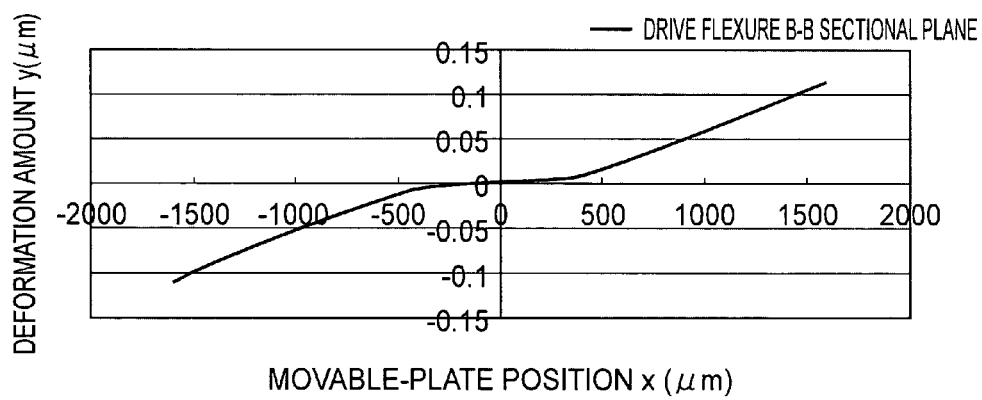
FIG. 37 is a graph, showing the result of calculation made to deformation of a movable plate of the third embodiment of the present invention, in accordance with the finite element method.

Similarly, FIG. 37 is a graph showing the result of calculation made to deformation of the B-B section (the position spaced by 0.9 mm from the central portion in the sub-scan direction toward the sub-san direction) in FIG. 19, in accordance with the finite element method. Similarly, the tilt of connection (at C in FIG. 19) between the torsion spring 173 and the movable plate 171 is taken as zero.

It is seen from FIGS. 36 and 37 that the amount of deformation is different between the A-A section and the B-B section.

Figure 38:
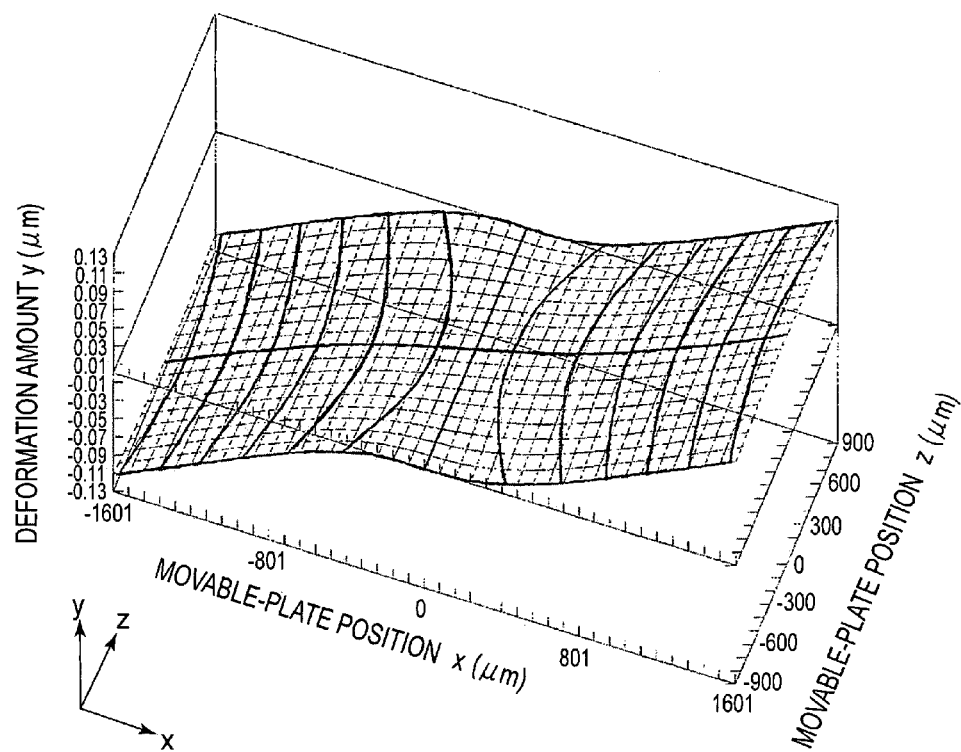
FIG. 38 is a schematic and perspective view for three-dimensionally illustrating the amount of deformation of a movable plate in the third embodiment of the present invention.

FIG. 38 is a schematic and perspective view wherein the amount of deformation described above is illustrated three-dimensionally. The direction of the movable-plate position x in FIG. 37 corresponds to the main scan direction, and the direction of the movable-plate position z corresponds to the sub-scan direction.

It is seen from FIG. 38 that, in the section along the main scan direction, deformation is such as shown in FIG. 36 or 37. In addition to this, it is seen that the deformation amount changes with the position of the movable plate 171 in the sub-scan direction, such that there is deformation produced in the sub-scan section, too.

In FIG. 38, if the negative (−) direction of the movable-plate position x coincides with the above of the deflecting surface 166a in FIG. 35, the scan position where the deformation shown in FIG. 38 is produced corresponds to the largest effective scan position at the side remote from the light source side in FIG. 35. In other words, the scan position where the deformation shown in FIG. 38 is produced does correspond to the largest effective scan position at a side opposite to the light source means 1 side, with respect to the center of the optical axis of the imaging optical system 187, and it corresponds to deformation of the deflecting surface at the effective deflection angle of +22.5 deg.

Furthermore, it is seen from FIG. 38 that the deflecting surface 166a is being deformed into a concave shape, in the z-direction section (sub-scan section) and at the negative (−) side of the movable-plate position x, whereas, to the contrary, it is deformed into a convex shape in the z-direction section (sub-scan section) at the positive (+) side of the movable-plate position x.

As regards the deformation of the deflecting surface at the effective deflection angle −22.5 deg., although it is not shown, the deflecting surface 166a is deformed into a convex shape in the z-direction section (sub-scan section) at the negative (−) side of the movable-plate position x, whereas, to the contrary, it is deformed into a concave shape in the z-direction section at the positive (+) side of the movable-plate position x.

In this embodiment, within the sub-scan section, the f-θ lens 187 does not function to bring the deflecting surface 166a and the photosensitive drum surface 8 into a conjugate relationship with each other. Namely, no tilt correction optical system is provided. Therefore, the light beam incident on the deflecting surface 166a has a desired light beam width in each of the main scan direction and the sub-scan direction.

Where an ordinary tilt correction optical system is used, a light beam being converged in the sub-scan direction is projected upon the deflecting surface. The light beam width in the sub-scan direction, upon the deflecting surface, is generally about 0.1 mm or less.

On the other hand, the light beam width upon the deflecting surface in the sub-scan direction if no tilt correction optical system is provided needs to be a light beam width as determined by the spot diameter on the photosensitive drum surface 8. In this embodiment, the light beam width on the deflecting surface 166a is 2.4 mm in the main scan direction, and it is 1.72 mm in the sub-scan direction.

In this embodiment, the movable plate 171 is being deformed such as shown in FIGS. 36-38 due to the dead weight thereof. As a result of this, in the light beam reflected by the deflecting surface 166a, there is produced wavefront aberration of an amount twice the deformation y shown in FIGS. 36-38. Hence, an adverse influence would be exerted to the focused spot on the photosensitive drum surface 8.

In optical scanning systems having a rotational polygonal mirror as an optical deflector, since the rotational polygonal mirror is being rotated at a constant angular speed, deformation such as shown in FIGS. 36-38 is not produced and, therefore, wavefront aberraton as mentioned above would not be produced normally.

For these reasons, when an imaging lens to be used in optical scanning systems having a rotational polygonal mirror is designed, in many cases no particular attention is paid to the deformation of the deflecting surface.

However, if an optical deflector 166 based on resonance drive is used in combination with an imaging lens having been designed as above (namely, without paying attention to deformation of the deflecting surface), due to wavefront aberration caused by deformation of the deflecting surface 1666a the focused spot would be deteriorated.

Figure 39:
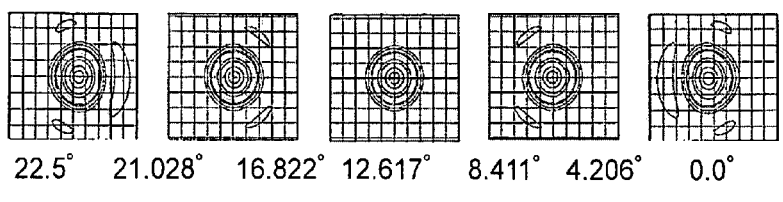
FIG. 39 is a schematic view, showing profiles of spots at respective scan positions on the surface to be scanned, in the third embodiment of the present invention.

FIG. 39 shows an example of spot shapes on the photosensitive drum surface 8 in a case where an imaging lens having been designed on an assumption that the deflecting surface 166a has no deformation is used and where the deflecting surface 166a is actually being deformed as in this embodiment.

Specifically, FIG. 39 illustrates the shapes of spots on the photosensitive drum 8 surface where the deflection angle of the light beam deflected by the deflecting surface 166a is +22.5 degrees, +21.028 degrees, 0 degree, −21.028 degree, −22.5 degree, respectively. Contours in FIG. 39 correspond to the intensities being sliced with respect to the levels of (from the outside) 0.02, 0.05, 0.1, 0.1353, 0.3679, 0.5, 0.75 and 0.9, respectively, when the peak intensity of the focused spot is standardized to 1.

In FIG. 39, the lateral direction corresponds to the main scan direction along which the spot scans the surface, while the longitudinal direction corresponds to the sub-scan direction which is orthogonal to the main-scan direction.

It is seen from FIG. 39 that the spot shapes in the case where the deflecting surface 166a is being deformed include a sidelobe in the main scan direction and obliquie directions. In addition to this, the outer configuration itself of the focused spot is distorted into a barrel-like shape, and the shape of the focused spot is deteriorated seriously.

It is well known that the image quality degrades as the peak intensity of a sidelobe becomes large. Particularly, when the shape of the focused spot turns into a barrel-like shape such as illustrated in the examples at the opposite ends in FIG. 39, the reproducibility of oblique lines would be degraded seriously. This is undesirable for optical scanning systems or image forming apparatuses where high quality image output is required.

As described above, when an optical deflector based on resonance drive is used in combination with an imaging lens having been designed without attention to deformation of the deflecting surface, due to wavefront aberration caused by deformation of the deflecting surface 166a the focused spot would be deteriorated. As a result of it, it becomes difficult to accomplish optical scanning systems or image forming apparatuses where high quality image output is required.

In consideration of this, in this embodiment, the f-θ lens system 187 is configured to reduce the amount of wavefront aberration after being transmitted through the f-θ lens 187, which aberration has been produced by the deflecting surface 166a being distorted as shown in FIGS. 36-38 due to the resonance drive.

Figure 40:
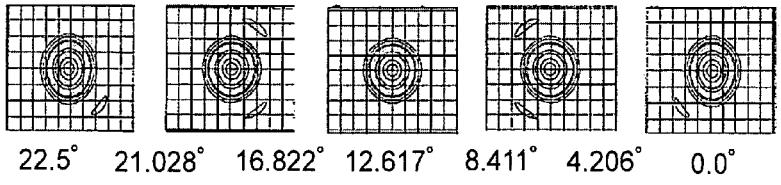
FIG. 40 is a schematic view, showing profiles of spots at respective scan positions on the surface to be scanned, in the third embodiment of the present invention.

FIG. 40 illustrates the shapes of spots formed on the photosensitive drum surface 8, in this embodiment of the present invention.

In accordance with this embodiment, the amount of wavefront aberration produced by the deflecting surface 166a being distorted by angular acceleration applied thereto in response to the resonance drive, is reduced by means of the f-θ lens system 187. As a result of this, it is seen from FIG. 40 that, as compared with the spot shapes shown in FIG. 39, the sidelobes haven been diminished and the outer configuration of the focused spots itself has been improved.

Here, in this embodiment, the term "first direction" is now used to refer to the direction of the phase difference of wavefront aberration in the main scan direction between a marginal ray and a principal ray of the light beam reflected by the deflecting surface 166a at an effective deflection angle of the same, the phase difference being produced as a result of reflection of the light beam by that deflecting surface. Alternatively, the term "first direction" may refer to the direction of the optical path difference of the marginal ray in the main scan direction, with respect to the principal ray, of the light beam reflected by the deflecting surface 166a, the path length difference being produced as a result of reflection of the light beam by that deflecting surface.

Furthermore, the term "second direction" is used to refer to the direction of the phase difference of wavefront aberration in the main scan direction between a marginal ray and a principal ray of the light beam reflected by the deflecting surface 166a at an effective deflection angle thereof, the phase difference being produced as a result of transmission of the light beam through the f-θ lens system 187. Alternatively, the term "second direction" may refer to the direction of the direction of the optical path difference of the marginal ray in the main scan direction, with respect to the principal ray, of the light beam reflected by the deflecting surface 166a, the path length difference being produced as a result of transmission of that light beam through the imaging optical system.

Then, in this embodiment, at least one optical element inside the f-θ lens system 187 is provided with at least one optical surface having non-arculate shape in the main scan section, so as to assure that the first and second directions mentioned above are made opposite to each other.

The optical principle for that is such as described with reference to the first embodiment (see FIGS. 12-17). In accordance with this principle, in this embodiment, the amount of wavefront aberration produced due to deformation of the deflecting surface 166a can be reduced significantly.

In this embodiment, as described above, the wavefront aberration produced as a result of deformation of the deflecting surface 166a of the optical deflector 166 based on sine oscillation, is compensated by positively producing, through the f-θ lens system 187, a wavefront aberration of the same amount as the wavefront aberration resulting from the deformation.

Here, in this embodiment, first, $\delta L1_+$ is used to refer to the optical path difference between one of marginal rays (upper light ray) and the principal ray of the light beam reflected by the deflecting surface at an effective deflection angle +22.5 deg. thereof, the difference being produced as a result of reflection of the light beam by the deflecting surface. Second, $\delta L1_-$ is used to refer to the optical path difference between the other marginal ray (lower light ray) and the principal ray of the light beam reflected by the deflecting surface at an effective deflection angle +22.5 deg. thereof, the difference being produced as a result of reflection of the light beam by the deflecting surface.

Third, $\delta L2_+$ is used to refer to the optical path difference between one of marginal rays (upper light ray) and the principal ray of the light beam reflected by the deflecting surface at an effective deflection angle +22.5 deg. of the same, the difference being produced as a result of transmission of the light beam through the imaging optical system. Fourth, $\delta L2_-$ is used to refer to the optical path difference between the other marginal ray (lower light ray) and the principal ray of the light beam reflected by the deflecting surface at an effective deflection angle +22.5 deg. of the same, the difference being produced as a result of transmission of the light beam through the imaging optical system.

Then, the imaging optical system satisfies the following relation.

$$0.8 \le \frac{\delta L2_- - \delta L2_+}{\delta L1_+ - \delta L1_-} \le 1.2 \qquad (25)$$

With this arrangement, the amount of wavefront aberration resulting from deformation of the deflecting surface 166a can be reduced significantly.

Although in this embodiment a case of effective deflection angle +22.5 deg. for the deflecting surface has been taken as an example and description has been made to demonstrate that Equation (25) above is satisfied, in this embodiment Equation (25) can still be satisfied where the effective deflection angle of the deflecting surface is −22.5 deg. Furthermore, it should be noted that in this embodiment Equation (25) is satisfied with all deflection angles which are within the effective deflection angle range of ±22.5 degrees.

Next, wavefront aberration within the sub-scan section will be explained in greater detail.

Figure 41:
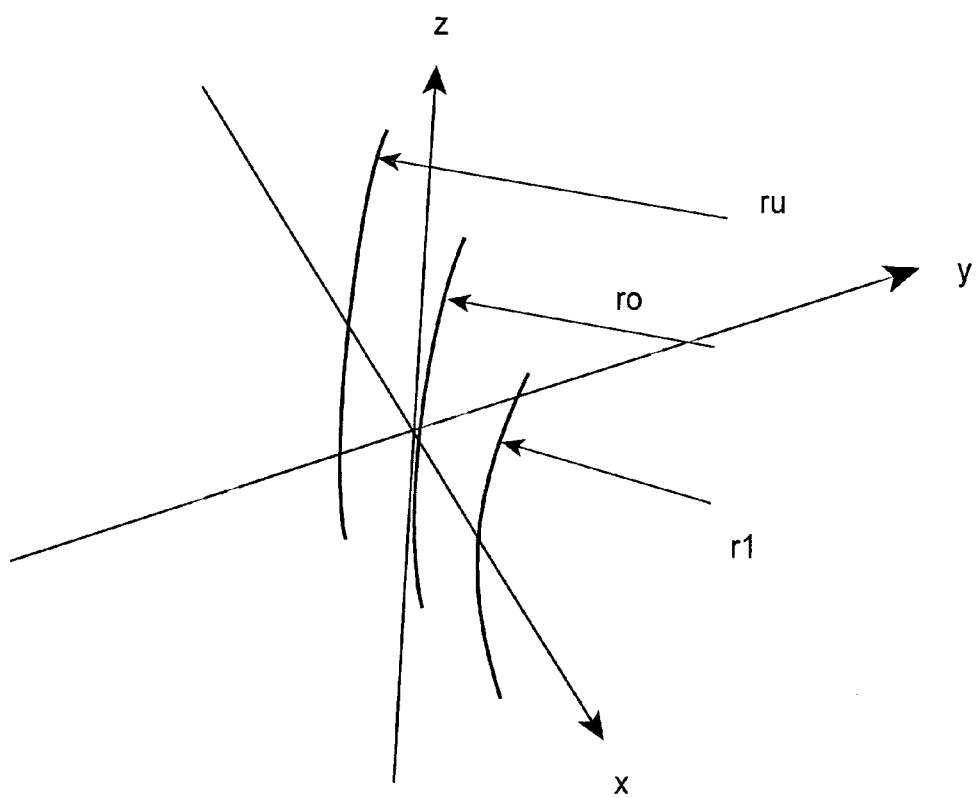
FIG. 41 is a schematic view for explaining the magnitude relation in wavefront with respect to the sub-scan direction, which is defined after a parallel light passed through an f-θ lens system.

FIG. 41 schematically illustrates the state of wavefront after a parallel light beam, having been incident at a scan position corresponding to the light beam, passed through the f-θ lens system 187.

The light beam incident on the f-θ lens system 187 is parallel both in the main scan section and in the sub-scan section.

The x axis in FIG. 41 corresponds to the x axis in FIG. 38, and the y axis in FIG. 41 corresponds to the y axis of FIG. 38. The z axis in FIG. 41 corresponds to the z axis of FIG. 38. This applies similarly to the x and y axes of FIG. 35.

Specifically, FIG. 41 illustrates the wavefront of a parallel light beam in the sub-scan direction after the same passed through the f-θ lens system 187, in a case where the sign of the deflection angle is positive. In other words, it illustrates the wavefront in the sub-scan direction after the light beam, impinging on a scan position between the scan center on the surface to be scanned and the writing-star-position-side largest effective scan position (largest image height) on the surface to be scanned, in the main scan section, passed through the f-θ lens system 187.

The scan center on the surface to be scanned and the writing-start-position side correspond to the upper side in FIG. 35 as well as the side opposite to the input optical system LA.

In FIG. 41, ro denotes the curvature radius of the wavefront in the sub-scan direction, at the position of a ray (principal ray) in the central portion with respect to the main scan direction, after the parallel light passed through the f-θ lens system 187. Further, ru similarly denotes the curvature radius of the wavefront in the sub-scan direction at the light ray position at the scan end portion side (positive side in the x direction) with respect to the principal ray in the main scan direction, after the parallel light passed through the f-θ lens system 187. Furthermore, rl similarly denotes the curvature radius of the wavefront in the sub-scan direction at the light ray position at the scan central portion side (negative side in the x direction) with respect to the principal ray in the main scan direction, after the parallel light passed through the f-θ lens system 187.

In this embodiment, as shown in FIG. 41, the curvature radius ru of the wavefront in the sub-scan direction at the light ray passage position at the scan end portion side with respect to the principal ray of the light beam after the same passed through the f-θ lens system 187, is set as follows.

That is, the curvature radius ru of the wavefront in the sub-scan direction at the light ray passage position at the scan end portion side with respect to the principal ray of the light beam is made larger than the curvature radius rl of the wavefront in the sub-scan direction at the light ray passage position at the scan central portion side with respect to the principal ray of the light beam, namely, rl<ru.

Here, the words "scan end portion side" refers to the positive side in the x direction, and the words "scan central portion side" refers to the negative side in the x direction.

By shaping the f-θ lens system 187 in this manner, the wavefront is deformed into a concave shape in the z-direction section (sub-scan section) at the negative side of the movable plate position x, as shown in FIG. 38. Furthermore, in the z-direction section (sub-scan section) at the positive side of the movable plate position x, it is deformed into a convex shape, to the contrary. As a result of these deformations, the produced wavefront aberration can be corrected effectively.

On the other hand, the wavefront in the sub-scan direction after a parallel light passed through the f-θ lens 187, in a case where the sign of the deflection angle is negative, is such as follows.

The curvature radius ru' of the wavefront of the light beam in the sub-scan direction at the light ray passage position at the scan center side, with respect to the principal ray of the light beam, is made smaller than the curvature radius rl' of the wavefront of the light beam in the sub-scan direction at the light ray passage position at the scan end portion side with respect to the principal ray of the light beam, namely, rl'>ru'.

In other words, the wavefront in the sub-scan direction after the light beam, impinging on the scan position between the scan center on the surface to be scanned and the writing-star-position-side largest effective scan position (largest image height) on the surface to be scanned, in the main scan section, passes through the f-θ lens system 187 satisfies the relation rl'>ru'.

Here, the words "scan center side" refers to the positive side in the x direction in FIG. 41, and the words "scan end portion side" refers to the negative side in the x direction in FIG. 41.

In accordance with this embodiment of the present invention, as described hereinbefore, high-speed scan can be achieved even if an optical deflector 166 based on resonance drive is used, and optical scanning systems and image forming apparatuses which require high-quality image outputs without deteriorated image quality can be accomplished.

Table 3-1 and Table 3-2 below show specifications of the scanning optical system according to this embodiment of the present invention.

TABLE 3-1

| | | | | | | | |
|---|---|---|---|---|---|---|---|
| Used Reference Wavelength | λ(nm) | | | 780 | | | |
| No. of Light Emission Paints | n | | | 1 | | | |
| Position of Light Emission Points | x0(mm) | −29.38709 | y0(mm) | −75.99937 | z0(mm) | −3.57057 |
| Semiconductor Laser Cover Glass Refractive Index | n1 | | | 1.51072 | | | |
| Semiconductor Laser Cover Glass Thickness | deg(mm) | | | 0.25 | | | |
| Position of Stop | x1(mm) | −17.80914 | y1(mm) | −55.94578 | z1(mm) | −2.76195 |
| Shape of Stop | Elliptical | | Main-scan 2.4 mm × Sub-scan 1.72 mm | | | | |
| Light Emission Point to Collimator Lens 1st Surface Distance | d1(mm) | | | 23.67000 | | | |
| Collimator Lens 1st Surface Position | x2(mm) | −17.55930 | y2(mm) | −55.51303 | z2(mm) | −2.74450 |
| Collimator Lens 2nd Surface Position | x3(mm) | −16.55991 | y3(mm) | −53.78204 | z3(mm) | −2.67470 |
| Collimator Lens Thickness | d2(mm) | | | 2.00000 | | | |
| Collimator Lens Refractive Index | n2 | | | 1.76203 | | | |
| Collimator Lens 1st Surface Curvature Radius | R2(mm) | | | 182.21200 | | | |
| Collimator Lens 2nd Surface Curvature Radius | R3(mm) | | | −20.83080 | | | |
| Collimator Lens 2nd Surface to | d3(mm) | | | 62.14000 | | | |

TABLE 3-1-continued

| | | | | | | |
|---|---|---|---|---|---|---|
| Light Path Folding Mirror Distance | | | | | | |
| Light Path Folding Mirror Position | x4(mm) | 14.49117 | y6(mm) | 0.00000 | z6(mm) | −0.50604 |
| Light Path Folding Mirror Curvature Radius | R4(mm) | | | infinite | | |
| Light Path Folding Mirror to Deflective Reflection Surface Distance | d4(mm) | | | 14.50000 | | |
| Deflective Reflection Surface Position | x5(mm) | 0.00000 | y6(mm) | 0.00000 | z6(mm) | 0.00000 |
| Deflective Reflection Surface to 1st f-θ Lens 1st Surface Distance | d5(mm) | | | 24.50000 | | |
| 1st f-θ Lens 1st Surface Position | x6(mm) | 24.48508 | y6(mm) | 0.00000 | z6(mm) | 0.85504 |
| 1st f-θ Lens 2nd Surface Position | x7(mm) | 32.48020 | y7(mm) | 0.00000 | z7(mm) | 1.13423 |
| 1st f-θ Lens Thickness | d6(mm) | | | 8.00000 | | |
| 1st f-θ Lens Refractive Index | n6 | | | 1.52420 | | |
| 1st f-θ Lens 2nd Surface to 2nd f-θ Lens 1st Surface Distance | d7(mm) | | | 15.00000 | | |
| 2nd f-θ Lens 1st Surface Position | x8(mm) | 47.47106 | y8(mm) | 0.00000 | z8(mm) | 0.67495 |
| 2nd f-θ Lens 2nd Surface Position | x9(mm) | 54.46881 | y9(mm) | 0.00000 | z9(mm) | 0.49723 |
| 2nd f-θ Lens Thickness | d8(mm) | | | 7.00000 | | |
| 2nd f-θ Lens Refractive Index | n8 | | | 1.52420 | | |
| 2nd f-θ Lens 2nd Surface to Scanned-Surfaced Distance | d9(mm) | | | 119.93561 | | |
| Scanned-Surface Position | x10(mm) | 173.74492 | y10(mm) | 0.00000 | z10(mm) | 4.26525 |
| f-θ Lens Main-Scan Direction Focal Length | f(mm) | | | 136.23663 | | |
| Incidence Optical System Incidence Angle (Main-Scan Section) | γ(deg) | | | 120.00000 | | |
| Incidence Optical System Oblique Incidence Angle (Sub-Scan Section) | β(deg) | | | 2.00000 | | |
| 1st f-θ Lens Upward Angle (Sub-Scan Section) | δ(deg) | | | 2.00000 | | |
| 2nd f-θ Lens Downward Angle (Sub-Scan Section) | η(deg) | | | 1.45477 | | |
| Optical Deflector Maximum Scan Angle | ζ(deg) | | | 38.24400 | | |
| Optical Deflector Effective Scan Angle | ξ(deg) | | | 22.50000 | | |
| Optical Deflector Resonance Frequency | f0(KHz) | | | 2.00000 | | |
| Optical Deflector Deflective Reflection Surface Size | Oblong | Main-scan 3 mm × Sub-scan 1 mm (Thickness 0.2 mm) | | | | |

TABLE 3-2

| 1st Surface | | 2nd Surface | |
|---|---|---|---|
| 1st f-θ Lens Shape | | | |
| R | −62.03226 | R | −35.51636 |
| k | −5.72820E+00 | k | −2.52967E+00 |
| B4 | 3.85813E−06 | B4 | −3.83325E−07 |
| B6 | −1.16907E−10 | B6 | 2.55048E−09 |
| B8 | −1.52913E−13 | B8 | 3.79417E−13 |
| B10 | 3.97146E−19 | B10 | 0.00000E+00 |
| r | −60.13640 | r | −50.24600 |
| D2 | −2.13334E−05 | D2 | 2.62162E−04 |
| D4 | 2.24995E−07 | D4 | −5.70578E−08 |
| D6 | 0.00000E+00 | D6 | −1.71022E−10 |
| D8 | 1.95034E−12 | D8 | 3.16804E−12 |
| D10 | 0.00000E+00 | D10 | −1.43556E−15 |
| 2nd f-θ Lens Shape | | | |
| R | 77.38909 | R | 77.00424 |
| k | −1.06823E+00 | k | −1.44697E+01 |
| B4 | −4.82366E−06 | B4 | −3.14157E−06 |
| B6 | 2.28120E−09 | B6 | 1.22380E−09 |
| B8 | −7.52588E−13 | B8 | −3.43288E−13 |
| B10 | 9.70343E−17 | B10 | 2.44857E−17 |
| r | −78.36720 | r | −40.90430 |
| D2 | −5.14090E−06 | D2 | 2.66485E−06 |
| D4 | 2.18649E−07 | D4 | −6.86574E−09 |
| D6 | 6.49609E−12 | D6 | 1.38227E−14 |
| D8 | −2.66003E−14 | D8 | −2.25877E−16 |
| D10 | −2.40929E−18 | D10 | −3.16679E−19 |

The coefficients in Table 3-2 have similar meanings as of the coefficients having been described with reference to the first embodiment.

With regard to the aspherical shape of the f-θ lenses 181 and 182 in the main scan section, the point of intersection between each lens surface and the optical axis is taken as an origin. The optical axis direction is taken as an X axis, the axis in the main scan section and being orthogonal to the optical axis is taken as a Y axis, and an axis in the sub-scan section and being orthogonal to the optical axis is taken as a Z axis.

Here, the following relation is given.

$$x = \frac{y^2/R}{1+(1-(1+k)(y/R)^2)^{1/2}} + \sum_{i=4}^{10} B_i y^i \quad (26)$$

wherein R is the curvature radius, and k and $B_4$-$B_{10}$ are aspherical coefficients.

Furthermore, the shape in the sub-scan section is such that the curvature radius r' at the lens surface coordinates of Y in the main scan direction can be given by the following equation.

$$r' = r\left(1 + \sum_{j=2}^{10} D_j y^j\right) \quad (27)$$

where r is the curvature radius on the optical axis, and $D_2$-$D_{10}$ are coefficients.

With regard to the non-arcuate shape of the f-θ lenses in the main scan section, where the number of the optical surfaces (lens surfaces) that constitute the f-θ lens system is m and the surface shape of each optical surface in the main scan section is expressed by:

$$x = \frac{y^2/R}{1+(1-(1+k)(y/R)^2)^{1/2}} + \sum_{i=4}^{10} B_i y^i \quad (28)$$

the following conditions are satisfied.

If $Y < 0$ (29)

$$\sum_{j=1}^{m}\left[U_j(N_j-1)\left(\frac{dX}{dY_{(out)j}} + \frac{dX}{dY_{(in)j}} - 2\frac{dX}{dY_{(p)j}}\right)\right] < 0$$

If $Y > 0$ $$\sum_{j=1}^{m}\left[U_j(N_j-1)\left(\frac{dX}{dY_{(out)j}} + \frac{dX}{dY_{(in)j}} - 2\frac{dX}{dY_{(p)j}}\right)\right] > 0$$

wherein $U_j$ is a coefficient and $U_j=-1$ if the optical surface is a transmission surface and it is a light entrance surface; $U_j=+1$ if the optical surface is a transmission surface and it is a light exit surface; and $U_j=+1$ if the optical surface is a reflection surface. Also, $N_j$ is a coefficient and $N_j$ is equal to the refractive index of the glass material if the optical surface is a transmission surface; and $N_j=2$ if the optical surface is a reflection surface.

Table 3-3 and Table 3-4 below show numerical values in this embodiment as well as numerical values of the left side of Equation (29) above.

TABLE 3-3

| | Y > 0 | | | |
|---|---|---|---|---|
| | 1st Surface | 2nd Surface | 3rd Surface | 4th Surface |
| Scan End Side Marginal Ray Passage Y Coordinate | 23.5380 | 25.5722 | 43.6421 | 45.5000 |
| Principal Ray Passage Y Coordinate | 21.9195 | 24.2074 | 42.1213 | 44.0806 |
| Scan Central Side Marginal Ray Passage Y Coordinate | 20.3295 | 22.8617 | 40.6177 | 42.6643 |
| dx/dy (out) | −0.10139 | −0.37430 | −0.13716 | −0.40843 |
| dx/dy (up) | −0.12419 | −0.40088 | −0.09961 | −0.34251 |
| dx/dy (in) | −0.14142 | −0.41644 | −0.06593 | −0.28538 |
| U | −1 | 1 | −1 | −1 |
| N | 1.52420 | 1.52420 | 1.52420 | 1.52420 |
| U(N − 1)(dx/dy(out) + dy/dy(in) − 2dx/dy(p)) | −0.00292 | 0.00578 | 0.00203 | 0.00460 |
| Conditional Equation (29) Left Side | 0.00949 | | | |

TABLE 3-4

| | Y < 0 | | | |
|---|---|---|---|---|
| | 1st Surface | 2nd Surface | 3rd Surface | 4th Surface |
| Scan End Side Marginal Ray Passage Y Coordinate | −23.5380 | −25.5722 | −43.6421 | −45.5000 |
| Principal Ray Passage Y Coordinate | −21.9195 | −24.2074 | −42.1213 | −44.0806 |
| Scan Central Side Marginal Ray Passage Y Coordinate | −20.3295 | −22.8617 | −40.6177 | −42.6643 |
| dx/dy (out) | 0.10139 | 0.37430 | 0.13716 | 0.40843 |
| dx/dy (up) | 0.12419 | 0.40088 | 0.09961 | 0.34251 |
| dx/dy (in) | 0.14142 | 0.41644 | 0.06593 | 0.28538 |
| U | −1 | 1 | −1 | −1 |
| N | 1.52420 | 1.52420 | 1.52420 | 1.52420 |
| U(N − 1)(dx/dy(out) + dy/dy(in) − 2dx/dy(p)) | 0.00292 | −0.00578 | −0.00203 | −0.00460 |
| Conditional Equation (29) Left Side | −0.00949 | | | |

It is seen from these tables that, in this embodiment, the value of the left side of Equation (29) is positive when Y>0, and it is negative when Y<0, such that Equation (29) is surely satisfied.

In accordance with this embodiment, Equation (29) is satisfied to thereby positively produce a wavefront aberration of the same amount as the wavefront aberration produced by the deformation of the deflecting surface 166a, and in the opposite direction (cancelling direction). With this arrangement, the wavefront aberration produced as a result of deformation of the deflecting surface 166a is effectively reduced, and high-quality image output is accomplished.

This embodiment uses a resonance type optical deflector, as an optical deflector, in which a system constituted by plural movable plates and torsion springs is drive controlled so that it oscillates at a reference frequency and a frequency corresponding to a multiple, by an integer, of the reference frequency at the same time. However, the invention is not limited to this.

For example the present invention is effective when applied to a system wherein an optical deflector based on simple sine oscillation is used.

Furthermore, although in this embodiment the imaging optical system 187 comprises two lenses, the invention is not limited to this. For example, the imaging lens may be provided by a single lens or three or more lenses. Moreover, a diffractive optical element may be included in the imaging optical system.

Embodiment of Image Forming Apparatus

Figure 42:
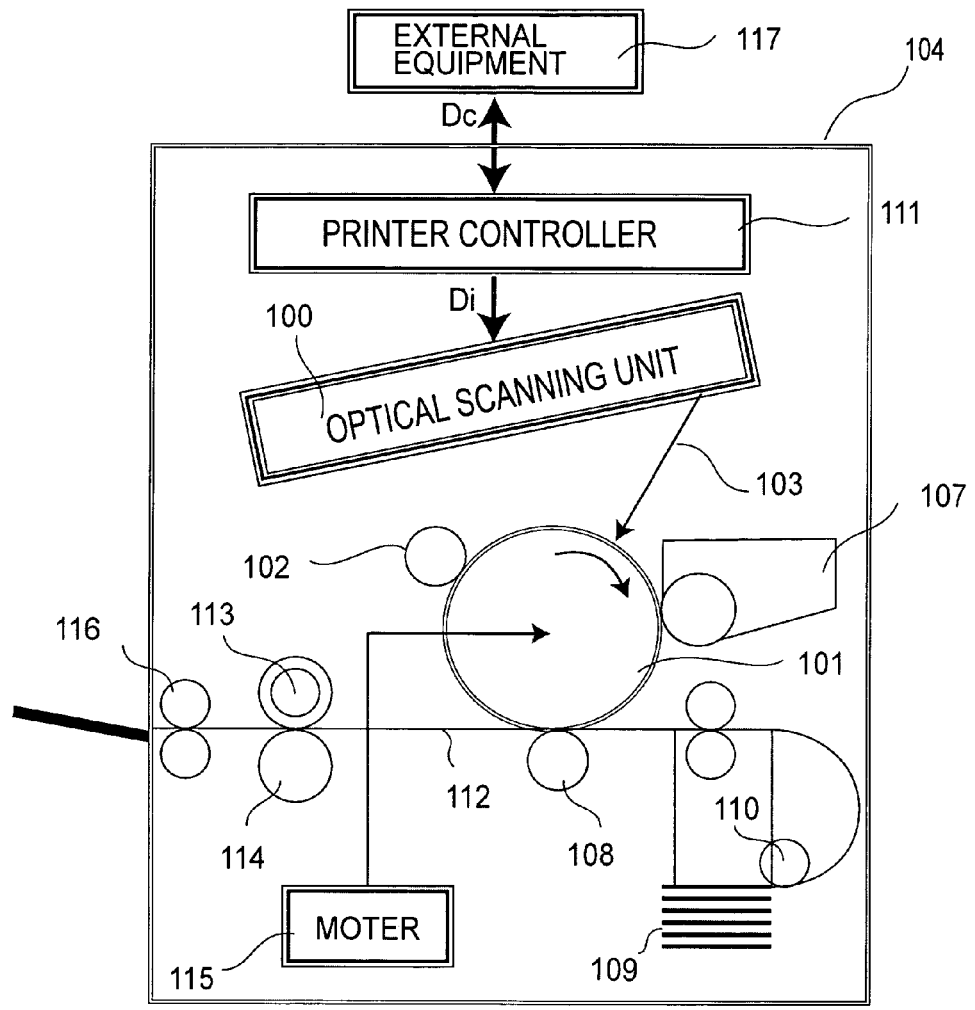
FIG. 42 is a schematic and sectional view, along the sub-scan section, of an image forming apparatus according to an embodiment of the present invention.

FIG. 42 is a schematic and sectional view, in the sub-scan direction, of a main portion of an image forming apparatus according to an embodiment of the present invention. Denoted generally at 104 in the drawing is the image forming apparatus.

The image forming apparatus 104 receives code data Dc supplied thereto from an external machine 117 such as a personal computer, for example. The code data Dc is then transformed by a printer controller 111 inside the apparatus, into imagewise data (dot data) Di.

The imagewise data Di is then inputted into an optical scanning unit 100 which is configured in accordance with any one of the preceding embodiments described hereinbefore. The optical scanning unit 100 produces a light beam 103 having been modulated in accordance with the imagewise data Di, and with this light beam 103, the photosensitive surface of a photosensitive drum 101 is scanned in the main-scan direction.

The photosensitive drum 101 which is an electrostatic latent image bearing member (photosensitive member) is rotated clockwise by means of a motor 115. Through this rotation, the photosensitive surface of the photosensitive drum 101 is moved relatively to the light beam 103, in the sub-scan direction which is orthogonal to the main-scan direction.

Disposed just above the photosensitive drum 101 is a charging roller 102 which is in contact with the photosensitive drum surface to electrically charge the drum surface uniformly. Onto the photosensitive drum 101 surface having been electrically charged by the charging roller 102, the light beam 103 being scanned by the optical scanning unit 100 is projected.

As described above, the light beam 103 has been modulated in accordance with the imagewise data Di. By irradiating the photosensitive drum 101 with this light beam 103, an electrostatic latent image is formed on the photosensitive drum 101 surface. The electrostatic latent image thus formed is then developed into a toner image, by means of a developing device 107 which is provided at a position downstream of the irradiation position of the light beam 103 with respect to the rotational direction of the photosensitive drum 101 and which is in contact with the photosensitive drum 101.

The toner image thus developed by the developing device 107 is transferred onto a transfer sheet (transfer material) 112 below the photosensitive drum 101, by means of a transfer roller 108 which is disposed opposed to the photosensitive drum 101.

Transfer sheets 112 are stored in a sheet cassette 109 in front of (at the right-hand side as viewed in FIG. 42) the photosensitive drum, but these can be supplied manually. There is a sheet supplying roller 110 at an end portion of the sheet cassette 109, for supplying each sheet 112 in the cassette 109 into a sheet supply path.

The paper sheet 112 having an unfixed toner image transferred thereto in the manner described above is conveyed to a fixing device behind (at the left-hand side as viewed in FIG. 42) the photosensitive drum 101. The fixing device comprises a fixing roller 113 having a built-in fixing heater (not shown) and a pressing roller 114 disposed to be press-contacted to the fixing roller 113. The transfer sheet 112 supplied from the image transfer station is heated under pressure at the press contact area between the fixing roller 113 and the pressing roller 114, whereby the unfixed toner image on the transfer sheet 112 is fixed thereon.

Behind the fixing roller 113, there are sheet discharging rollers 116 which function to discharge the image-fixed sheet 112 out of the image forming apparatus.

While not shown in FIG. 42, the print controller 111 has various functions in addition to the data conversion function described hereinbefore, such as for controlling a motor 115 or any other components inside the image forming apparatus as well as an optical deflector inside the optical scanning unit (to be described later).

There is no particular limitation with regard to the recording density of the image forming apparatus to be used in the present invention. However, since the higher the recording density is, the higher the required image quality is, the structures according to the first to third embodiments of the present invention will be more effective when they are introduced into an image forming apparatus of a resolution 1200 dpi or higher.

Embodiment of Color Image Forming Apparatus

Figure 43:
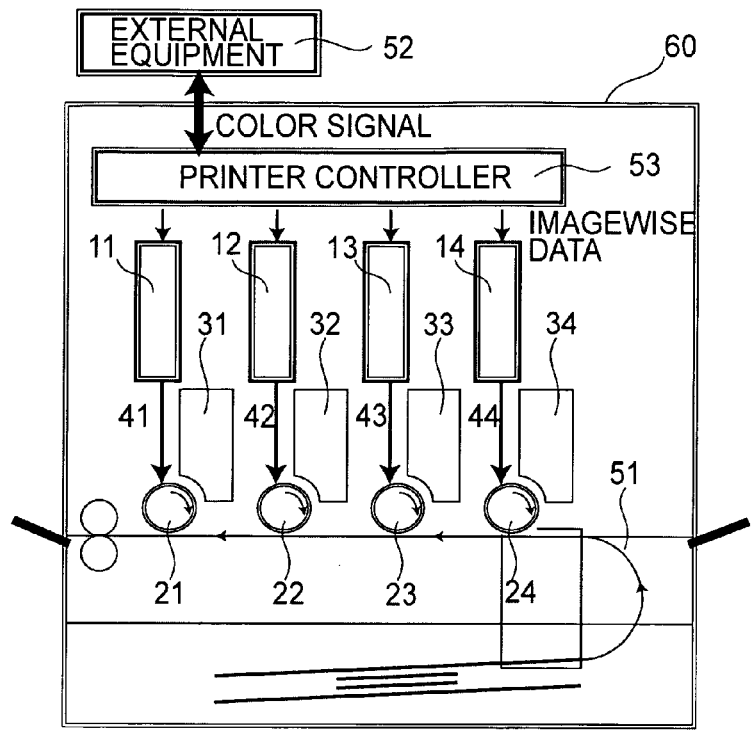
FIG. 43 is a schematic and sectional view, along the sub-scan section, of a color image forming apparatus according to an embodiment of the present invention.

FIG. 43 is a schematic view of a main portion of a color image forming apparatus according to an embodiment of the present invention. This embodiment is directed to a tandem type color image forming apparatus in which four optical scanning systems are provided so as to record imagewise data upon the surfaces of corresponding photosensitive drums (image bearing members) in parallel to each other.

In FIG. 43, denoted generally at 60 is a color image forming apparatus, and denoted at 11, 12, 13 and 14 are optical scanning systems having a structure according to any one of the preceding embodiments. Denoted at 21, 22, 23 and 24 are photosensitive drums or photosensitive members (image bearing members), and denoted at 31, 32, 33 and 34 are developing devices, respectively. Denoted at 51 is a conveyance belt.

In FIG. 43, the color image forming apparatus 60 receives color signals of R (red), G (green) and B (blue) supplied thereto from an outside machine 52 such as a personal computer, for example. These color signals are transformed by means of a printer controller 53 inside the image forming apparatus, into imagewise data (dot data) corresponding to C (cyan), M (magenta), Y (yellow) and K (black).

These imagewise data are inputted into the optical scanning systems 11, 12, 13 and 14, respectively. In response, these optical scanning systems produce light beams 41, 42, 43 and 44 having been modulated in accordance with the associated imagewise data. Through these light beams, the photosensitive surfaces of the photosensitive drums 21, 22, 23 and 24 are scanned in the main-scan direction.

In the color image forming apparatus of this embodiment, four optical scanning systems 11, 12, 13 and 14 are provided and these correspond to colors of C (cyan), M (magenta), Y (yellow) and K (black), respectively. These scanning systems are operable in parallel to each other to record imagewise signals upon the surfaces of the photosensitive drums 21, 22, 23 and 24, respectively, so that a color image can be printed at high speed.

As described, the color image forming apparatus of this embodiment uses four optical scanning systems 11, 12, 13 and 14 to produce latent images for different colors upon the surfaces of corresponding photosensitive drums 21, 22, 23 and 24, respectively, by use of light beams based on respective image data. After that, these images are superposedly transferred onto a recording sheet, whereby a single full-color image is produced thereon.

As regards the outside machine 52, a color image reading machine having a CCD sensor, for example, may be used. In that occasion, this color image reading machine and the color image forming apparatus 60 will provide a color digital copying machine.

While the invention has been described with reference to the structures disclosed herein, it is not confined to the details set forth and this application is intended to cover such modifications or changes as may come within the purposes of the improvements or the scope of the following claims.

This application claims priority from Japanese Patent Applications No. 2005-239770 filed Aug. 22, 2005, No. 2006-145154 filed May 25, 2006, and No. 2006-198159 filed Jul. 20, 2006, for which is hereby incorporated by reference.

What is claimed is:

1. An optical scanning system, comprising:
   light source means;
   deflecting means configured to scanningly deflect a light beam from said light source means in a main scan direction; and
   an imaging optical system configured to image, upon a surface to be scanned, the light beam deflected by a deflecting surface of said deflecting means;
   wherein said deflecting surface is configured to perform reciprocating motion by which the surface to be scanned is reciprocatingly scanned in the main scan direction with the light beam deflected by said deflecting surface of said deflecting means;
   wherein as a result of reflection of the light beam by the deflecting surface, a first phase difference of wavefront aberration is produced in the main scan direction between a marginal ray and a principal ray of the light beam reflected by the deflecting surface at an effective deflection angle of the same corresponding to a largest scan position in an effective scan region on the surface to be scanned;
   wherein as a result of transmission of the light beam through said imaging optical system, a second phase difference of wavefront aberration is produced in the main scan direction between a marginal ray and a principal ray of the light beam reflected by the deflecting surface at an effective deflection angle thereof; and
   wherein at least one optical surface constituting said imaging optical system is non-arcuate shape in a main scan section, so that the first and second phase differences are made opposite to each other.

2. An optical scanning system according to claim 1, wherein $\delta L1_+$ is used to refer to an optical path difference, in the main scan section, between a marginal ray at a scan end portion side of the light beam and a principal ray of the same reflected by said deflecting surface at an effective deflection angle thereof, the difference being produced as a result of reflection of the light beam by said deflecting surface, wherein $\delta L1_-$ is used to refer to an optical path difference between a marginal ray at a scan central portion side of the light beam and the principal ray of the same reflected by said deflecting surface at an effective deflection angle thereof, the difference being produced as a result of reflection of the light beam by said deflecting surface, wherein $\delta L2_+$ is used to refer to an optical path difference between the marginal ray at the scan end portion side of the light beam and the principal ray of the same reflected by said deflecting surface at an effective deflection angle of the same, the difference being produced as a result of transmission of the light beam through said imaging optical system, wherein $\delta L2_-$ is used to refer to an optical path difference between the marginal ray at the scan central portion side of the light beam and the principal ray of the same reflected by said deflecting surface at an effective deflection angle of the same, the difference being produced as a result of transmission of the light beam through said imaging optical system, and wherein said imaging optical system satisfies the following relation:

$$0.8 \le \frac{\delta L2_- - \delta L2_+}{\delta L1_+ - \delta L1_-} \le 1.2.$$

3. An optical scanning system according to claim 2, wherein, where the number of the optical surfaces constituting said imaging optical system is m and where the surface shape of each optical surface in the main scan section is expressed by X=f(Y) while a point of intersection between each optical surface and an optical axis of said imaging optical system is taken as an origin, a direction of the optical axis is taken as an X axis and an axis being orthogonal to the optical axis in the main scan section is taken as a Y axis, at the effective deflection angle of said deflecting surface the following condition is satisfied:

If $Y < 0$ $$\sum_{j=1}^{m} \left[ U_j(N_j - 1)\left(\frac{dX}{dY_{(out)j}} + \frac{dX}{dY_{(in)j}} - 2\frac{dX}{dY_{(p)j}}\right) \right] < 0$$

If $Y > 0$ $$\sum_{j=1}^{m} \left[ U_j(N_j - 1)\left(\frac{dX}{dY_{(out)j}} + \frac{dX}{dY_{(in)j}} - 2\frac{dX}{dY_{(p)j}}\right) \right] > 0$$

wherein $U_j$ is a coefficient which takes $U_j=-1$ when the optical surface is a transmission surface and it is a light entrance surface, $U_j=+1$ when the optical surface is a transmission surface and it is a light exit surface, and $U_j=+1$ when the optical surface is a reflection surface;

wherein $N_j$ is a coefficient which is equal to the refractive index of the glass material when the optical surface is a transmission surface, and which takes $N_j=2$ when the optical surface is a reflection surface;

wherein $dX/dY_{(out)j}$ is the tilt, in the main scan section, of the scan end portion with respect to the optical axis of the optical surface at the position where a marginal ray at the scan end portion side of the light beam, impinging on the largest scan position in the effective scan region on the surface to be scanned, passes through the j-th surface;

wherein $dX/dY_{(in)j}$ is the tilt, in the main scan section, of the scan central portion with respect to the optical axis of the optical surface at the position where a marginal ray at a scan central portion side of the light beam, impinging on the largest scan position in the effective scan region on the surface to be scanned, passes through the j-th surface; and wherein $dX/dY_{(p)j}$ is the tilt, in the main scan section, with respect to the optical axis of the optical surface at the position where the principal ray of the light beam, impinging on the largest scan position in the effective scan region on the surface to be scanned, passes through the j-th surface.

4. An optical scanning system according to claim 1, wherein the reciprocating motion of said deflecting surface is based on resonance drive.

5. An optical scanning system according to claim 1, wherein the reciprocating motion of said deflecting surface is based on sine oscillation.

6. An optical scanning system according to claim 4, wherein the reciprocating motion of said deflecting surface based on resonance drive has a plurality of discrete natural oscillation modes, and wherein said plurality of discrete natural oscillation modes include a reference oscillation mode which is a natural oscillation mode based on a reference frequency and a multiple-number-oscillation mode which is a natural oscillation mode based on a frequency corresponding to a multiple, by an integer not less than 2, of the reference frequency.

7. An optical scanning system according to claim 6, wherein said deflecting means includes a plurality of movable plates, a plurality of torsion springs disposed along an axis, for connecting said plurality of movable plates in series, a support for locally supporting said plurality of torsion springs, driving means for applying a torque to at least one of said plurality of movable plates, and drive control means for controlling said driving means.

8. An optical scanning system according to claim 7, wherein said defecting surface is formed on one of said plurality of movable plates, and wherein said plurality of movable plates and said plurality of torsion springs are provided in an integral structure.

9. An optical scanning system according to claim 8, wherein said drive control means controls said driving means so as to excite said reference oscillation mode and said multiple-number-oscillation mode simultaneously.

10. An optical scanning system according to claim 6, wherein the light beam being scanningly deflected by said deflecting surface, reciprocating in the main scan direction, is scanningly deflected in the effective scan region at an angular speed different from a uniform angular speed, and wherein the following condition is satisfied:

$$(d\theta_1/dt)_{max}/(d\theta_1/dt)_{min} < 1.1$$

where $(d\theta_1/dt)_{max}$ is a largest value of the angular speed of said deflecting surface at an arbitrary scan position in the effective scan region, and $(d\theta_1/dt)_{min}$ is a smallest value of the angular speed of said deflecting surface at an arbitrary scan position in the effective scan region.

11. An optical scanning system according to claim 10, wherein said imaging optical system is configured to convert the light beam, scanningly deflected by said deflecting means at a speed different from a uniform angular speed, into a uniform-speed beam on the surface to be scanned.

12. An optical scanning system according to claim 1, wherein, where a largest value of spot diameter in the main scan direction of focused spots along one and the same scan line in the effective scan region on the surface to be scanned is denoted by $\phi m_1$, and a smallest value of spot diameter in the main scan direction of focused spots along one and the same scan line in the effective scan region on the surface to be scanned is denoted by $\phi m_2$, the following relation is satisfied:

$$\phi m_1 / \phi m_2 < 1.1$$

13. An optical scanning system according to claim 1, wherein said light source means has at least two light emission points.

14. An optical scanning system according to claim 1, wherein said deflecting surface of said deflecting means is deformed in the main scan direction due to an angular acceleration resulting from reciprocating motion, and wherein the amount of deformation thereof is changeable in dependence upon the position of said deflecting surface in the sub-scan direction.

15. An optical scanning system according to claim 14, wherein said imaging optical system does not function to bring said deflecting surface and the surface to be scanned into a conjugate relationship with each other in the sub-scan section.

16. An optical scanning system according to claim 14, wherein, at an effective deflection angle of said deflection surface, the shape of the sub-scan section at a position of said deflection surface in the main-scan direction which position corresponds to the scan end portion side, with respect to an axis of reciprocating motion of said deflecting surface, is deformed into a concave shape with respect to the surface to be scanned, and wherein the shape of the sub-scan section at a position of said deflection surface in the main-scan direction which position corresponds to the scan central portion side, with respect to the axis of reciprocating motion of said deflecting surface, is deformed into a convex shape with respect to the surface to be scanned.

17. An optical scanning system according to claim 16, wherein, when a parallel light beam is incident on said imaging optical system at a position where the light beam reflected by said deflecting surface at an effective deflection angle thereof passes through said imaging optical system, a curvature radius in the sub-scan direction of a wavefront of the light beam at a position through which a scan-end-portion-side marginal ray passes, with respect to a principal ray of the light beam passed through said imaging optical system, is made larger than a curvature radius of a wavefront in the sub-scan direction of the light beam at a position through which a scan-central-portion side marginal ray passes, with respect to the principal ray of the light beam.

18. An image forming apparatus, comprising:
an optical scanning system as recited in claim 1;
a photosensitive material disposed at a scan surface to be scanned;
a developing device for developing an electrostatic latent image formed on said photosensitive material through a light beam scanned by said optical scanning system, to produce a toner image;
a transferring device for transferring the developed toner image onto a transfer material; and
a fixing device for fixing the transferred toner image, on the transfer material.

19. An image forming apparatus, comprising:
an optical scanning system as recited in claim 1; and
a printer controller for converting code data supplied from an outside machine into an imagewise signal and for inputting the imagewise signal into said optical scanning system.

20. A color image forming apparatus, comprising:
a plurality of optical scanning systems each being as recited in claim 1; and a plurality of image bearing members each being disposed at a scan surface, to be scanned, of corresponding one of said optical scanning systems, for forming images of different colors.

21. A color image forming apparatus according to claim 20, further comprising a printer controller for converting a color signal supplied from an outside machine into imagewise data of different colors and for inputting the imagewise data into corresponding optical scanning systems.

* * * * *

UNITED STATES PATENT AND TRADEMARK OFFICE
CERTIFICATE OF CORRECTION

PATENT NO. : 7,385,746 B2  Page 1 of 1
APPLICATION NO. : 11/503069
DATED : June 10, 2008
INVENTOR(S) : Yoshihiro Ishibe et al.

It is certified that error appears in the above-identified patent and that said Letters Patent is hereby corrected as shown below:

COLUMN 7
    Line 56, "centreal" should read --central--.

COLUMN 9
    Line 35, "sembodiment." should read --embodiment.--.

COLUMN 14
    Line 3, "centeral" should read --central--; and

Line 25, " $0.8 \leq \dfrac{\delta L2 - \delta L2}{\delta L1_+ - \delta L1_-} \leq 1.2$ " should read -- $0.8 \leq \dfrac{\delta L2_- - \delta L2_+}{\delta L1_+ - \delta L1_-} \leq 1.2$ --.

COLUMN 25
    Line 11, "M⁻K" should read --$M^{-1}K$--.

COLUMN 29
    Line 12, "5μl₊" should read --$\delta L1_+$--.

COLUMN 31
    Line 4, "$(d\theta 1/dt)_{max}/(d\theta 1/dt)_{min} < 1.1$" should read --$(d\theta_1/dt)_{max}/(d\theta_1/dt)_{max} < 1.1$--.

COLUMN 39
    Line 9, "obliquie" should read --oblique--; and
    Line 36, "haven" should read --have--.

COLUMN 43
    Line 42, "3 mm" should read --3.2 mm--, and "1 mm" should read --2 mm--.

Signed and Sealed this

Twenty-seventh Day of July, 2010

David J. Kappos
*Director of the United States Patent and Trademark Office*